United States Patent
Lim et al.

(10) Patent No.: US 11,979,871 B2
(45) Date of Patent: May 7, 2024

(54) METHOD AND DEVICE FOR TRANSMITTING EHT PPDU IN WIRELESS LAN SYSTEM

(71) Applicant: LG ELECTRONICS INC., Seoul (KR)

(72) Inventors: Dongguk Lim, Seoul (KR); Jinsoo Choi, Seoul (KR); Jinmin Kim, Seoul (KR); Eunsung Park, Seoul (KR); Sunwoong Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 466 days.

(21) Appl. No.: 17/286,996

(22) PCT Filed: Nov. 6, 2019

(86) PCT No.: PCT/KR2019/014983
§ 371 (c)(1),
(2) Date: Apr. 20, 2021

(87) PCT Pub. No.: WO2020/096349
PCT Pub. Date: May 14, 2020

(65) Prior Publication Data
US 2021/0385830 A1    Dec. 9, 2021

(30) Foreign Application Priority Data

Nov. 6, 2018  (KR) .......................... 10-2018-0135121

(51) Int. Cl.
*H04W 72/12*    (2023.01)
*H04L 27/26*    (2006.01)
(Continued)

(52) U.S. Cl.
CPC ..... *H04W 72/1263* (2013.01); *H04L 27/2607* (2013.01); *H04W 72/0453* (2013.01); *H04W 72/046* (2013.01); *H04W 84/12* (2013.01)

(58) Field of Classification Search
CPC . H04L 27/2607; H04L 5/0023; H04L 5/0048; H04L 27/2613; H04L 27/26132;
(Continued)

(56) References Cited

U.S. PATENT DOCUMENTS

2015/0023335 A1*  1/2015  Vermani ................. H04L 27/26
                                                                    370/338
2017/0338919 A1    11/2017  Lim et al.
(Continued)

FOREIGN PATENT DOCUMENTS

WO        2016125999        8/2016

OTHER PUBLICATIONS

Schelstraete, Sigurd, et al., MU sounding improvements. doc., IEEE 802.11-18/1191, Jul. 8, 2018, see slides 2, 8.

*Primary Examiner* — Awet Haile
(74) *Attorney, Agent, or Firm* — BRYAN CAVE LEIGHTON PAISNER LLP

(57) ABSTRACT

Proposed are a method and device for transmitting EHT PPDU in a wireless LAN system. Particularly, a transmission STA generates first and second LTF symbols. The transmission STA transmits EHT PPDU comprising the first and second LTF symbols to a reception STA. The first and second LTF symbols are generated on the basis of an LTF sequence for first to fourth spatial streams. In the first LTF symbol, the LTF sequence for the first to fourth spatial streams is mapped to tones in four tone units in a frequency domain. In the second LTF symbol, the LTF sequence for the first to fourth spatial streams is mapped to tones in four tone units in a frequency domain. The LTF sequence, for the first (Continued)

to fourth spatial streams, mapped to the frequency domain of the second LTF symbol is mapped to a tone by means of cyclic shifting, by two tones, the LTF sequence, for the first to fourth spatial streams, mapped to the frequency domain of the first LTF symbol.

12 Claims, 31 Drawing Sheets

(51) Int. Cl.
 *H04W 72/04* (2023.01)
 *H04W 72/044* (2023.01)
 *H04W 72/0453* (2023.01)
 *H04W 72/1263* (2023.01)
 *H04W 84/12* (2009.01)

(58) Field of Classification Search
 CPC ........... H04W 72/0453; H04W 72/046; H04W 72/1263; H04W 84/12
 See application file for complete search history.

(56) References Cited

U.S. PATENT DOCUMENTS

| | | | |
|---|---|---|---|
| 2018/0191546 A1 | 7/2018 | Azizi et al. | |
| 2019/0373586 A1* | 12/2019 | Verma | H04W 72/51 |
| 2020/0112350 A1* | 4/2020 | Yang | H04B 7/0421 |
| 2021/0351820 A1* | 11/2021 | Huang | H04B 7/0413 |

* cited by examiner

FIG. 2
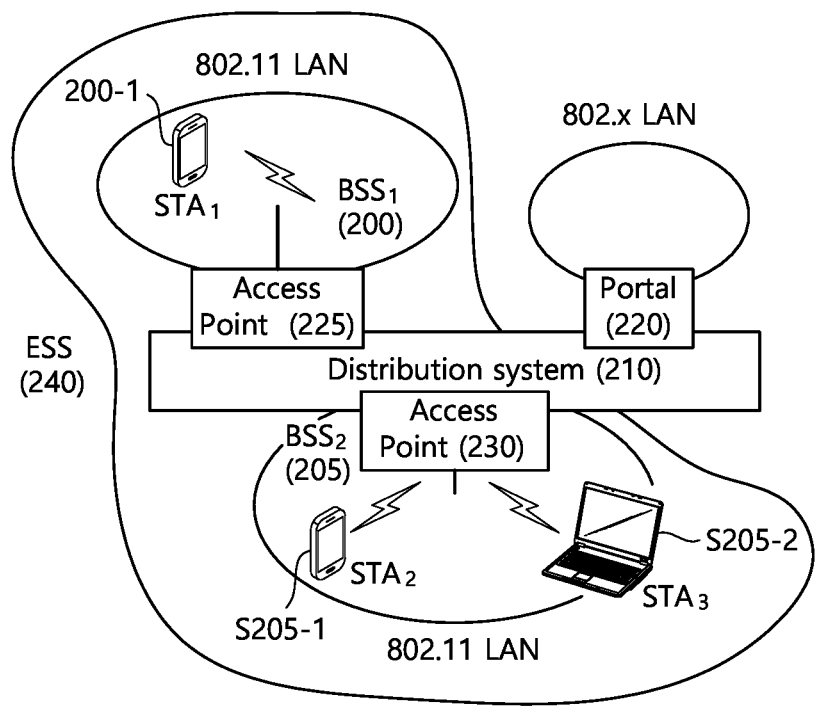
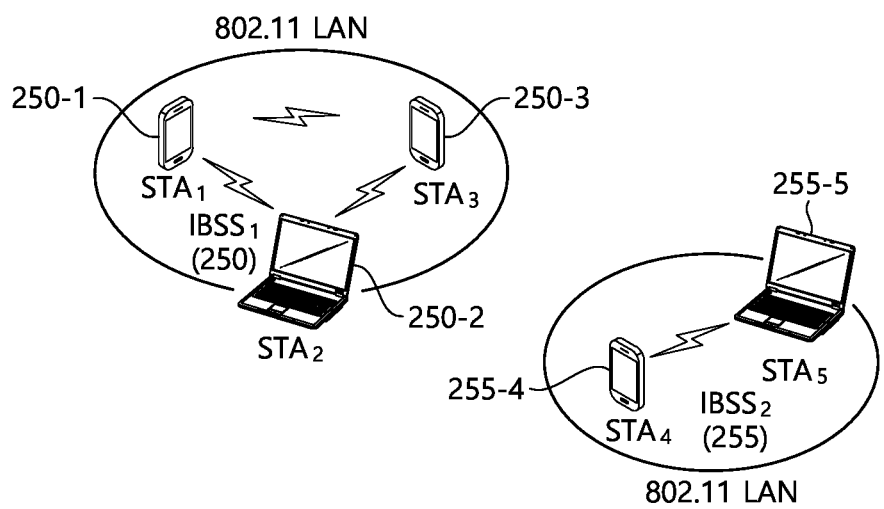

FIG. 4
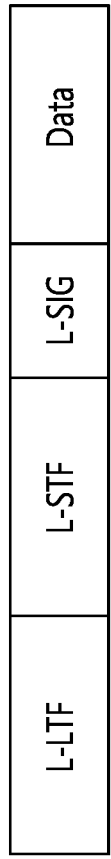
PPDU Format (IEEE 802.11a/g)
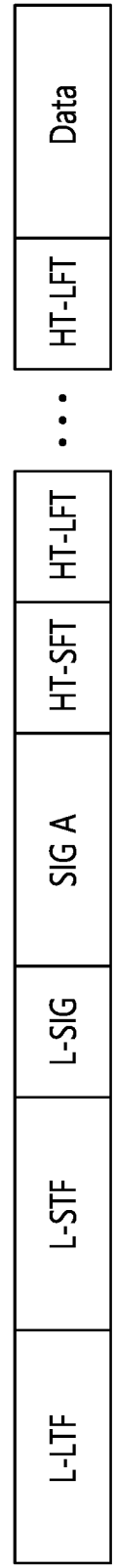
HT PPDU Format (IEEE 802.11n)
VHT PPDU Format (IEEE 802.11ac)
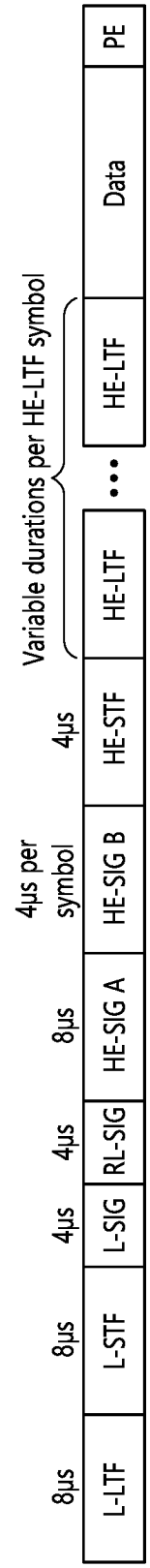

FIG. 18

| 8μs | 8μs | 4μs | 4μs | | | | | | |
|---|---|---|---|---|---|---|---|---|---|
| L-LTF | L-STF | L-SIG | RL-SIG | SIG A | SIG B | STF | LTF | Data | PE |

FIG. 21

$$\text{LTF generation sequence (LTF}_k\text{)} \quad \times \quad \begin{bmatrix} A_{11} & A_{12} \\ A_{21} & A_{22} \end{bmatrix}$$

$$= \begin{vmatrix} \begin{bmatrix} A_{11} \cdot LTF_k & A_{12} \cdot LTF_k \end{bmatrix} \text{---910} \\ \begin{bmatrix} A_{21} \cdot LTF_k & A_{22} \cdot LTF_k \end{bmatrix} \text{---920} \end{vmatrix}$$

930    940

→ Time

↓ Spatial stream

FIG. 28

| Tone index | LTF symbol 1 | 2 |
|---|---|---|
| 1 | x | + |
| 2 | o | - |
| 3 | + | x |
| 4 | - | o |
| 5 | x | + |
| 6 | o | - |
| 7 | + | x |
| 8 | - | o |
| 9 | x | + |
| 10 | o | - |
| 11 | + | x |
| 12 | - | o |

Tone step for Cyclic shift

Tone step for spatial stream

Frequency x : LTF sequence for stream 1
o : LTF sequence for stream 2
+ : LTF sequence for stream 3
- : LTF sequence for stream 4

METHOD AND DEVICE FOR TRANSMITTING EHT PPDU IN WIRELESS LAN SYSTEM

This application is the National Stage filing under 35 U.S.C. 371 of International Application No. PCT/KR2019/014983, filed on Nov. 6, 2019, which claims the benefit of Korean Patent Application No. 10-2018-0135121 filed on Nov. 6, 2018, the contents of which are all hereby incorporated by reference herein in their entirety.

BACKGROUND

Field of the Disclosure

The present disclosure relates to a scheme of transmitting an extremely high throughput (EHT) physical protocol data unit (PPDU) in a wireless local area network (WLAN) system, and more particularly, to a method and apparatus for transmitting the EHT PPDU by configuring an effective long training field (LTF) sequence when 16 spatial streams are supported in the WLAN system.

Related Art

A wireless local area network (WLAN) has been improved by various methods. For example, IEEE 802.11ax proposes an improved communication environment by employing orthogonal frequency division multiple access (OFDMA) and downlink multi-user multiple-input multiple-output (DL MU MIMO) techniques.

The present disclosure proposes technical features that can be used according to a new communication standard. The new communication standard may be, for example, an extremely high throughput (EHT) standard that is under discussion in recent times. The EHT standard may employ a newly proposed increased bandwidth, an improved PHY layer protocol data unit (PPDU) structure, an improved sequence, a hybrid automatic repeat request (HARQ) technique, and the like. The EHT standard may be referred to as IEEE 802.11be.

In the new WLAN standard, an increased number of spatial streams may be used. In this case, a scheme for signaling in a WLAN system may need to be improved in order to properly use the increased number of spatial streams.

SUMMARY

The present specification proposes a method and apparatus for transmitting an extremely high throughput (EHT) physical protocol data unit (PPDU) in a wireless local area network (WLAN) system.

An example of the present specification proposes a method of transmitting an EHT PPDU.

The present embodiment may be performed in a network environment in which a next-generation WLAN system is supported. The next-generation WLAN system is a WLAN system evolved from an 802.11ax system, and may satisfy backward compatibility with the 802.11ax system.

Since the next-generation WLAN system (IEEE 802.11be or EHT WLAN system) supports up to 16 spatial streams, a data rate may be increased when a high number of spatial streams are used, whereas there may be a problem in that an overhead is increased according to an increase in the number of long training field (LTF) symbols. The present embodiment proposes an effective LTF transmission method for reducing an overhead of an LTF by using a compressed LTF sequence, an orthogonal LTF sequence, an interleaved LTF sequence, a cyclic-shifted LTF sequence, or the like.

The present embodiment may be performed in a transmitting station (STA), and the transmitting STA may correspond to an access point (AP). A receiving STA of the present embodiment may correspond to an STA supporting an EHT WLAN system.

The transmitting STA generates first and second LTF symbols.

The transmitting STA transmits the EHT PPDU including the first and second LTF symbols to the receiving STA.

The first and second LTF symbols are generated based on LTF sequences for first to fourth spatial streams. The first and second LTF symbols may be LTF symbols newly defined in EHT or 802.11be.

In the first LTF symbol, the LTF sequences for the first to fourth spatial streams are mapped to a tone on a 4-tone basis in a frequency domain. In the second LTF symbol, the LTF sequences for the first to fourth spatial streams are mapped to a tone on a 4-tone basis in the frequency domain. Since the sequence is mapped on a 4-tone basis, the LTF sequences for the first to fourth spatial streams are 1×LTF sequences. According to the aforementioned example, the transmitting STA may transmit the LTF sequences for 8 spatial streams by using two LTF symbols.

If the sequence is mapped on a 2-tone basis, the LTF sequences for the first to fourth spatial streams are 2×LTF sequences. According to the aforementioned example, the transmitting STA may transmit the LTF sequences for 4 spatial streams by using two LTF symbols.

The LTF sequences for the first to fourth spatial streams mapped to the frequency domain of the second LTF symbol are mapped to tones in such a manner that the LTF sequences for the first to fourth spatial streams mapped to the frequency domain of the first LTF symbol are cyclically shifted by 2 tones.

According to an embodiment proposed in the present specification, an LTF sequence mapped to a frequency domain of a first LTF symbol is cyclically shifted, and the cyclic-shifted LTF sequence is mapped to a frequency domain of a second LTF symbol. Therefore, a tone spacing by which the LTF sequence is mapped can be decreased in terms of frequency, thereby increasing reliability of receiving the LTF sequence.

BRIEF DESCRIPTION OF THE DRAWINGS

FIG. 2 is a conceptual diagram illustrating the structure of a wireless local area network (WLAN).

FIG. 4 illustrates an example of a PPDU used in an IEEE standard.

FIG. 18 illustrates an example of a PPDU used in the present disclosure.

FIG. 21 illustrates an example in which a P matrix is applied to an LTF sequence.

FIG. 28 illustrates an example of cyclically shifting an LTF sequence for each stream to configure an interleaved LTF sequence according to the present embodiment.

DESCRIPTION OF EXEMPLARY EMBODIMENTS

As used herein, a slash (/) or comma may indicate "and/or". For example, "A/B" may indicate "A and/or B" and therefore may indicate "only A", "only B", or "A and B". Technical features that are separately described in one drawing may be implemented separately or may be implemented simultaneously.

As used herein, parentheses may indicate "for example". Specifically, "control information (EHT-Signal)" may mean that "EHT-Signal" is proposed as an example of "control information". Further, "control information (i.e., EHT-signal)" may also mean that "EHT-signal" is proposed as an example of "control information".

The following examples of the present disclosure may be applied to various wireless communication systems. For example, the following examples of the present disclosure may be applied to a wireless local area network (WLAN) system. For example, the present disclosure may be applied to IEEE 802.11a/g/n/ac or IEEE 802.11ax. The present disclosure may also be applied to a newly proposed EHT standard or IEEE 802.11be. Further, the examples of the present disclosure may be applied to a new WLAN standard evolving from the EHT standard or IEEE 802.11be.

Hereinafter, technical features of a WLAN system to which the present disclosure is applicable are described in order to describe technical features of the present disclosure.

Figure 1:
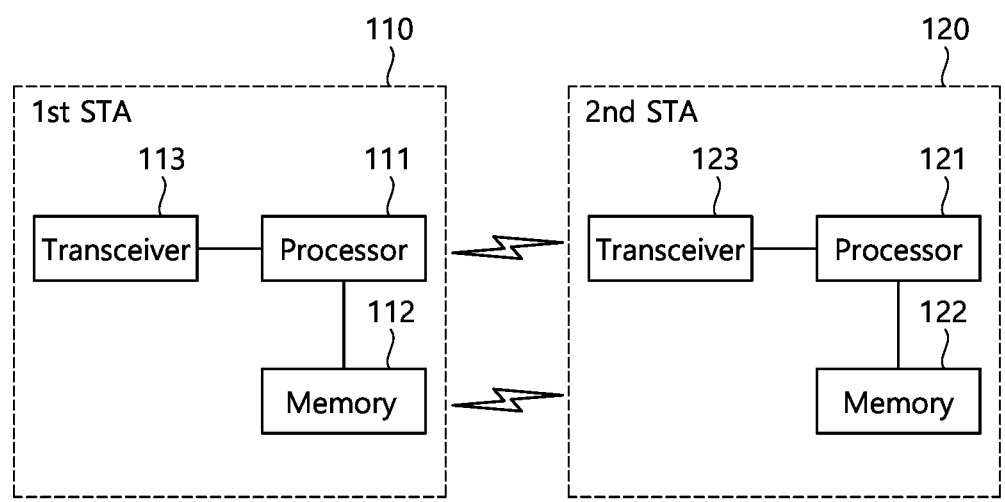
FIG. 1 illustrates an example of a transmitting device and/or a receiving device according to the present disclosure.

FIG. 1 illustrates an example of a transmitting device and/or a receiving device according to the present disclosure.

The example of FIG. 1 may perform various technical features to be described below. FIG. 1 includes two stations (STAs). The STAs 110 and 120 may be referred to as various terms, such as mobile terminals, wireless devices, wireless transmit/receive units (WTRUs), user equipments (UEs), mobile stations (MSs), mobile subscriber units, and simply users. Further, the STAs 110 and 120 may be referred to as various terms, such as receiving apparatuses, transmitting apparatuses, receiving STAs, transmitting STAs, receiving devices, and transmitting devices.

The STAs 110 and 120 may serve as access points (APs) or non-APs. That is, the STAs 110 and 120 of the present disclosure may perform functions of APs and/or non-APs.

The STAs 110 and 120 of the present disclosure may support various communication standards in addition to the IEEE 802.11 standards. For example, the STAs 110 and 120 may support 3GPP communication standards (e.g., LTE, LTE-A, and 5G NR standards). The STAs of the present disclosure may be configured as various devices, such as mobile phones, vehicles, and personal computers.

In the present disclosure, the STAs 110 and 120 may include a medium access control (MAC) and a physical layer interface for a wireless medium according to the IEEE 802.11 specifications.

A first STA 110 may include a processor 111, a memory 112, and a transceiver 113. The illustrated processor, memory, and transceiver may be configured as separate chips, or at least two blocks/functions thereof may be configured through a single chip.

The transceiver 113 of the first STA performs an operation of transmitting or receiving a signal. Specifically, the transceiver 113 may transmit or receive an IEEE 802.11 packet (e.g., an IEEE 802.11a/b/g/n/ac/ax/be packet or the like).

For example, the first STA 110 may perform an intended operation of an AP. For example, the processor 111 of the AP may receive a signal through the transceiver 113, may process the received signal, may generate a transmission signal, and may perform control for signal transmission. The memory 112 of the AP may store a signal (i.e., a received signal) received through the transceiver 113 and may store a signal (i.e., a transmission signal) to be transmitted through the transceiver.

For example, a second STA 120 may perform an intended operation of a non-AP STA. For example, a transceiver 123 of the non-AP performs an operation of transmitting or receiving a signal. Specifically, the transceiver 123 may transmit or receive an IEEE 802.11 packet (e.g., an IEEE 802.11a/b/g/n/ac/ax/be packet or the like).

For example, a processor 121 of the non-AP STA may receive a signal through the transceiver 123, may process the received signal, may generate a transmission signal, and may perform control for signal transmission. A memory 122 of the non-AP STA may store a signal (i.e., a received signal) received through the transceiver 123 and may store a signal (i.e., a transmission signal) to be transmitted through the transceiver.

For example, in the following specification, an operation of a device indicated as an AP may be performed by the first STA 110. Specifically, the operation of the device indicated as the AP may be controlled by the processor 111 of the first STA 110, and a related signal may be transmitted or received through the transceiver 113 controlled by the processor 111 of the first STA 110. Further, control information related to the operation of the AP or transmission/reception signals of the AP may be stored in the memory 112 of the first STA 110.

For example, in the following specification, an operation of a device indicated as a non-AP (or user STA) may be performed by the second STA 120. Specifically, the operation of the device indicated as the non-AP may be controlled by the processor 121 of the second STA 120, and a related signal may be transmitted or received through the transceiver 123 controlled by the processor 121 of the second STA 120. Further, control information related to the operation of the non-AP or transmission/reception signals of the non-AP may be stored in the memory 212 of the second STA 120.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs (200, 205) (hereinafter, referred to as BSS). The BSSs (200, 205), as a set of an AP and an STA such as an access point (AP) (225) and a station (STA1) (200-1) which are successfully synchronized to communicate with each other, are not concepts indicating a specific region. The BSS (205) may include one or more STAs (205-1, 205-2) which may be joined to one AP (230).

The BSS may include at least one STA, APs providing a distribution service, and a distribution system (DS) (210) connecting multiple APs.

The distribution system (210) may implement an extended service set (ESS) (240) extended by connecting the multiple BSSs (200, 205). The ESS (240) may be used as a term indicating one network configured by connecting one or more APs (225, 230) through the distribution system (210). The AP included in one ESS (240) may have the same service set identification (SSID).

A portal (220) may serve as a bridge which connects the wireless LAN network (IEEE 802.11) and another network (e.g., 802.X).

In the BSS illustrated in the upper part of FIG. 2, a network between the APs (225, 230) and a network between the APs (225, 230) and the STAs (200-1, 205-1, 205-2) may be implemented. However, the network is configured even between the STAs without the APs (225, 230) to perform communication. A network in which the communication is performed by configuring the network even between the STAs without the APs (225, 230) is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs (250-1, 250-2, 250-3, 255-4, 255-5) are managed by a distributed manner. In the IBSS, all STAs (250-1, 250-2, 250-3, 255-4, 255-5) may be constituted by movable STAs and are not permitted to access the DS to constitute a self-contained network.

Figure 3:
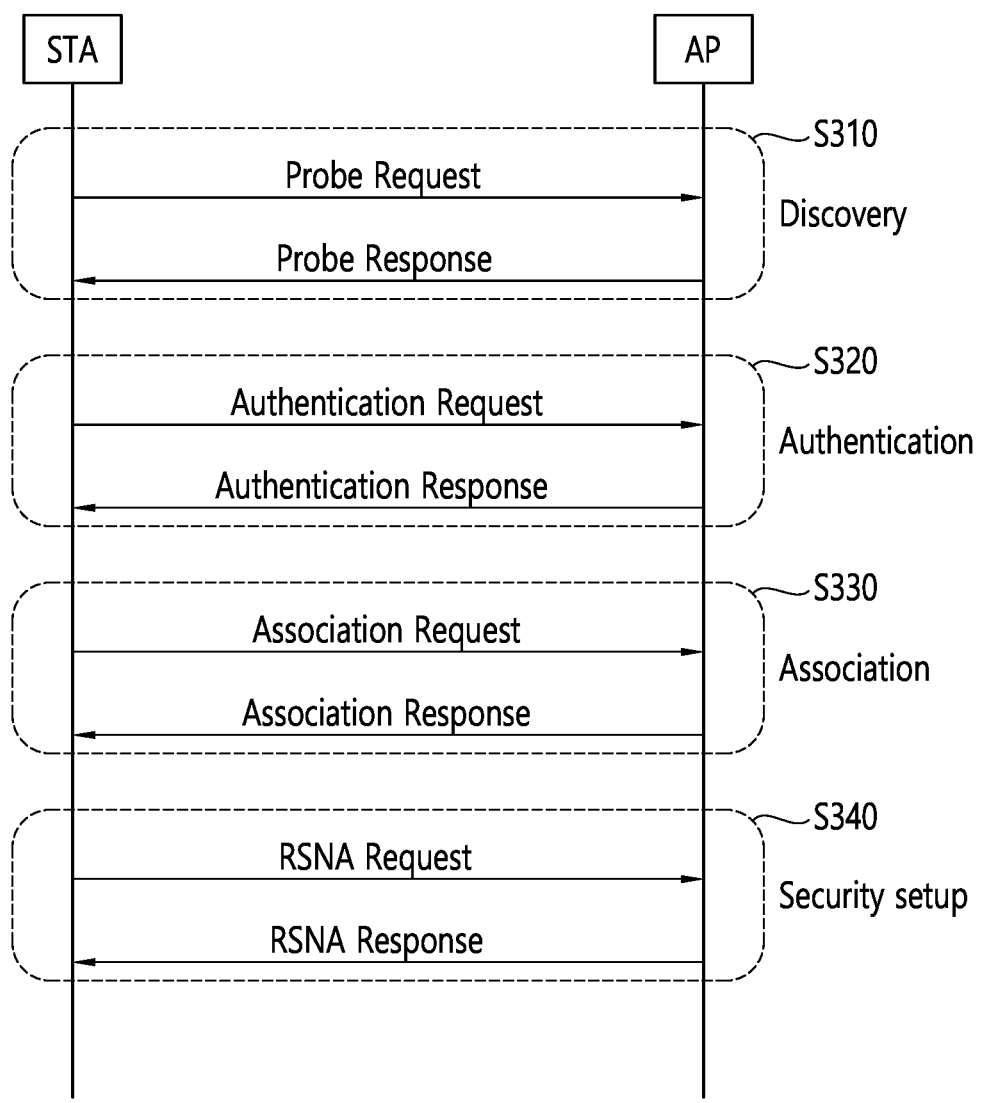
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information on a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S240. The authentication process in S320 may include a process in which the STA transmits an authentication request frame to the AP and the AP transmits an authentication response frame to the STA in response. The authentication frames used for an authentication request/response are management frames.

The authentication frames may include information on an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information on various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information on various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In 340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and an STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to O1-DMA. Further, an RU may also be defined to transmit a signal to one STA. An RU may be used for an STF, an LTF, a data field, or the like.

Figure 5:
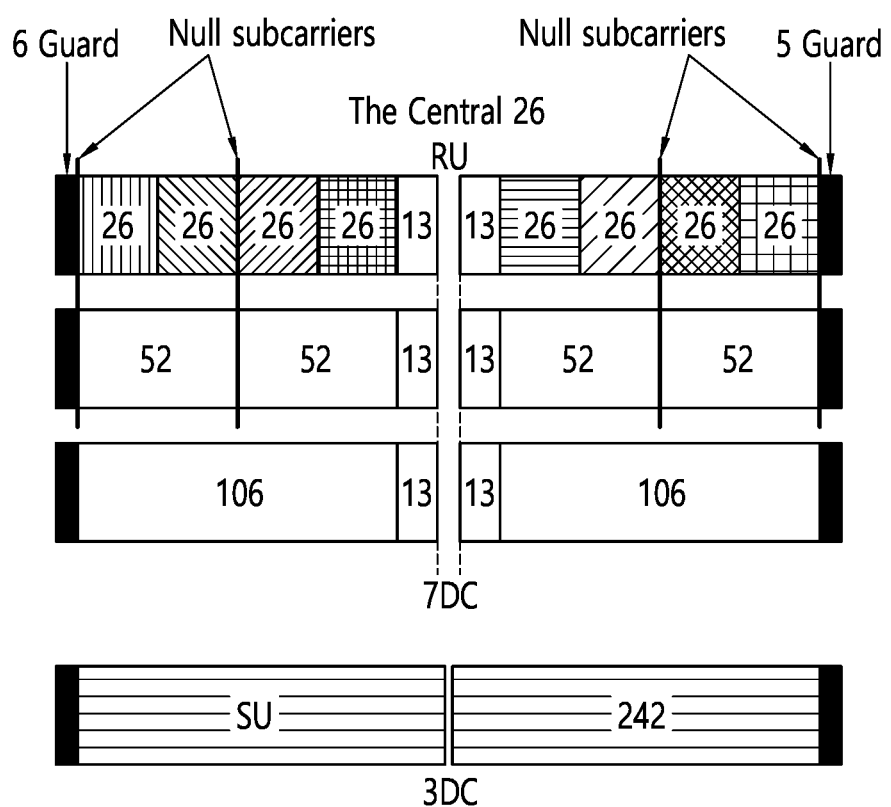
FIG. 5 is a diagram illustrating a layout of resource units (RUs) used in a band of 20 MHz.

FIG. 5 is a diagram illustrating a layout of resource units (RUs) used in a band of 20 MHz.

As illustrated in FIG. 5, resource units (RUs) corresponding to different numbers of tones (that is, subcarriers) are used to constitute some fields of the HE-PPDU. For example, the resources may be allocated by the unit of the RU illustrated for the HE-STF, the HE-LTF, and the data field.

As illustrated in an uppermost part of FIG. 5, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 5 may be used even in a situation for a single user (SU) in addition to the multiple users (MUs) and, in this case, as illustrated in a lowermost part of FIG. 5, one 242-unit may be used and, in this case, three DC tones may be inserted.

In one example of FIG. 5, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 6:
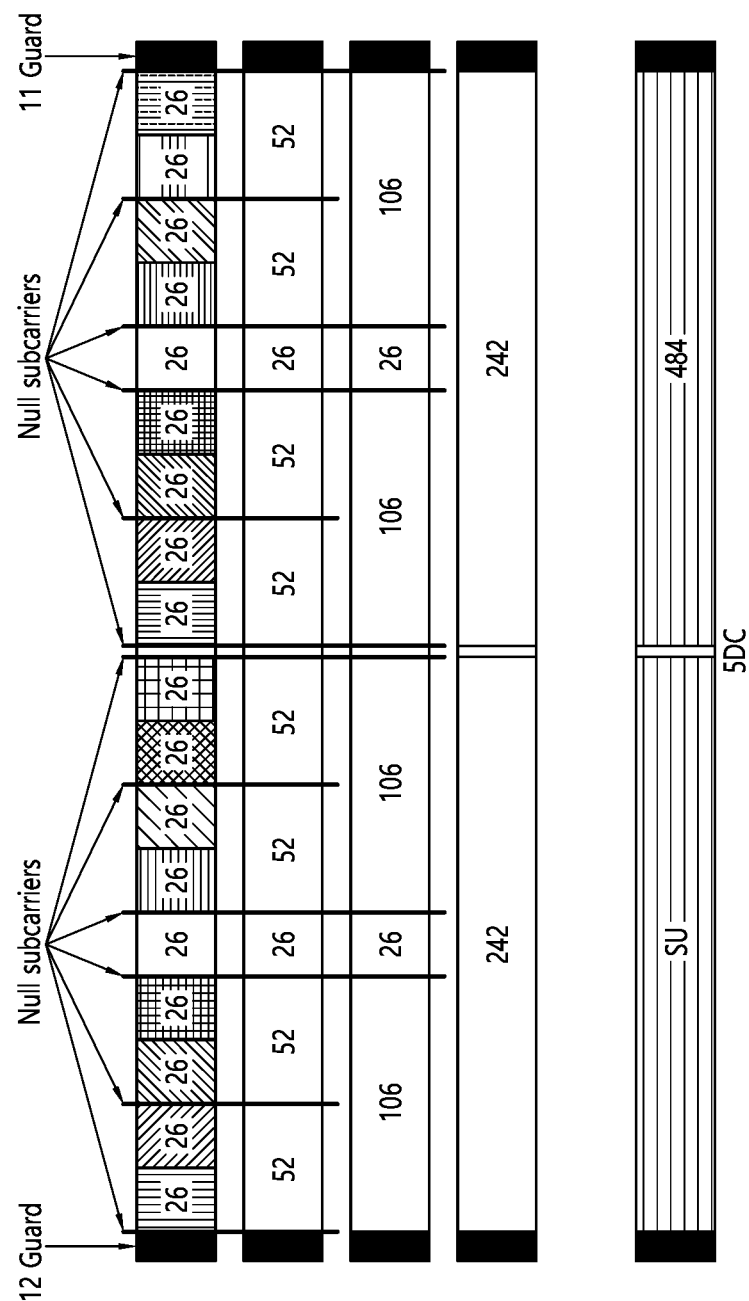
FIG. 6 is a diagram illustrating a layout of resource units (RUs) used in a band of 40 MHz

FIG. 6 is a diagram illustrating a layout of resource units (RUs) used in a band of 40 MHz.

Similarly to a case in which the RUs having various RUs are used in one example of FIG. 5, 26-RU, 52-RU, 106-RU, 242-RU, 484-RU, and the like, may be used even in one example of FIG. 6. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 6, when the RU layout is used for the single user, the 484-RU may be used. That is, the detailed number of RUs may be modified similarly to one example of FIG. 5.

Figure 7:
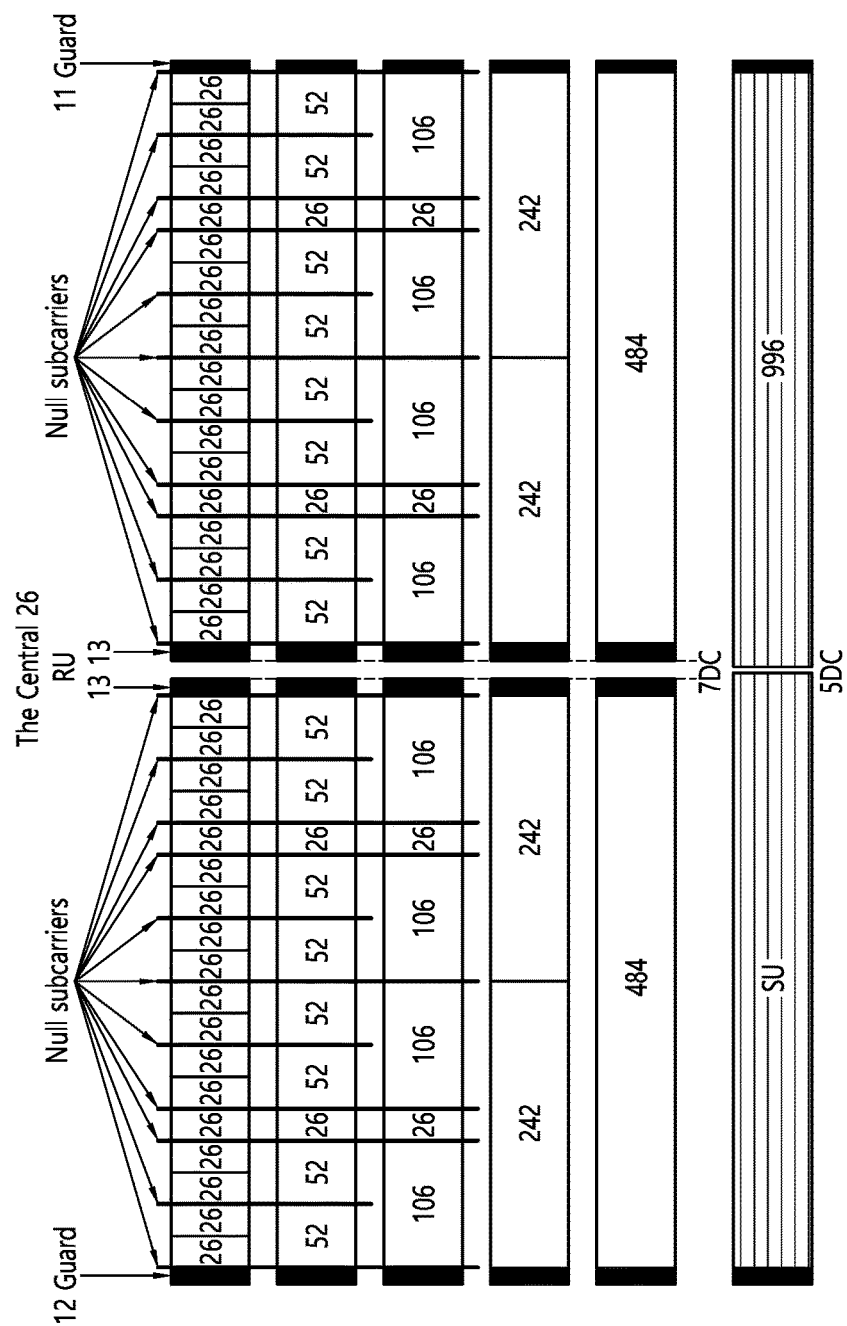
FIG. 7 is a diagram illustrating a layout of resource units (RUs) used in a band of 80 MHz.

FIG. 7 is a diagram illustrating a layout of resource units (RUs) used in a band of 80 MHz.

Figure 26:
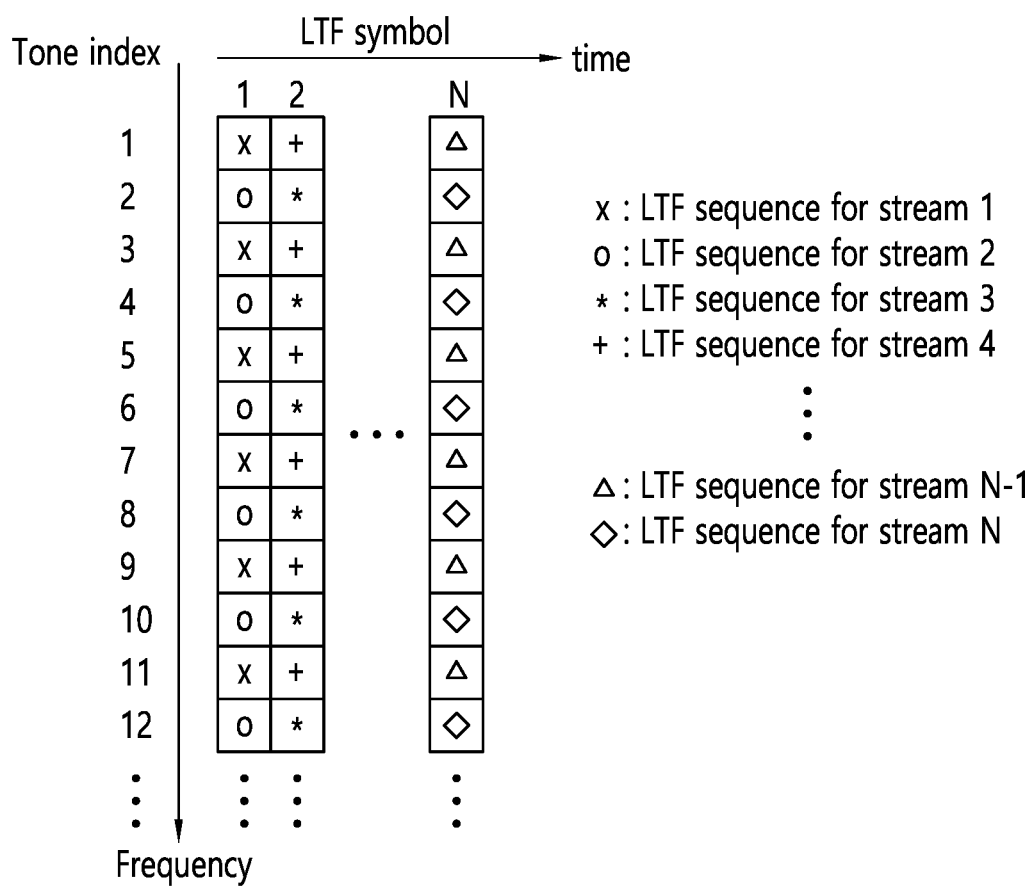
FIG. 26 illustrates an example of configuring an LTF sequence for each stream by assigning it to a tone on a 2-tone basis according to the present embodiment.

Similarly to a case in which the RUs having various RUs are used in one example of each of FIG. 5 or 6, 26-RU, 52-RU, 106-RU, 242-RU, 484-RU, and the like, may be used even in one example of FIG. 7. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 7, when the RU layout is used for the single user, 996-RU may be used and, in this case, 5 DC tones may be inserted.

Meanwhile, the detailed number of RUs may be modified similarly to one example of each of FIG. 5 and FIG. 6.

The RU layouts (i.e., RU locations) illustrated in FIG. 5 to FIG. 7 may also be applied to a new WLAN system (e.g., an EHT system). In a 160 MHz band supported by the new WLAN system, an RU layout for 80 MHz (i.e., the example of FIG. 7) may be repeated twice, or an RU layout for 40 MHz (i.e., the example of FIG. 6) may be repeated four times. When an EHT PPDU is configured in a 320 MHz band, the RU layout for 80 MHz (i.e., the example of FIG. 7) may be repeated four times, or the RU layout for 40 MHz (i.e., the example of FIG. 6) may be repeated eight times.

In the present disclosure, one RU may be allocated for only one STA (e.g., non-AP). Alternatively, a plurality of RUs may be allocated for one STA (e. g., non-AP).

An RU described herein may be used for uplink (UL) communication and downlink (DL) communication. For example, when UL-MU communication solicited by a trigger frame is performed, a transmitting STA (e.g., an AP) may allocate a first RU (e.g., a 26/52/106/242-RU or the like) to a first STA and may allocate a second RU (e.g., a 26/52/106/242-RU or the like) to a second STA through the trigger frame. Thereafter, the first STA may transmit a first trigger-based PPDU based on the first RU, and the second STA may transmit a second trigger-based PPDU based on the second RU. The first and second trigger-based PPDUs are transmitted to the AP in the same time period.

For example, when a DL MU PPDU is configured, a transmitting STA (e.g., an AP) may allocate a first RU (e.g., a 26/52/106/242-RU or the like) to a first STA and may allocate a second RU (e.g., a 26/52/106/242-RU or the like) to a second STA. That is, the transmitting STA (e.g., the AP) may transmit an HE-STF, an HE-LTF, and a data field for the first STA through the first RU and may transmit an HE-STF, an HE-LTF, and a data field for the second STA through the second RU.

Information on an RU layout may be signaled through an HE-SIG-B.

Figure 8:
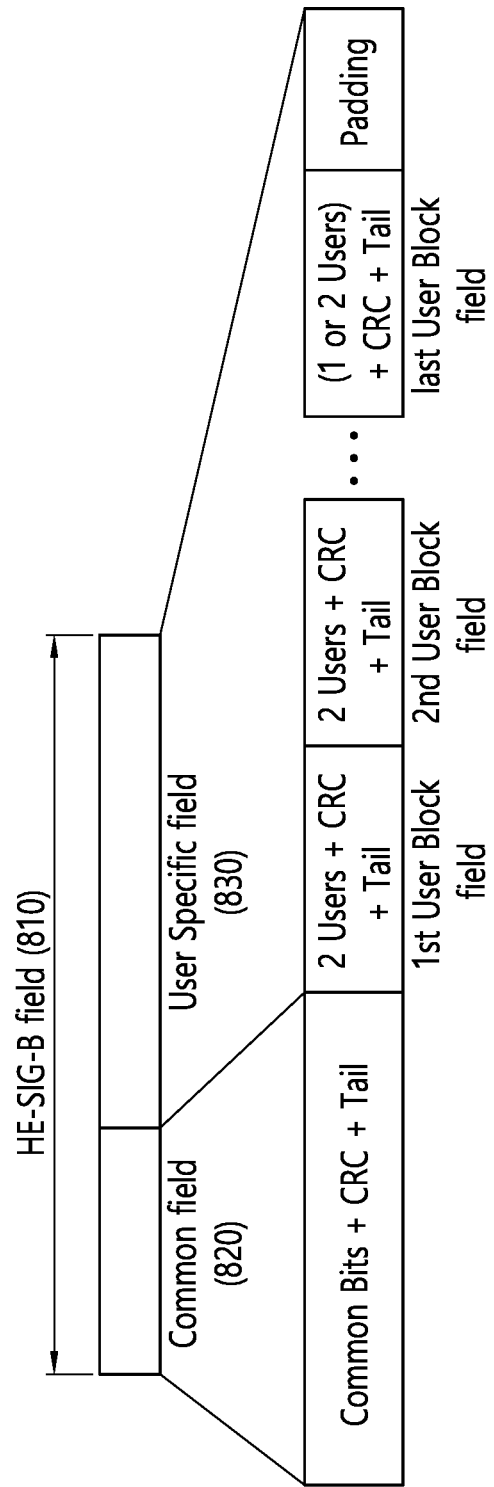
FIG. 8 illustrates the structure of an HE-SIG-B field.

FIG. 8 illustrates the structure of an HE-SIG-B field.

As illustrated, the HE-SIG-B field 810 includes a common field 820 and a user-specific field 830. The common field 820 may include information commonly applied to all users (i.e., user STAs) receiving the SIG-B. The user-specific field 830 may be referred to as a user-specific control field. When the SIG-B is transmitted to a plurality of users, the user-specific field 830 may be applied to only some of the plurality of users.

As illustrated in FIG. 8, the common field 820 and the user-specific field 830 may be separately encoded.

The common field 820 may include RU allocation of N*8 bits information. For example, the RU allocation information may include information on the location of an RU. For example, when a 20 MHz channel is used as shown in FIG. 5, the RU allocation information may include information on which RU (26-RU/52-RU/106-RU) is allocated in which frequency band.

An example in which the RU allocation information includes eight bits is illustrated below.

TABLE 1

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |

As in the example of FIG. 5, up to nine 26-RUs may be allocated in a 20 MHz channel. As illustrated in Table 1, when the RU allocation information of the common field 820 is set to "00000000", nine 26-RUs may be allocated in the channel (i.e., 20 MHz). Further, as illustrated in Table 1, when the RU allocation information of the common field 820 is set to "00000001", seven 26-RUs and one 52-RU are disposed in the channel. That is, in the example of FIG. 5, the 52-RU may be allocated on the rightmost side, and the seven 26-RUs may be allocated to the left side of the 52-RU.

The example of Table 1 shows only some of RU locations that can be indicated by RU allocation information. For example, the RU allocation information may additionally include an example illustrated below in Table 2.

TABLE 2

| | | | | | | | | |
|---|---|---|---|---|---|---|---|---|
| 00010$y_2y_1y_0$ | 52 | | 52 | | — | 106 | | 8 |
| 00011$y_2y_1y_0$ | | 106 | | | — | 52 | 52 | 8 |
| 00100$y_2y_1y_0$ | 26 | 26 | 26 | 26 | 26 | 106 | | 8 |
| 00101$y_2y_1y_0$ | 26 | 26 | 52 | | 26 | 106 | | 8 |
| 00110$y_2y_1y_0$ | 52 | | 26 | 26 | 26 | 106 | | 8 |
| 00111$y_2y_1y_0$ | 52 | | 52 | | 26 | 106 | | 8 |
| 01000$y_2y_1y_0$ | | 106 | | | 26 | 26 | 26 26 26 | 8 |
| 01001$y_2y_1y_0$ | | 106 | | | 26 | 26 26 | 52 | 8 |
| 01010$y_2y_1y_0$ | | 106 | | | 26 | 52 | 26 26 | 8 |
| 01011$y_2y_1y_0$ | | 106 | | | 26 | 52 | 52 | 8 |
| 0110$y_1y_0z_1z_0$ | | 106 | | | — | 106 | | 16 |

"01000y2y1y0" relates to an example in which a 106-RU is allocated on the leftmost side of the 20 MHz channel, and five 26-RUs are allocated on the right side of the 106-RU. In this case, a plurality of STAs (e.g., user STAs) may be allocated to the 106-RU based on a MU-MIMO technique. Specifically, up to eight STAs (e.g., user STAs) may be allocated to the 106-RU, and the number of STAs (e.g., user STAs) allocated to the 106-RU is determined based on 3-bit information (y2y1y0). For example, when the 3-bit information (y2y1y0) is set to N, the number of STAs (e.g., user STAs) allocated to the 106-RU based on the MU-MIMO technique may be N+1.

Generally, a plurality of different STAs (e.g., user STAs) may be allocated to a plurality of RUs. However, a plurality of STAs (e.g., user STAs) may be allocated to one RU having a specific size (e.g., 106 subcarriers) or more based on the MU-MIMO technique.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (i.e., a total of nine user STAs may be allocated). That is, up to nine user STAs may be allocated to the specific channel through an OFDMA technique. In other words, up to nine user STAs may be allocated to the specific channel through a non-MU-MIMO technique.

For example, when RU allocation is set to "01000y2y1y0", a plurality of user STAs may be allocated to the leftmost 106-RU through the MU-MIMO technique, and five user STAs may be allocated to the five 26-RUs disposed on the right side through the non-MU-MIMO technique. A specific example is illustrated in FIG. 9.

Figure 9:
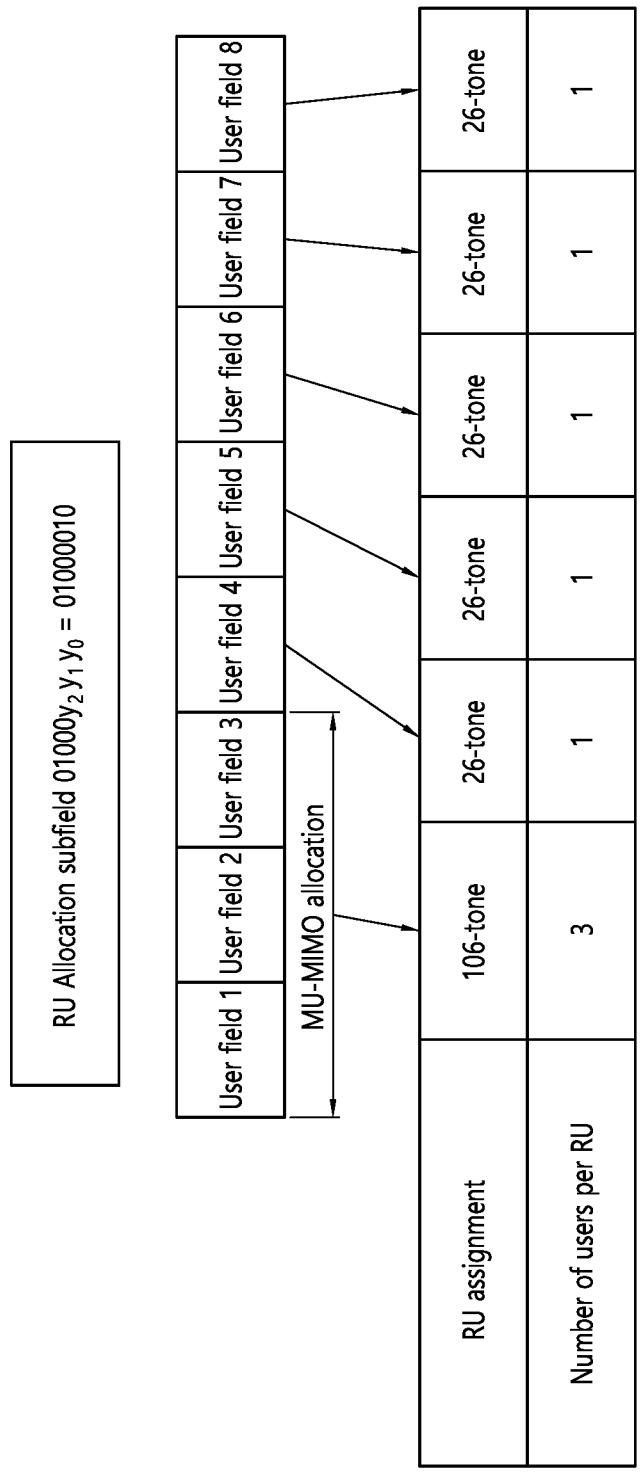
FIG. 9 illustrates an example in which a plurality of user STAs is allocated to the same RU through a MU-MIMO technique.

FIG. 9 illustrates an example in which a plurality of user STAs is allocated to the same RU through a MU-MIMO technique.

For example, when the RU allocation is set to "01000y2y1y0" as shown in FIG. 9, a 106-RU may be allocated on the leftmost side of a specific channel and five 26-RUs may be allocated on the right side of the 106-RU according to Table 2. A total of three user STAs may be allocated to the 106-RU through the MU-MIMO technique. As a result, since a total of eight user STAs are allocated, the user-specific field 830 of the HE-SIG-B may include eight user fields.

The eight user fields may be included in an order illustrated in FIG. 9. Further, as illustrated in FIG. 8, two user fields may be configured as one user block field.

The user fields illustrated in FIG. 8 and FIG. 9 may be configured based on two formats. That is, a user field related to the MU-MIMO technique may be configured in a first format, and a user field related to the non-MU-MIMO technique may be configured in a second format. Referring to the example of FIG. 9, user fields 1 to 3 may be based on the first format, and user fields 4 to 8 may be based on the second format.

The first format or the second format may include bit information having the same length (e.g., 21 bits).

Figure 10:
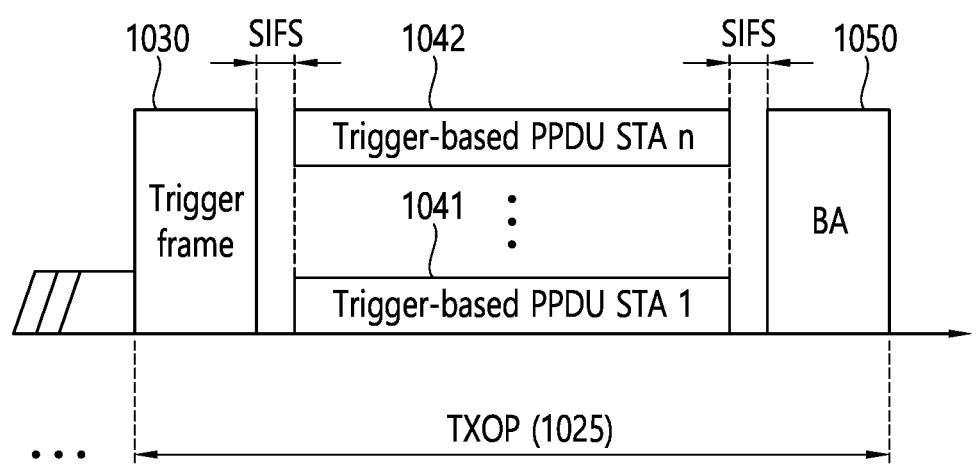
FIG. 10 illustrates a UL-MU operation.

FIG. 10 illustrates a UL-MU operation. As illustrated, a transmitting STA (e.g., an AP) may perform channel access through a contention (i.e., a backoff operation) and may transmit a trigger frame 1030. That is, the transmitting STA (e.g., the AP) may transmit a PPDU including the trigger frame 1330. When the PPDU including the trigger frame is received, a trigger-based (TB) PPDU is transmitted after a delay of SIFS.

TB PPDUs 1041 and 1042 may be transmitted in the same time period and may be transmitted from a plurality of STAs (e.g., user STAs) of which AIDs are indicated in the trigger frame 1030. An ACK frame 1050 of the TB PPDUs may be configured in various forms.

Specific features of a trigger frame are described with reference to FIG. 11 to FIG. 13. When UL-MU communication is used, an orthogonal frequency division multiple access (OFDMA) technique or a MU MIMO technique may also be used, or the OFDMA technique and the MU MIMO technique may be used simultaneously.

Figure 11:
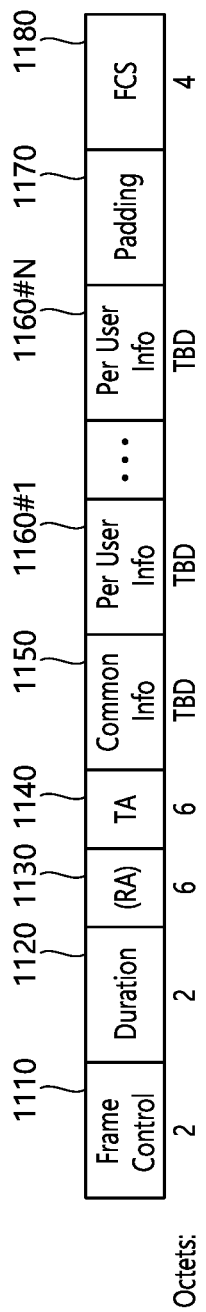
FIG. 11 illustrates an example of a trigger frame.

FIG. 11 illustrates an example of a trigger frame. The trigger frame illustrated in FIG. 11 allocates resources for uplink multiple-user (MU) transmission and may be transmitted, for example, from an AP. The trigger frame may be configured as a MAC frame and may be included in a PPDU.

Some fields illustrated in FIG. 11 may be omitted, and other fields may be added. The length of each illustrated field may be varied.

A frame control field 1110 shown in FIG. 11 may include information on a version of a MAC protocol and other additional control information, and a duration field 1120 may include time information for NAV setting or information on an identifier (e.g., AID) of a STA.

An RA field 1130 may include address information on a receiving STA of the trigger frame and may be optionally omitted. A TA field 1140 includes address information on an STA (e.g., AP) for transmitting the trigger frame, and a common information field 1150 includes common control information applied to the receiving STA for receiving the trigger frame. For example, a field indicating the length of an L-SIG field of an uplink PPDU transmitted in response to the trigger frame or information controlling the content of a SIG-A field (i.e., an HE-SIG-A field) of the uplink PPDU transmitted in response to the trigger frame may be included. Further, as the common control information, information on the length of a CP of the uplink PPDU transmitted in response to the trigger frame or information on the length of an LTF thereof may be included.

The trigger frame of FIG. 11 preferably includes per user information fields 1160 #1 to 1160 #N corresponding to the number of receiving STAs receiving the trigger frame of FIG. 11. A per user information field may also be referred to as an allocation field.

Further, the trigger frame of FIG. 11 may include a padding field 1170 and a sequence field 1180.

Each of the per user information fields 1160 #1 to 1160 #N illustrated in FIG. 11 may include a plurality of subfields.

Figure 12:
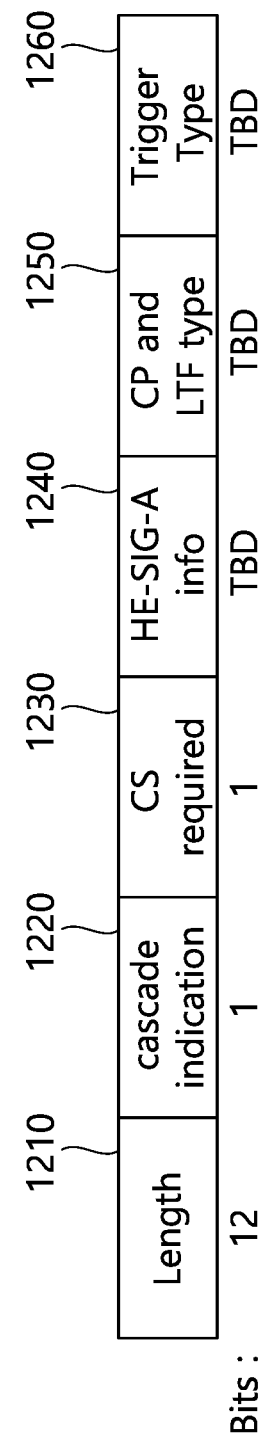
FIG. 12 illustrates an example of a common information field of the trigger frame.

FIG. 12 illustrates an example of a common information field included in a trigger frame. Some subfields illustrated in FIG. 12 may be omitted, and other subfields may be added. The length of each illustrated subfield may be varied.

A length field 1210 has that same value as a length field of an L-SIG field of an uplink PPDU, which is transmitted in response to the trigger frame, and the length field of the L-SIG field of the uplink PPDU indicates the length of the uplink PPDU. As a result, the length field 1210 of the trigger frame may be used to indicate the length of the corresponding uplink PPDU.

A cascade indicator field 1220 indicates whether a cascade operation is performed. A cascade operation means that both downlink MU transmission and uplink MU transmission are performed within the same TXOP, that is, downlink MU transmission is performed, and then uplink MU transmission is performed after a preset period of time (e.g., SIFS). In the cascade operation, only one transmission device performing downlink communication (e.g., AP) may exist, and a plurality of transmission devices performing uplink communication (e.g., non-AP) may exist.

A CS request field 1230 indicates whether the status or NAV of a wireless medium is required to be considered in a situation where a reception device receiving the trigger frame transmits a corresponding uplink PPDU.

An HE-SIG-A information field 1240 may include information controlling the content of a SIG-A field (i.e., HE-SIG-A field) of the uplink PPDU transmitted in response to the trigger frame.

A CP and LTF type field 1250 may include information on an LTF length and a CP length of the uplink PPDU transmitted in response to the trigger frame. A trigger type field 1060 may indicate a purpose of the trigger frame, for example, general triggering, triggering for beamforming, a request for a block ACK/NACK, or the like.

In the present specification, it may be assumed that the trigger type field 1260 of the trigger frame indicates a trigger frame of a basic type for general triggering. For example, a trigger frame of a basic type may be referred to as a basic trigger frame.

Figure 13:
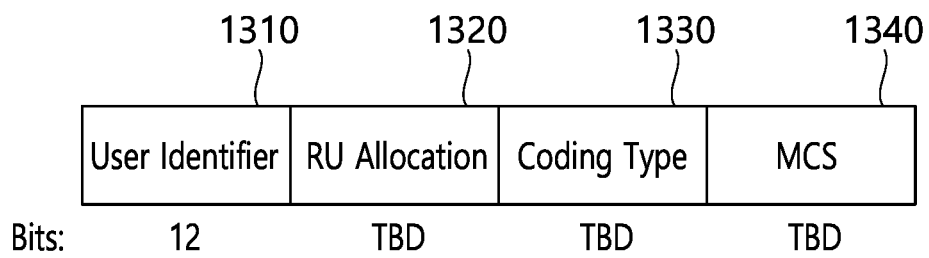
FIG. 13 illustrates an example of a subfield included in a per user information field.

FIG. 13 illustrates an example of a subfield included in a per user information field. The per user information field 1300 in FIG. 13 may be understood as one of the per user information fields 1160 #1 to 1160 #N illustrated above in FIG. 11. Some subfields included in the per user information field 1300 in FIG. 13 may be omitted, and other subfields may be added. The length of each illustrated subfield may be varied.

A user identifier field 1310 of FIG. 13 indicates an identifier of an STA (i.e., a receiving STA) which corresponds to the per user information, and an example of the identifier may be the entirety or part of an association identifier (AID) of the receiving STA.

An RU allocation field 1320 may be included in the per user information field. Specifically, when the receiving STA, which is identified by the user identifier field 1310, transmits a TB PPDU in response to the trigger frame, the STA transmits the TB PPDU via an RU indicated by the RU allocation field 1320. In this case, the RU indicated by the RU allocation field 1320 may be the RU illustrated in FIG. 5, FIG. 6, or FIG. 7.

A subfield of FIG. 13 may include a coding type field 1330. The coding type field 1330 may indicate the coding type of the TB PPDU. For example, when BBC coding is applied to the TB PPDU, the coding type field 1330 may be set to 1. When LDPC coding is applied to the TB PPDU, the coding type field 1330 may be set to 0.

The subfield of FIG. 13 may include a MCS field 1340. The MCS field 1340 may indicate a MCS technique applied to the TB PPDU. For example, when BCC coding is applied to the TB PPDU, the coding type field 1330 may be set to 1. When LDPC coding is applied to the TB PPDU, the coding type field 1330 may be set to 0.

Hereinafter, a UL OFDMA-based random access (UORA) technique will be described.

Figure 14:
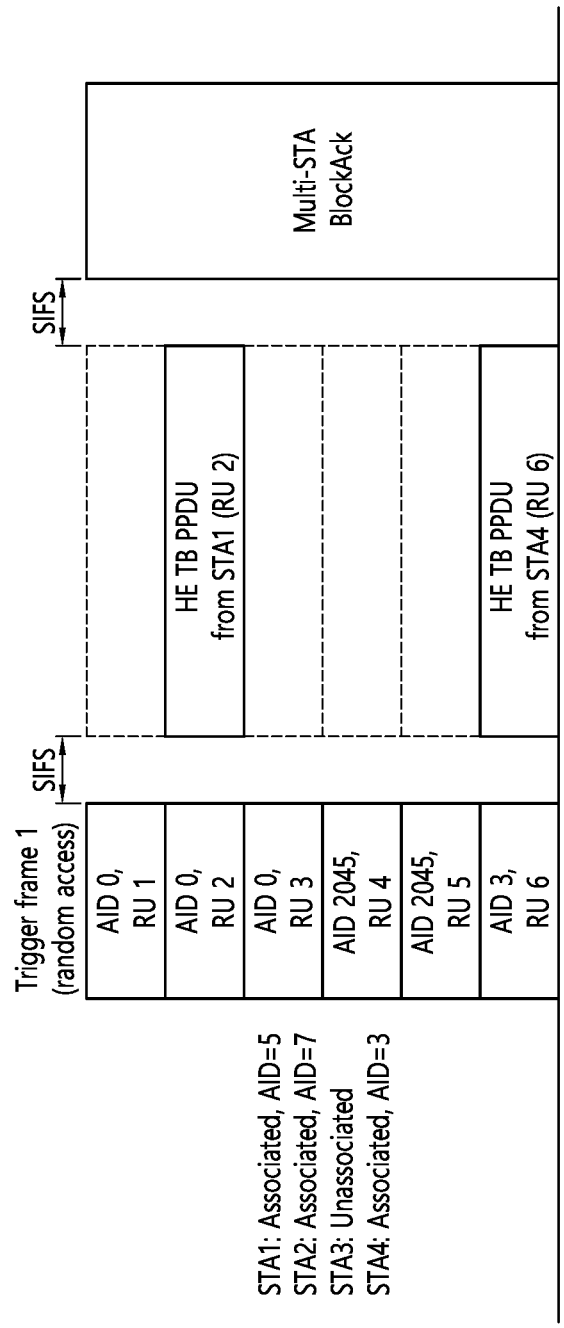
FIG. 14 illustrates technical characteristics of a UROA technique.

FIG. 14 illustrates technical characteristics of a UROA technique.

As illustrated in FIG. 14, a transmitting STA (e.g., an AP) may allocate six RU resources through a trigger frame. Specifically, the AP may allocate a first RU resource (AID 0, RU 1), a second RU resource (AID 0, RU 2), a third RU resource (AID 0, RU 3), a fourth RU resource (AID 2045, RU 4), a fifth RU resource (AID 2045, RU 5), and a sixth RU resource (AID 3, RU 6). Information on AID 0, AID 3, or AID 2045 may be included, for example, in the user identifier field 1310 of FIG. 13. Information on RU 1 to RU 6 may be included, for example, in the RU allocation field 1320 of FIG. 13. AID=0 may refer to a UORA resource for an associated STA, and AID=2045 may refer to a UORA resource for an unassociated STA. Accordingly, the first to third RU resources of FIG. 14 may be used as UORA resources for the associated STA, the fourth and fifth RU resources of FIG. 14 may be used as UORA resources for the unassociated STA, and the sixth RU resource of FIG. 14 may be used as a resource for a normal UL MU.

In the example of FIG. 14, as the OFDMA random access backoff (OBO) counter of STA1 is reduced to 0, STA1 randomly selects the second RU resource (AID 0, RU 2). In addition, since the OBO counter of STA2/3 is greater than 0, no uplink resource is allocated to STA2/3. Further, in FIG. 14, since the AID (i.e., AID=3) of STA 4 is included in the trigger frame, STA4 is allocated RU 6 without a backoff.

Specifically, since STA1 of FIG. 14 is an associated STA, there are a total of three eligible RA RUs (RU 1, RU 2, and RU 3) for STA1. Thus, STA1 has reduced the OBO counter by 3, so that the OBO counter is 0. Since STA2 of FIG. 14 is an associated STA, there are a total of three eligible RA RUs (RU 1, RU 2, and RU 3) for STA2. Thus, STA2 has reduced the OBO counter by 3, but the OBO counter is greater than 0. Since STA3 of FIG. 14 is an unassociated STA, there are a total of two eligible RA RUs (RU 4 and RU 5) for STA3. Thus, STA3 has reduced the OBO counter by 2, but the OBO counter is greater than 0.

Figure 15:
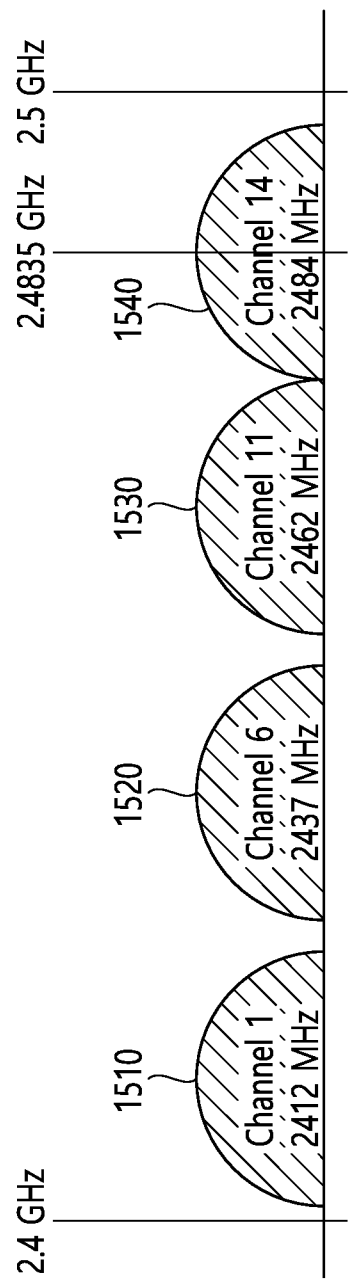
FIG. 15 illustrates an example of a channel used/supported/defined in a 2.4 GHz band.

FIG. 15 illustrates an example of a channel used/supported/defined in a 2.4 GHz band.

The 2.4 GHz band may be referred to as a different term, such as a first band (bandwidth). The 2.4 GHz band may refer to a frequency range in which channels having a center frequency adjacent to 2.4 GHz (e.g., channels having a center frequency ranging from 2.4 to 2.5 GHz) are used/supported/defined.

The 2.4 GHz band may include a plurality of 20 MHz channels. 20 MHz in the 2.4 GHz band may have a plurality of channel indexes (e.g., index 1 to index 14). For example, a 20 MHz channel that is allocated channel index 1 may have a center frequency of 2.412 GHz, a 20 MHz channel that is allocated channel index 2 may have a center frequency of 2.417 GHz, and a 20 MHz channel that is allocated channel index N may have a center frequency of 2.407+0.005*N GHz. A channel index may be referred to by various terms, such as a channel number. Specific values of a channel index and a center frequency may be changed.

FIG. 15 illustrates four channels in the 2.4 GHz band. Each of a first frequency range 1510 to a fourth frequency range 1540 that are illustrated may include one channel. For example, the first frequency range 1510 may include channel 1 (a 20 MHz channel having index 1). The center frequency of channel 1 may be set to 2412 MHz. A second frequency range 1520 may include channel 6. The center frequency of channel 6 may be set to 2437 MHz. A third frequency range 1530 may include channel 11. The center frequency of channel 11 may be set to 2462 MHz. The fourth frequency range 1540 may include channel 14. The center frequency of channel 14 may be set to 2484 MHz.

Figure 16:
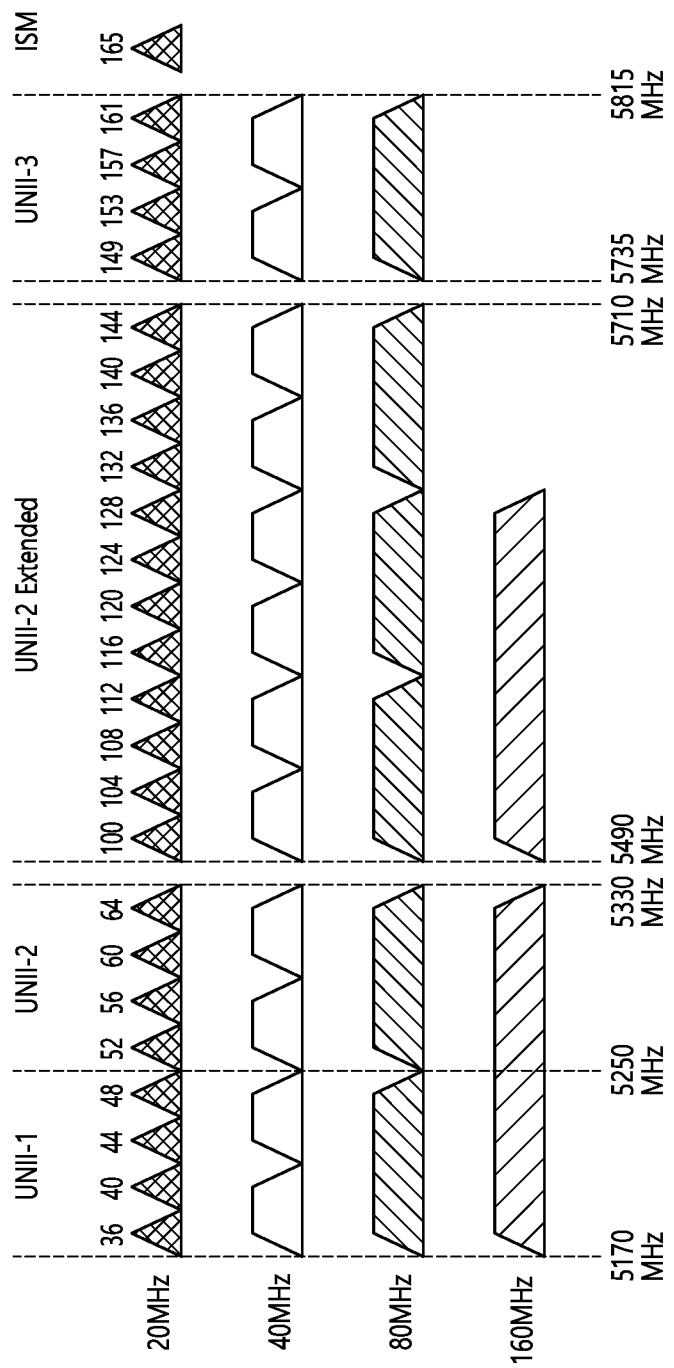
FIG. 16 illustrates an example of a channel used/supported/defined in a 5 GHz band.

FIG. 16 illustrates an example of a channel used/supported/defined in a 5 GHz band.

The 5 GHz band may be referred to as a different term, such as a second band/bandwidth. The 5 GHz band may refer to a frequency range in which channels having a center frequency of 5 GHz or more and less than 6 GHz (or less than 5.9 GHz) are used/supported/defined. Alternatively, the 5 GHz band may include a plurality of channels between 4.5 GHz and 5.5 GHz. Specific numerical values illustrated in FIG. 16 may be changed.

The plurality of channels in the 5 GHz band includes Unlicensed National Information Infrastructure (UNII)-1, UNII-2, UNII-3, and ISM. UNII-1 may be referred to as UNII Low. UNII-2 may include frequency ranges referred to as UNII Mid and UNII-2 Extended. UNII-3 may be referred to as UNII-Upper.

The plurality of channels may be configured in the 5 GHz band, and the bandwidth of each channel may be variously set to 20 MHz, 40 MHz, 80 MHz, or 160 MHz. For example, a frequency range/area of 5170 MHz to 5330 MHz in UNII-1 and UNII-2 may be divided into eight 20 MHz channels. The frequency range/area of 5170 MHz to 5330 MHz may be divided into four channels according to a 40 MHz frequency range. The frequency range/area of 5170 MHz to 5330 MHz may be divided into two channels according to an 80 MHz frequency range. Alternatively, the frequency range/area of 5170 MHz to 5330 MHz frequency domain/range may be divided into one channel according to a 160 MHz frequency range.

Figure 17:
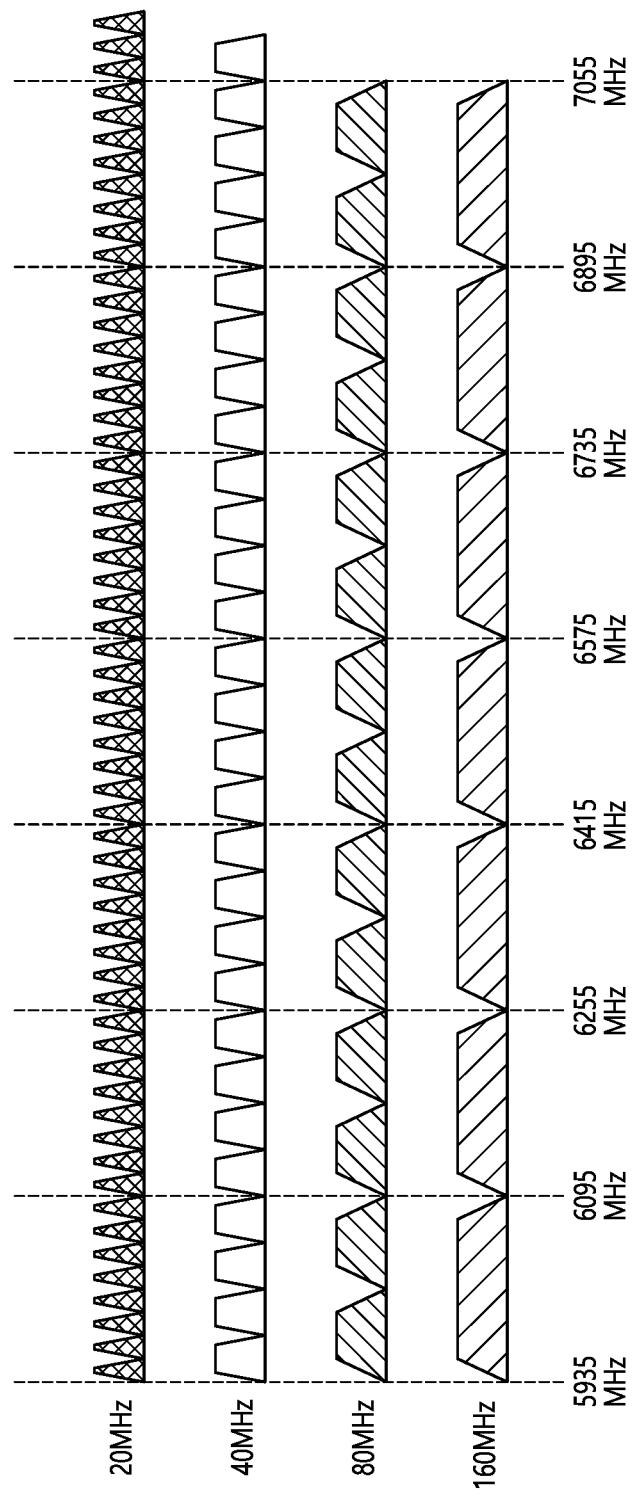
FIG. 17 illustrates an example of a channel used/supported/defined in a 6 GHz band.

FIG. 17 illustrates an example of a channel used/supported/defined in a 6 GHz band.

The 6 GHz band may be referred to as a different term, such as a third band/bandwidth. The 6 GHz band may refer to a frequency range in which channels having a center frequency of 5.9 GHz or more are used/supported/defined. Specific numerical values illustrated in FIG. 17 may be changed.

For example, a 20 MHz channel of FIG. 17 may be defined from 5.940 GHz. Specifically, a leftmost channel of 20 MHz channels of FIG. 17 may have index (or channel index, channel number, or the like) 1 and may be allocated a center frequency of 5.945 GHz. That is, the center frequency of a channel having index N may be determined to be 5.940+0.005*N GHz.

Accordingly, the indexes (or channel numbers) of the 20 MHz channels of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, and 233. Further, the indexes (or channel numbers) of 40 MHz channels of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, and 227 according to the foregoing rule of 5.940+0.005*N GHz.

Although 20, 40, 80, and 160 MHz channels are illustrated in the example of FIG. 17, a 240 MHz channel or a 320 MHz channel may be further added.

Hereinafter, a PPDU transmitted/received by a STA according to the present disclosure will be described.

FIG. 18 illustrates an example of a PPDU used in the present disclosure.

The PPDU of FIG. 18 may be referred to as various terms, such as an EHT PPDU, a transmission PPDU, a reception PPDU, a first-type PPDU, or an Nth-type PPDU. The PPDU may be used in an EHT system and/or in a new WLAN system evolving from the EHT system.

Subfields of FIG. 18 may be changed to various terms. For example, a SIG A field may be referred to as an EHT-SIG-A field, a SIG B field may be referred to as an EHT-SIG-B field, an STF may be referred to as an EHT-STF, and an LTF may be referred to as an EHT-LTF.

In FIG. 18, subcarrier spacing for an L-LTF, an L-STF, an L-SIG field, and an RL-SIG field may be set to 312.5 kHz, and subcarrier spacing for an STF, an LTF, and a data field may be set to 78.125 kHz. That is, the subcarrier indexes of the L-LTF, the L-STF, the L-SIG field, and the RL-SIG field may be expressed in units of 312.5 kHz, and the subcarrier indexes of the STF, the LTF, and the data field may be expressed in units of 78.125 kHz.

The SIG A field and/or the SIG B field of FIG. 18 may include an additional field (e.g., a SIG C or one control symbol field). Subcarrier spacing for all/some of the SIG A field and the SIG B field may be set to 312.5 kHz, and subcarrier spacing for the remaining thereof may be set to 78.125 kHz.

In the PPDU of FIG. 18, the L-LTF and the L-STF may be the same as the existing fields.

The L-SIG field of FIG. 18 may include, for example, 24-bit bit information. For example, the 24-bit information may include a 4-bit rate field, a 1-bit reserved bit, a 12-bit length field, a 1-bit parity bit, and a 6-bit tail bit. For example, the 12-bit length field may include information on the number of octets of a physical service data unit (PSDU). For example, the value of the 12-bit length field may be determined based on the type of the PPDU. For example, when the PPDU is a non-HT PPDU, HT, VHT, or EHT PPDU, the value of the length field may be determined as a multiple of 3. For example, when the PPDU is an HE PPDU, the value of the length field may be determined as a multiple of 3+1 or a multiple of 3+2. That is, the value of the length field may be determined as a multiple of 3 for a non-HT, HT, VHT, or EHT PPDU, and the value of the length field may be determined as a multiple of 3+1 or a multiple of 3+2 for an HE PPDU.

For example, a transmitting STA may apply BCC encoding based on a code rate of 1/2 to the 24-bit information of the L-SIG field. Subsequently, the transmitting STA may obtain a 48-bit BCC coded bit. BPSK modulation may be applied to the 48-bit coded bits, thereby generating 48 BPSK symbols. The transmitting STA may map the 48 BPSK symbols to positions excluding pilot subcarriers {subcarrier indexes −21, −7, +7, and +21} and a DC subcarrier {subcarrier index 0}. As a result, the 48 BPSK symbols may be mapped to subcarrier indexes −26 to −22, −20 to −8, −6 to −1, +1 to +6, +8 to +20, and +22 to +26. The transmitting STA may additionally map a signal of {−1, −1, −1, 1} to the subcarrier index {−28, −27, +27, 28}. The signal may be used for channel estimation in a frequency range corresponding to {−28, −27, +27, 28}.

The transmitting STA may generate the RL-SIG, which is generated to be the same as the L-SIG. BPSK modulation is applied to the RL-SIG. A receiving STA may know that the received PPDU is an HE PPDU or an EHT PPDU based on the presence of the RL-SIG.

After the RL-SIG of FIG. 18, for example, an EHT-SIG-A or one control symbol may be inserted. The symbol (i.e., EHT-SIG-A or one control symbol) subsequent to the RL-SIG may include 26-bit information and may include information for identifying the type of the EHT PPDU. For example, when an EHT PPDU is classified as various types (e.g., an EHT PPDU supporting a SU, an EHT PPDU supporting a MU, an EHT PPDU related to a trigger frame, an EHT PPDU related to extended range transmission, and the like), information on the type of the EHT PPDU may be included in the symbol subsequent to the RL-SIG.

The symbol subsequent to the RL-SIG may include, for example, information on the length of a TXOP and information on a BSS color ID. For example, the SIG-A field may be configured subsequent to the symbol (e.g., one control symbol) subsequent to the RL-SIG. Alternatively, the symbol subsequent to the RL-SIG may be the SIG-A field.

The SIG-A field may include, for example, 1) a DL/UL indicator, 2) a BSS color field, which is an identifier of a BSS, 3) a field including information on the remaining time of the current TXOP, 4) a bandwidth field including information on a bandwidth, 5) a field including information on a MCS applied to the SIG-B, 6) an indication field including information related to whether a dual subcarrier modulation scheme is applied to the SIG-B, 7) a field including information on the number of symbols used for the SIG-B, 8) a field including information on whether the SIG-B is generated across the entire band, 9) a field including information on the type of the LTF/STF, and 10) information on a field indicating the length of the LTF and the length of a CP.

The STF of FIG. 18 may be used to improve automatic gain control estimation in a multiple-input multiple-output (MIMO) environment or an OFDMA environment. The LTF of FIG. 18 may be used to estimate a channel in a MIMO environment or an OFDMA environment.

The STF of FIG. 18 may be configured in various types. For example, a first type of the STF (i.e., 1×STF) may be generated based on a first-type STF sequence in which non-zero coefficients are disposed at an interval of 16 subcarriers. An STF signal generated based on the first-type STF sequence may have a period of 0.8 μs, and the signal having the period of 0.8 μs may be repeated five times into a first-type STF having a length of 4 μs. For example, a second type of the STF (i.e., 2×STF) may be generated based on a second-type STF sequence in which non-zero coefficients are disposed at an interval of eight subcarriers. An STF signal generated based on the second-type STF sequence may have a period of 1.6 μs, and the signal having the period of 1.6 μs may be repeated five times into a second-type EHT-STF having a length of 8 μs. For example, a third type of the STF (i.e., 4×EHT-STF) may be generated based on a third-type STF sequence in which non-zero coefficients are disposed at an interval of 4 subcarriers. An STF signal generated based on the third-type STF sequence may have a period of 3.2 μs, and the signal having the period of 3.2 μs may be repeated five times into a third-type EHT-STF having a length of 16 μs. Only some of the first to third-type EHT-STF sequences may be used. The EHT-LTF may have first, second, and third types (i.e., 1×LTF, 2×LTF, and 4×LTF). For example, the first/second/third-type LTF may be generated based on an LTF sequence in which non-zero coefficients are disposed at an interval of 4/2/1 subcarriers. The first/second/third-type LTF may have a time length of 3.2/6.4/12.8 µs. Further, GIs having various lengths (e.g., 0.8/1/6/3.2 µs) may be applied to the first/second/third-type LTF.

Information on the type of the STF and/or the LTF (including information on a GI applied to the LTF) may be included in the SIG A field and/or the SIG B field of FIG. 18.

The PPDU of FIG. 18 may be identified as an EHT PPDU based on the following method.

The receiving STA may determine the type of the received PPDU as an EHT PPDU based on the following. For example, when 1) a first symbol after the L-LTF signal of the received PPDU is BPSK, 2) the RL-SIG in which the L-SIG of the received PPDU is repeated is detected, and 3) it is detected that the length of the L-SIG of the received PPDU modulo 3 is 0, the received PPDU may be determined as an EHT PPDU. When the received PPDU is determined as an EHT PPDU, the receiving STA may detect the type (e.g., SU/MU/trigger-based/extended range type) of the EHT PPDU based on the bit information included in the symbol after the RL-SIG of FIG. 18. That is, the receiving STA may determine the received PPDU as an EHT PPDU based on 1) the first symbol after the L-LTF signal, which is BSPK, 2) the RL-SIG that is subsequent to the L-SIG field and is the same as the L-SIG, and 3) the L-SIG including a length field set to 0 as a result of the length modulo 3.

For example, the receiving STA may determine the type of the received PPDU as an HT PPDU based on the following. For example, when 1) the first symbol after the L-LTF signal is BPSK, 2) the RL-SIG in which the L-SIG is repeated is detected, and 3) it is detected that the length of the L-SIG modulo 3 is 1 or 2, the received PPDU may be determined as an HT PPDU.

For example, the receiving STA may determine the type of the received PPDU as a non-HT, HT, or VHT PPDU based on the following. For example, when 1) the first symbol after the L-LTF signal is BPSK, 2) the RL-SIG in which the L-SIG is repeated is not detected, and 3) it is detected that the length of the L-SIG modulo 3 is 0, the received PPDU may be determined as a non-HT, HT, or VHT PPDU.

1. LTF Sequence (or LTF Signal)

Figure 19:
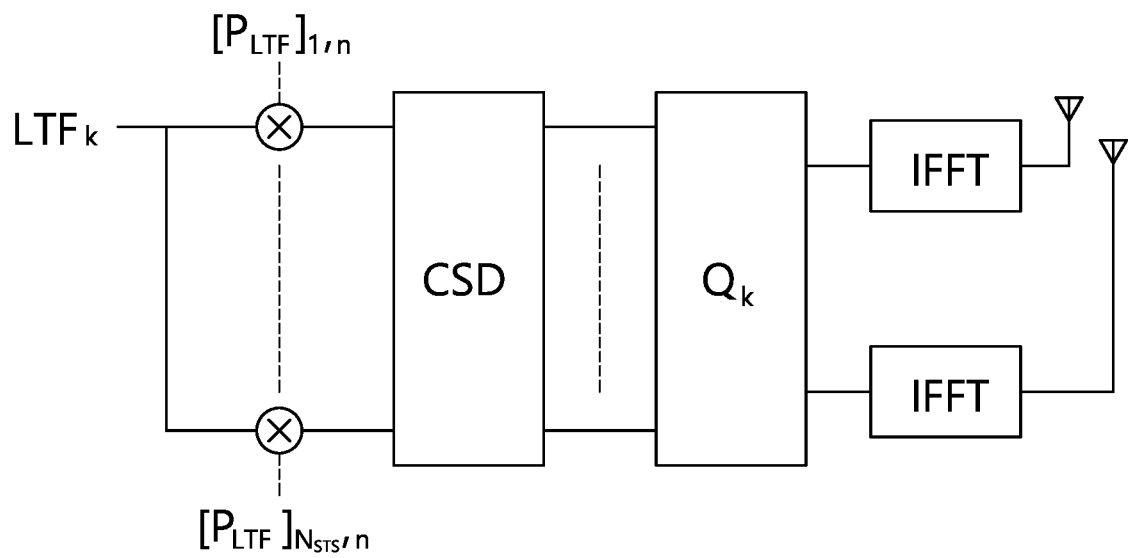
FIG. 19 describes a scheme of generating an LTF signal according to the conventional technique.

FIG. 19 describes a scheme of generating an LTF signal according to the conventional technique.

An example of FIG. 19 is based on a high throughput (HT) system, i.e., an IEEE 802.11n system. However, the example of FIG. 19 may also equally apply to a VHT/HE/EHT (e.g., IEEE 802.11ac/ax/be) system. In addition, the example of FIG. 19 also equally applies to a next-generation WiFi standard called in various names. Accordingly, an example of the present specification is not limited to the name EHT.

The LTF signal of FIG. 19 includes a plurality of LTF symbols. The plurality of LTF symbols are generated based on an LTF generation sequence. The LTF generation sequence may be expressed by $LTF_k$ (or LTF_k). The LTF generation sequence $LTF_k$ may be multiplied to an LTF mapping matrix $P_{LTF}$ by a transmitting STA. The LTF mapping matrix may be called an orthogonal matrix since it may include rows orthogonal to each other, and may be simply called a P matrix or a mapping matrix.

The orthogonal matrix $P_{LTF}$ may be applied to the LTF generation sequence. The "application" may imply a mathematical multiplication. The LTF generation sequence to which the P matrix is applied has orthogonality for each stream, and thus may be used for channel estimation (i.e., channel estimation for a MIMO channel) in a receiving STA.

A cyclic shift delay (CSD) process for preventing unintended beamforming may be applied to the LTF generation sequence to which the P matrix is applied, and the LTF generation sequence may be mapped to a transmit antenna by using an antenna mapping matrix $Q_k$ for a k-th subcarrier. The $Q_k$ plays a role of mapping a space time stream (STS) and a transmit chain. The LTF generation sequence mapped to each transmit chain may be subjected to inverse fast Fourier transform (IFFT) or IDFT and then transmitted through the transmit antenna. In the present specification, the IFFT operation may be replaced with the IDFT operation.

Figure 20:
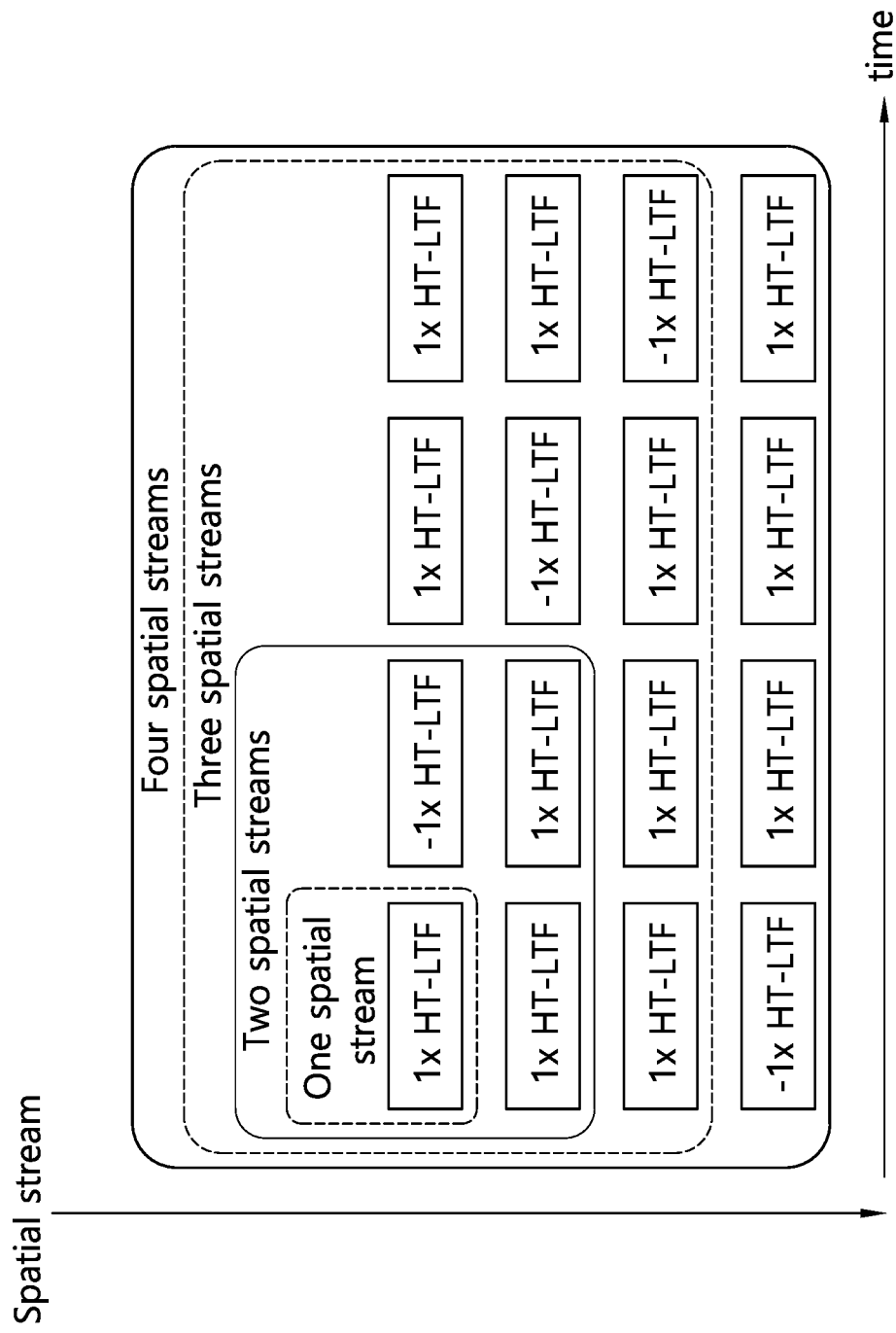
FIG. 20 illustrates the concept of configuring an LTF symbol, based on the conventional HTLTF generation sequence.

FIG. 20 illustrates the concept of configuring an LTF symbol, based on the conventional HTLTF generation sequence.

In an example of FIG. 20, a horizontal axis represents a time axis, and a vertical axis represents a stream (STS). That is, in the example of FIG. 20, the horizontal axis may represent the number of HTLTF symbols (e.g., the number of OFDM symbols), and the vertical axis may represent the number of supported streams.

When a pre-set LTF generation sequence (e.g., HTLTF generation sequence) is applied to the P matrix by the transmitting STA (i.e., when the P matrix is multiplied or applied to the LTF generation sequence according to the example of FIG. 19), the transmitting STA may configure the LTF symbol as shown in the example of FIG. 20.

The P matrix applied to FIG. 20 may be expressed by P_HTLTF, and may be as follows.

$$P_{HTLTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad [\text{Equation 1}]$$

Similarly to the example of FIG. 20, an LTF symbol (training symbol) may be defined on a stream (i.e., STS) basis, and may be transmitted for channel estimation of each spatial stream. For example, when the number of spatial streams is 1, 2, and 4, the number of LTF symbols to be transmitted may be 1, 2, and 4, respectively, whereas when the number of spatial streams is 3, one extra long training symbol may be used so that four LTFs can be used.

When the P matrix is applied to the pre-set LTF generation sequence as shown in FIG. 20, the receiving STA may perform channel estimation through an LTF symbol. That is, when a structure of the P matrix is pre-known between the transmitting/receiving STAs, the receiving STA may perform channel estimation according to the conventional various methods. In other words, when the structure of the P matrix is defined, the method of performing channel estimation through the LTF symbol to which the P matrix is applied may be easily implemented by those ordinarily skilled in the art.

For example, when the P matrix is determined as shown in Equation 2 below and when the LTF generation sequence to which the P matrix is applied is the conventional HTLTF generation sequence, channel estimation in the receiving STA may be performed by the following example.

$$\begin{bmatrix} 1 & -1 \\ 1 & 1 \end{bmatrix} \quad [\text{Equation 2}]$$

Specifically, an LTF symbol received in the receiving STA may be as shown Equation 3.

$$\begin{bmatrix} r_1(t) \\ r_2(t) \end{bmatrix} = \begin{bmatrix} h_{11} & h_{12} \\ h_{21} & h_{22} \end{bmatrix} \begin{bmatrix} P_1(t) \\ P_2(t) \end{bmatrix} + \begin{bmatrix} n_1(t) \\ n_2(t) \end{bmatrix} \begin{pmatrix} P_1(t_1) = HTLTF \\ P_1(t_2) = -HTLTF \\ P_2(t_1) = HTLTF \\ P_2(t_2) = HTLTF \end{pmatrix}$$ [Equation 3]

Herein, $h_{nm}$ denotes a channel between an n-th antenna of a transmitter and an m-th antenna of a receiver. $P_n(t)$ denotes a training symbol transmitted from the n-th antenna of the transmitter. $n_m(t)$ denotes an additive white Gaussian noise (AWGN) experienced by the m-th antenna of the receiver. If Equation 3 is rearranged by substituting the training symbol, Equation 4 can be obtained as follows.

$$\begin{bmatrix} r_1(t_1) \\ r_2(t_1) \\ r_1(t_2) \\ r_2(t_2) \end{bmatrix} = \begin{bmatrix} h_{11} \times HTLTF + h_{12} \times HTLTF + n_1(t_1) \\ h_{21} \times HTLTH + h_{22} \times HTLTF + n_2(t_2) \\ -h_{11} \times HTLTF + h_{12} \times HTLTF + n_1(t_2) \\ -h_{21} \times HTLTF + h_{22} \times HTLTF + n_2(t_2) \end{bmatrix}$$ [Equation 4]

In Equation 4, $h_{nm}$ is obtained for all n and m as shown in Equation 5.

$$h_{11} = \frac{r_1(t_1) - r_1(t_2)}{2 \times HTLTF}$$ [Equation 5]

$$h_{12} = \frac{r_1(t_1) + r_1(t_2)}{2 \times HTLTF}$$

$$h_{21} = \frac{r_2(t_1) - r_2(t_2)}{2 \times HTLTF}$$

$$h_{22} = \frac{r_2(t_1) + r_2(t_2)}{2 \times HTLTF}$$

That is, when the structure of the P matrix is defined, the receiving STA may perform channel estimation based on the LTF symbol to which the P matrix is applied. Although the aforementioned example is an example to which the example of Equation 2 is applied, even if an orthogonal matrix of various sizes is applied instead of the example of Equation 2, the receiving STA can obtain $h_{nm}$, based on the conventional algorithm.

Accordingly, hereinafter, for convenience of explanation, the structure of the P matrix is clearly defined, but a description on a specific equation for performing channel estimation based on the LTF generation sequence to which the P matrix is applied is omitted.

A P matrix structure supporting up to 8 streams has been proposed in the conventional IEEE 802.11ac and 11ax system. For example, the P matrix of Equation 2 has been used for one to four streams. In addition, in the conventional WLAN system, one LTF symbol has been generated if the total number of STSs is 1, two LTF symbols have been generated if the total number of STSs is 2, and four LTF symbols have been generated if the total number of STSs is 3 or 4.

In addition, if the total number of streams is 5 or 6, Equation 6 below may be used.

$$P_{6 \times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}$$ [Equation 6]

$w = \exp(-j*2pi/6)$.

For reference, pi means π in the present specification.

In addition, in the conventional WLAN system, 6 LTF symbols have been generated if the total number of STSs is 5 or 6. In addition, if the total number of streams is 7 or 8, Equation 7 below may be used.

$$P = \begin{bmatrix} P_{4 \times 4} & P_{4 \times 4} \\ P_{4 \times 4} & -P_{4 \times 4} \end{bmatrix}$$ [Equation 7]

$$P_{4 \times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

In addition, in the conventional WLAN system, 8 LTF symbols have been generated if the total number of STSs is 7 or 8.

As described above, in the conventional WLAN system, LTF symbols have been generated in such a manner that the P matrix is applied (or multiplied) to an LTF sequence (e.g., HT/VHT/HE) sequence. Such a characteristic may also be equally applied to an embodiment of the present specification.

Hereinafter, an example of applying the P matrix is described.

FIG. 21 illustrates an example in which a P matrix is applied to an LTF sequence.

An LTF generation sequence LTF_k may be defined as a bit sequence. For example, it may be defined as LTF_k={LTF sub1, LTF sub2, LTF sub3, . . . , LTF subK}. That is, LTF_k may include K elements. That is, an LTF sub1 to an LTF subK may be expressed by complex values. Each element may correspond to various frequency bands such as 20, 40, 80, 80+80, 160, 240, 160+160, 320 MHz, or the like. For example, each element of the LTF_k may be set based on a pre-set subcarrier frequency spacing. For example, if the subcarrier frequency spacing is set to 78.125 kHz, each element of the LTF_k may be mapped to a frequency band in unit of 78.125 kHz (i.e., each element of the LTF_k is mapped at a spacing of 78.125 kHz). The subcarrier frequency spacing may be set to 312.5/N kHz (where N is any integer).

As shown in FIG. 21, the P mapping matrix may be applied to the LTF generation sequence. That is, the P matrix may be multiplied to the LTF generation sequence. The operation of FIG. 21 may be performed by a transmitting STA which transmits the LTF symbol.

The P mapping matrix may be configured variously. A 2-by-2 matrix illustrated is used in the example of FIG. 21. The mapping matrix of FIG. 21 may include four elements, and each element may have a complex value.

$$P = \begin{bmatrix} A_{11} & A_{12} \\ A_{21} & A_{22} \end{bmatrix} \quad \text{[Equation 8]}$$

When the P mapping matrix is applied to the LTF generation sequence LTF_k, an LTF symbol/signal multiplied by the P mapping matrix may be generated as illustrated.

That is, as illustrated, the LTF symbol/signal may be transmitted through two OFDM symbols 930 and 940, and correspond to two streams 910 and 920. For example, the LTF signal for the first stream 910 may be transmitted to a first receiving STA, and the LTF signal for the second stream 920 may be transmitted to a second receiving STA (or the first receiving STA). Only part of the generated LTF signal may be used. For example, the LTF signal corresponding to only the first stream 910 or the second stream 920 may be transmitted. In other words, only some rows of the P mapping matrix may be used. That is, only part of the P mapping matrix may be used/applied in the transmitting STA, and as a result, the transmitting STA may transmit the LTF symbol through only the first stream 901 or the second stream 920.

The example of FIG. 21 may also be applied directly when the P mapping matrix is extended to an N-by-N matrix (N>2). In addition, only part of the N-by-N matrix may be used/applied according to the number of streams used in the transmitting STA. That is, the number of rows used/applied in practice among all rows of the P mapping matrix may be equal to the total number of streams used in the transmitting STA. For example, the example of FIG. 21 may be applied directly to an 8-by-8 P matrix, and if the total number of streams used in the transmitting STA is 7, only 7 rows (e.g., first 7 rows from the top) of the 8-by-8 matrix may be used.

The number of columns of the P mapping matrix may correspond to the number of LTF symbols to be generated. That is, when the transmitting STA applies only some columns of the P mapping matrix to the LTF generation sequence, the number of applied columns of the P matrix may be equal to the number of generated LTF symbols. One LTF symbol may be transmitted during a pre-set time (e.g., 4 us), and may be transmitted through one OFDM symbol.

The present specification proposes a scheme of generating an LTF symbol included in a PPDU of a new format. The conventional IEEE 802.11ax system supports up to 8 streams. The present specification proposes a transmission/reception scheme supporting an increased number of streams to increase a peak throughput. For example, the scheme according to the present specification may support up to 16 streams.

The LTF signal/symbol/sequence generated based on the present specification may be called an EHT-LTF signal/symbol/sequence. However, since the term EHT may be changed, the example of the present specification is not limited to the term EHT.

The HE-LTF sequence defined in 802.11ax is as follows.

1×HE-LTF, 2×HE-LTF, and 4×HE-LTF sequences transmitted in a 20 MHz band are as follows.

In a 20 MHz transmission, the 1×HE-LTF sequence transmitted on subcarriers [−122: 122] is given by Equation (27-41).

$HELTF_{-122,122} =$ (27-41)

$\{0, 0, -1, 0, 0, 0, +1, 0, 0, 0, +1, 0, 0, 0, -1, 0, 0, 0, +1, 0, 0,$ $0, -1, 0, 0, 0, +1, 0, 0, 0, +1, 0, 0, 0, +1, 0, 0, 0, +1, 0, 0,$ $0, -1, 0, 0, 0, -1, 0, 0, 0, +1, 0, 0, 0, +1, 0, 0, 0, +1, 0, 0,$ $0, -1, 0, 0, 0, -1, 0, 0, 0, -1, 0, 0, 0, +1, 0, 0, 0, -1, 0, 0,$ $0, -1, 0, 0, 0, +1, 0, 0, 0, +1, 0, 0, 0, -1, 0, 0, 0, -1, 0, 0,$ $0, +1, 0, 0, 0, +1, 0, 0, 0, +1, 0, 0, 0, +1, 0, 0, 0, +1, 0, 0,$ $0, +1, 0, 0, 0, -1, 0, 0, 0, -1, 0, 0, 0, -1, 0, 0, 0, -1, 0, 0,$ $0, -1, 0, 0, 0, +1, 0, 0, 0, -1, 0, 0, 0, -1, 0, 0, 0, -1, 0,$ $0, 0, +1, 0, 0, 0, -1, 0, 0, 0, -1, 0, 0, 0, +1, 0, 0, 0, -1,$ $0, 0, 0, -1, 0, 0, 0, +1, 0, 0, 0, -1, 0, 0, 0, +1, 0, 0, 0,$ $-1, 0, 0, 0, -1, 0, 0, 0, -1, 0, 0, 0, -1, 0, 0, 0, -1, 0, 0\}$

In a 20 MHz transmission, the 2×HE-LTF sequence transmitted on subcarriers [−122: 122] is given by Equation (27-42).

$HELTF_{-122,122} =$ (27-42)

$\{-1, 0, -1, 0, -1, 0, +1, 0, +1, 0, -1, 0, +1, 0, -1, 0, -1,$ $0, -1, 0, -1, 0, +1, 0, -1, 0, +1, 0, -1, 0, -1, 0, +1, 0,$ $+1, 0, -1, 0, +1, 0, +1, 0, +1, 0, +1, 0, +1, 0, -1, 0, +1,$ $0, -1, 0, +1, 0, -1, 0, -1, 0, +1, 0, +1, 0, -1, 0, +1, 0,$ $-1, 0, -1, 0, -1, 0, -1, 0, +1, 0, -1, 0, +1, 0, +1, 0, +1,$ $0, -1, 0, -1, 0, +1, 0, -1, 0, -1, 0, -1, 0, -1, 0, -1, 0,$ $+1, 0, -1, 0, -1, 0, -1, 0, +1, 0, +1, 0, +1, 0, -1, 0,$ $-1, 0, +1, 0, 0, 0, +1, 0, -1, 0, +1, 0, +1, 0, +1, 0, -1,$ $0, +1, 0, +1, 0, -1, 0, +1, 0, +1, 0, -1, 0, -1, 0, +1,$ $0, -1, 0, +1, 0, +1, 0, +1, 0, -1, 0, +1, 0, -1,$ $0, +1, 0, +1, 0, -1, 0, -1, 0, +1, 0, -1, 0, -1, 0, -1,$ $0, -1, 0, -1, 0, +1, 0, -1, 0, +1, 0, +1, 0, -1, 0, -1,$ $0, +1, 0, +1, 0, -1, 0, +1, 0, -1, 0, -1, 0, -1, 0, -1,$ $0, +1, 0, -1, 0, +1, 0, +1, 0, +1, 0, -1, 0, -1, 0, +1,$ $0, -1, 0, -1, 0, -1, 0, -1, 0, -1, 0, +1, 0, -1, 0, +1\}$

In a 20 MHz transmission, the 4×HE-LTF sequence transmitted on subcarriers [−122: 122] is given by Equation (27-43).

$HELTF_{-122,122} =$ (27-43)

$\{-1, -1, +1, -1, +1, -1, +1, +1, +1, -1, +1, +1, +1,$ $-1, -1, +1, -1, -1, -1, -1, -1, +1, +1, -1, -1, -1,$ $-1, +1, +1, -1, +1, -1, +1, +1, +1, -1, +1, -1,$ $-1, +1, +1, -1, +1, +1, +1, -1, -1, +1, -1, -1,$ $-1, +1, +1, +1, +1, -1, +1, +1, -1, -1, -1, +1,$ $-1, -1, +1, +1, -1, +1, -1, -1, -1, -1, +1, -1, +1,$

-continued

-1, -1, -1, -1, -1, -1, +1, +1, -1, -1, -1, -1, -1,

+1, -1, -1, +1, +1, +1, -1, +1, +1, +1, -1, +1, -1,

+1, -1, -1, -1, -1, -1, +1, +1, +1, -1, -1, -1, +1,

-1, +1, +1, +1, 0, 0, 0, -1, +1, -1, +1, -1, +1, +1,

-1, +1, +1, +1, -1, -1, +1, -1, -1, +1, -1, +1, -1,

+1, +1, +1, -1, +1, +1, +1, -1, -1, +1, -1, -1, -1,

-1, -1, +1, +1, -1, -1, -1, -1, -1, -1, +1, -1, +1,

-1, -1, -1, -1, +1, -1, +1, +1, -1, -1, +1, -1, -1,

-1, -1, +1, +1, -1, +1, +1, +1, +1, +1, +1, +1, -1,

+1, +1, -1, -1, -1, -1, +1, -1, -1, +1, -1, +1, +1,

-1, -1, -1, +1, -1, -1, -1, +1, -1, +1, -1, +1, +1}

1×HE-LTF and 2×HE-LTF sequences transmitted in a 40 MHz band are as follows.

In a 40 MHz transmission, the 1×HE-LTF sequence transmitted on subcarriers [-244: 244] is given by Equation (27-44).

$HWLTF_{-244,244} =$ (27-44)

{+1, 0, 0, 0, +1, 0, 0, 0, +1, 0, 0, 0, +1, 0, 0, 0, -1, 0, 0,

0, +1, 0, 0, 0, +1, 0, 0, 0, -1, 0, 0, 0, -1, 0, 0, 0, +1, 0, 0, 0, -1, 0, 0, 0, +1, 0, 0, 0, -1, 0, 0, 0, +1, 0, 0, 0, -1, 0, 0, 0, -1, 0, 0, 0, +1, 0, 0, 0, -1, 0, 0, 0, +1, 0, 0, 0,

+1, 0, 0, 0, +1, 0, 0, 0, -1, 0, 0, 0, -1, 0, 0, 0 +1, 0, 0,

0, +1, 0, 0, 0, +1, 0, 0, 0, +1, 0, 0, 0, +1, 0, 0, 0, +1, 0, 0, 0, +1, 0, 0, 0, +1, 0, 0, 0, -1, 0, 0, 0, +1, 0, 0, 0, +1, 0, 0, 0, -1, 0, 0, 0, -1, 0, 0, 0, +1, 0, 0, 0, -1, 0, 0, 0,

+1, 0, 0, 0, -1, 0, 0, 0, +1, 0, 0, 0, -1, 0, 0, 0, -1, 0, 0,

0, +1, 0, 0, 0, -1, 0, 0, 0, +1, 0, 0, 0, +1, 0, 0, 0, +1, 0, 0, 0, -1, 0, 0, 0, -1, 0, 0, 0, +1, 0, 0, 0, +1, 0, 0, 0, +1, 0, 0, 0, +1, 0, 0, 0, -1, 0, 0, 0, +1, 0, 0, 0, -1, 0, 0, 0,

+1, 0, 0, 0, -1, 0, 0, 0, -1, 0, 0, 0, -1, 0, 0, 0, 0, 0, 0,

0, +1, 0, 0, 0, +1, 0, 0, 0, -1, 0, 0, 0, -1, 0, 0, 0, +1, 0, 0, 0, -1, 0, 0, 0, +1, 0, 0, 0, +1, 0, 0, 0, +1, 0, 0, 0,

+1, 0, 0, 0, +1, 0, 0, 0, +1, 0, 0, 0, -1, 0, 0, 0, +1, 0, 0, 0, +1, 0, 0, 0, -1, 0, 0, 0, -1, 0, 0, 0 +1, 0, 0, 0, -1, 0, 0, 0, +1, 0, 0, 0, +1, 0, 0, 0, +1, 0, 0, 0, +1, 0, 0, 0,

+1, 0, 0, 0, -1, 0, 0, 0, +1, 0, 0, 0, -1, 0, 0, 0, -1, 0, 0,

0, -1, 0, 0, 0, +1, 0, 0, 0, +1, 0, 0, 0, -1, 0, 0, 0, -1, 0, 0, 0, -1, 0, 0, 0, +1, 0, 0, 0, -1, 0, 0, 0, -1, 0, 0, 0,

-1, 0, 0, 0, -1, 0, 0, 0, +1, 0, 0, 0, -1, 0, 0, 0, -1, 0, 0,

0, +1, 0, 0, 0, +1, 0, 0, 0, -1, 0, 0, 0, +1, 0, 0, 0, -1, 0, 0, 0, -1, 0, 0, 0, -1, 0, 0, 0, -1, 0, 0, 0, -1, 0, 0, 0,

+1, 0, 0, 0, -1, 0, 0, 0, +1, 0, 0, 0, +1, 0, 0, 0, +1, 0, 0,

0, -1, 0, 0, 0, -1, 0, 0, 0, +1, 0, 0, 0, +1, 0, 0, 0, +1}

In a 40 MHz transmission, the 2×HE-LTF sequence transmitted on subcarriers [-244: 244] is given by Equation (27-45).

$HELTF_{-244,244} =$ (27-45)

{+1, 0, -1, 0, -1, 0, -1, 0, -1, 0, -1, 0, +1, 0, +1, 0, -1,

0, -1, 0, +1, 0, -1, 0, +1, 0, -1, 0, -1, 0, -1, 0, -1, 0,

-1, 0, -1, 0, +1, 0, +1, 0, +1, 0, +1, 0, -1, 0, +1, 0, -1,

0, +1, 0, +1, 0, -1, 0, -1, 0, -1, 0, -1, 0, -1, 0, +1, 0,

+1, 0, -1, 0, -1, 0, +1, 0, -1, 0, +1, 0, -1, 0, +1, 0, +1,

0, +1, 0, +1, 0, +1, 0, -1, 0, -1, 0, -1, 0, -1, 0, +1, 0,

-1, 0, +1, 0, -1, 0, +1, 0, +1, 0, +1, 0, +1, 0, +1, 0, -1,

0, +1, 0, -1, 0, -1, 0, +1, 0, -1, 0, +1, 0, -1, 0, -1, 0,

+1, 0, +1, 0, +1, 0, +1, 0, +1, 0, -1, 0, -1, 0, +1, 0, +1,

0, -1, 0, +1, 0, -1, 0, +1, 0, +1, 0, +1, 0, +1, 0, +1, 0,

+1, 0, -1, 0, -1, 0, -1, 0, -1, 0, +1, 0, -1, 0, +1, 0, -1,

0, -1, 0, -1, 0, -1, 0, -1, 0, -1, 0, -1, 0, +1, 0, +1, 0,

-1, 0, -1, 0, +1, 0, -1, 0, +1, 0, -1, 0, +1, 0, +1, 0, +1,

0, +1, 0, +1, 0, -1, 0, -1, 0, -1, 0, -1, 0, +1, 0, -1, 0,

+1, 0, -1, 0, 0, 0, 0, 0, 0, -1, 0, -1, 0, -1, 0, -1, 0,

-1, 0, +1, 0, +1, 0, +1, 0, -1, 0, -1, 0, +1, 0, -1, 0, +1,

0, -1, 0, -1, 0, -1, 0, -1, 0, -1, 0, -1, 0, +1, 0, -1, 0,

+1, 0, +1, 0, -1, 0, +1, 0, -1, 0, +1, 0, +1, 0, +1, 0, +1,

0, +1, 0, +1, 0, +1, 0, -1, 0, -1, 0, +1, 0, +1, 0, -1, 0,

+1, 0, -1, 0, +1, 0, -1, 0, -1, 0, -1, 0, -1, 0, -1, 0, +1,

0, -1, 0, +1, 0, +1, 0, -1, 0, +1, 0, -1, 0, +1, 0, +1, 0,

+1, 0, +1, 0, +1, 0, +1, 0, -1, 0, -1, 0, +1, 0, +1, 0, +1,

0, -1, 0, +1, 0, -1, 0, +1, 0, -1, 0, -1, 0, -1, 0, -1, 0,

-1, 0, +1, 0, +1, 0, -1, 0, -1, 0, +1, 0, -1, 0, +1, 0, -1,

0, -1, 0, -1, 0, -1, 0, -1, 0, -1, 0, +1, 0, -1, 0, +1, 0,

+1, 0, -1, 0, +1, 0, -1, 0, +1, 0, +1, 0, -1, 0, -1, 0, -1,

0, -1, 0, -1, 0, +1, 0, +1, 0, -1, 0, -1, 0, +1, 0, -1,

0, +1, 0, -1, 0, +1, 0, +1, 0, +1, 0, +1, 0, -1,

0, +1, 0, -1, 0, -1, 0, +1, 0, -1, 0, +1, 0, -1, 0, +1}

1×HE-LTF and 2×HE-LTF sequences transmitted in an 80 MHz band are as follows.

In an 80 MHz transmission, the 1×HE-LTF sequence transmitted on subcarriers [-500; 500] is given by Equation (27-47).

$HELTF_{-500,500} =$ (27-47)

{-1, 0, 0, 0, -1, 0, 0, 0, +1, 0, 0, 0, +1, 0, 0, 0, +1, 0, 0, 0,

+1, 0, 0, 0, +1, 0, 0, 0, -1, 0, 0, 0, -1, 0, 0, 0, -1, 0, 0, 0,

-continued

+1, 0, 0, 0, +1, 0, 0, 0, −1, 0, 0, 0, −1, 0, 0, 0, +1, 0, 0, 0,
−1, 0, 0, 0, +1, 0, 0, 0, −1, 0, 0, 0, −1, 0, 0, 0, −1, 0, 0, 0,
−1, 0, 0, 0, −1, 0, 0, 0, −1, 0, 0, 0, +1, 0, 0, 0, +1, 0, 0, 0,
−1, 0, 0, 0, −1, 0, 0, 0, +1, 0, 0, 0, −1, 0, 0, 0, +1, 0, 0, 0,
−1, 0, 0, 0, −1, 0, 0, 0, −1, 0, 0, 0, −1, 0, 0, 0, −1, 0, 0,
0, +1, 0, 0, 0, +1, 0, 0, 0, −1, 0, 0, 0, −1, 0, 0, 0, +1, 0,
0, 0, −1, 0, 0, 0, +1, 0, 0, 0, −1, 0, 0, 0, +1, 0, 0, 0, +1,
0, 0, 0, +1, 0, 0, 0, +1, 0, 0, 0, +1, 0, 0, 0, −1, 0, 0, 0,
−1, 0, 0, 0, +1, 0, 0, 0, +1, 0, 0, 0, −1, 0, 0, 0, +1, 0, 0,
0, −1, 0, 0, 0, +1, 0, 0, 0, −1, 0, 0, 0, −1, 0, 0, 0, −1, 0,
0, 0, −1, 0, 0, 0, +1, 0, 0, 0, −1, 0, 0, 0, −1, 0, 0, 0, −1,
0, 0, 0, −1, 0, 0, 0, −1, 0, 0, 0, −1, 0, 0, 0, +1, 0, 0, 0,
+1, 0, 0, 0 +1, 0, 0, 0, −1, 0, 0, 0, −1, 0, 0, 0, +1, 0, 0, 0,
+1, 0, 0, 0, −1, 0, 0, 0, +1, 0, 0, 0, −1, 0, 0, 0, +1, 0, 0,
0, +1, 0, 0, 0, +1, 0, 0, 0, +1, 0, 0, 0, +1, 0, 0, 0, +1, 0,
0, 0, −1, 0, 0, 0, −1, 0, 0, 0, +1, 0, 0, 0, +1, 0, 0, 0, −1,
0, 0, 0, +1, 0, 0, 0, −1, 0, 0, 0, +1, 0, 0, 0, +1, 0, 0, 0,
+1, 0, 0, 0, +1, 0, 0, 0, −1, 0, 0, 0, +1, 0, 0, 0, +1, 0, 0, 0,
−1, 0, 0, 0, −1, 0, 0, 0, +1, 0, 0, 0, −1, 0, 0, 0, +1, 0, 0,
0, −1, 0, 0, 0, +1, 0, 0, 0, +1, 0, 0, 0, +1, 0, 0, 0, +1, 0,
0, 0, +1, 0, 0, 0, −1, 0, 0, 0, −1, 0, 0, 0, +1, 0, 0, 0, +1,
0, 0, 0, −1, 0, 0, 0, +1, 0, 0, 0, −1, 0, 0, 0, +1, 0, 0, 0,
−1, 0, 0, 0, −1, 0, 0, 0, −1, 0, 0, 0, +1, 0, 0, 0, +1, 0, 0,
0, −1, 0, 0, 0, +1, 0, 0, 0, −1, 0, 0, 0, −1, 0, 0, 0, 0, 0,
0, −1, 0, 0, 0, +1, 0, 0, 0, +1, 0, 0, 0, −1, 0, 0, 0, −1, 0,
0, 0, +1, 0, 0, 0, +1, 0, 0, 0, −1, 0, 0, 0, −1, 0, 0, 0, +1,
0, 0, 0, +1, 0, 0, 0, −1, 0, 0, 0, +1, 0, 0, 0, −1, 0, 0, 0,
+1, 0, 0, 0, +1, 0, 0, 0, +1, 0, 0, 0, +1, 0, 0, 0, +1, 0, 0, 0,
+1, 0, 0, 0, −1, 0, 0, 0, −1, 0, 0, 0, +1, 0, 0, 0, +1, 0, 0,
0, −1, 0, 0, 0, +1, 0, 0, 0, −1, 0, 0, 0, +1, 0, 0, 0, +1, 0,
0, 0, +1, 0, 0, 0, +1, 0, 0, 0, +1, 0, 0, 0, −1, 0, 0, 0, −1, 0,
0, 0, +1, 0, 0, 0, +1, 0, 0, 0, −1, 0, 0, 0, +1, 0, 0, 0, −1,
0, 0, 0, +1, 0, 0, 0, −1, 0, 0, 0, −1, 0, 0, 0, −1, 0, 0, 0, −1,
0, 0, 0, −1, 0, 0, 0, +1, 0, 0, 0, +1, 0, 0, 0, −1, 0, 0, 0,
−1, 0, 0, 0, +1, 0, 0, 0, −1, 0, 0, 0, +1, 0, 0, 0, −1, 0, 0,
0, +1, 0, 0, 0, +1, 0, 0, 0, +1, 0, 0, 0, +1, 0, 0, 0, −1, 0,
0, 0, +1, 0, 0, 0, −1, 0, 0, 0, −1, 0, 0, 0, +1, 0, 0, 0, −1, 0,
0, 0, −1, 0, 0, 0, +1, 0, 0, 0, +1, 0, 0, 0, +1, 0, 0, 0, −1,
0, 0, 0, −1, 0, 0, 0, +1, 0, 0, 0, +1, 0, 0, 0, −1, 0, 0, 0,
+1, 0, 0, 0, −1, 0, 0, 0, +1, 0, 0, 0, +1, 0, 0, 0, +1, 0, 0,
0, +1, 0, 0, 0, +1, 0, 0, 0, +1, 0, 0, 0, −1, 0, 0, 0, −1, 0,
0, 0, +1, 0, 0, 0, +1, 0, 0, 0, −1, 0, 0, 0, +1, 0, 0, 0, −1,
0, 0, 0, +1, 0, 0, 0, +1, 0, 0, 0, +1, 0, 0, 0, +1, 0, 0, 0,
−1, 0, 0, 0, +1, 0, 0, 0, +1, 0, 0, 0, −1, 0, 0, 0, −1, 0, 0,

-continued

0, +1, 0, 0, 0, −1, 0, 0, 0, +1, 0, 0, 0, −1, 0, 0, 0, +1, 0,
0, 0, +1, 0, 0, 0, +1, 0, 0, 0, +1, 0, 0, 0, +1, 0, 0, 0, −1,
0, 0, 0, −1, 0, 0, 0, +1, 0, 0, 0, +1, 0, 0, 0, −1, 0, 0, 0,
+1, 0, 0, 0, −1, 0, 0, 0, +1, 0, 0, 0, −1, 0, 0, 0, −1, 0, 0,
0, −1, 0, 0, 0, −1, 0, 0, 0, +1, 0, 0, 0, −1, 0, 0, 0, +1, 0,
0, 0, −1, 0, 0, 0, −1, 0, 0, 0, −1, 0, 0, 0, +1, 0, 0, 0, +1}

In an 80 MHz transmission, the 2×HE-LTF sequence transmitted on subcarriers [−500: 500] is given by Equation (27-48).

$$HELTF_{-500,500} = \qquad(27\text{-}48)$$

{+1, 0, +1, 0, −1, 0, +1, 0, +1, 0, +1, 0, −1, 0, +1, 0, +1,
0, +1, 0, +1, 0, −1, 0, −1, 0, −1, 0, +1, 0, −1, 0, −1, 0,
+1, 0, +1, 0, −1, 0, +1, 0, +1, 0, −1, 0, −1, 0, −1, 0, −1,
0, +1, 0, +1, 0, +1, 0, −1, 0, +1, 0, +1, 0, +1, 0, −1, 0,
+1, 0, −1, 0, −1, 0, +1, 0, −1, 0, −1, 0, −1, 0, +1, 0, +1,
0, −1, 0, −1, 0, −1, 0, +1, 0, −1, 0, −1, 0, +1, 0, −1, 0,
+1, 0, +1, 0, −1, 0, +1, 0, +1, 0, −1, 0, +1, 0, −1, 0, −1,
0, −1, 0, +1, 0, −1, 0, −1, 0, −1, 0, −1, 0, +1, 0, −1, 0,
−1, 0, +1, 0, +1, 0, −1, 0, +1, 0, +1, 0, +1, 0, −1, 0, −1,
0, −1, 0, −1, 0, +1, 0, −1, 0, +1, 0, +1, 0, +1, 0, −1, 0,
+1, 0, +1, 0, +1, 0, +1, 0, −1, 0, −1, 0, −1, 0, +1, 0, +1,
0, +1, 0, −1, 0, −1, 0, +1, 0, +1, 0, +1, 0, −1, 0, +1, 0,
+1, 0, −1, 0, +1, 0, −1, 0, −1, 0, −1, 0, −1, 0, +1, 0, −1,
0, −1, 0, −1, 0, +1, 0, −1, 0, +1, 0, +1, 0, −1, 0, +1, 0,
+1, 0, −1, 0, −1, 0, −1, 0, +1, 0, −1, 0, −1, 0, −1, 0,
+1, 0, −1, 0, +1, 0, +1, 0, −1, 0, +1, 0, +1, 0, +1, 0,
−1, 0, −1, 0, +1, 0 +1, 0, +1, 0, −1, 0, +1, 0, +1, 0, −1,
0, +1, 0, −1, 0, −1, 0, +1, 0, −1, 0, +1, 0, +1, 0, +1, 0,
−1, 0, +1, 0, +1, 0, +1, 0, +1, 0, −1, 0, −1, 0, −1, 0, +1,
0, −1, 0, −1, 0, +1, 0, +1, 0, −1, 0, +1, 0, +1, 0, +1, 0,
−1, 0, −1, 0, −1, 0, −1, 0, +1, 0, +1, 0, +1, 0, −1, 0, −1,
0, −1, 0, −1, 0, +1, 0, −1, 0, −1, 0, −1, 0, +1, 0, −1, 0,
+1, 0, +1, 0, +1, 0, −1, 0, −1, 0, +1, 0, +1, 0, +1, 0, −1,
0, +1, 0, +1, 0, −1, 0, +1, 0, −1, 0, −1, 0, −1, 0, −1, 0,
+1, 0, −1, 0, −1, 0, −1, 0, +1, 0, −1, 0, +1, 0, +1, 0, −1,
0, +1, 0, +1, 0, −1, 0, +1, 0, +1, 0, −1, 0, −1, 0, +1, 0,
−1, 0, −1, 0, −1, 0, +1, 0, +1, 0, +1, 0, +1, 0, −1, 0, +1,
0, −1, 0, −1, 0, −1, 0, +1, 0, −1, 0, −1, 0, −1, 0, −1, 0,
+1, 0, +1, 0, +1, 0, +1, 0, −1, 0, −1, 0, −1, 0, +1, 0, +1,
0, +1, 0, 0, 0, 0, 0, 0, +1, 0, −1, 0, −1, 0, +1, 0, +1,
0, −1, 0, +1, 0, −1, 0, −1, 0, −1, 0, +1, 0, +1, 0, +1, 0,
+1, 0, −1, 0, +1, 0, +1, 0, +1, 0, −1, 0, +1, 0, −1, 0, −1,

-continued

0, −1, 0, −1, 0, +1, 0, +1, 0, +1, 0, −1, 0, +1, 0, +1, 0,

−1, 0, −1, 0, +1, 0, −1, 0, −1, 0, +1, 0, −1, 0, −1, 0, +1,

0, −1, 0, +1, 0, +1, 0, +1, 0, −1, 0, +1, 0, +1, 0, +1, 0,

+1, 0, −1, 0, +1, 0, −1, 0, −1, 0, +1, 0, −1, 0, −1, 0, −1,

0, +1, 0, +1, 0, −1, 0, −1, 0, −1, 0, +1, 0, −1, 0, +1, 0,

+1, 0, +1, 0, −1, 0, +1, 0, +1, 0, +1, 0, +1, 0, −1, 0, −1,

0, −1, 0, +1, 0, +1, 0, +1, 0, +1, 0, −1, 0, −1, 0, −1, 0,

+1, 0, −1, 0, −1, 0, +1, 0, +1, 0, −1, 0, +1, 0, +1, 0, +1,

0, −1, 0, −1, 0, −1, 0, −1, 0, +1, 0, −1, 0, −1, 0, −1, 0,

+1, 0, −1, 0, +1, 0, +1, 0, −1, 0, +1, 0, −1, 0, −1, 0, +1,

0, −1, 0, −1, 0, −1, 0, +1, 0, +1, 0, −1, 0, −1, 0, −1, 0,

+1, 0, −1, 0, −1, 0, +1, 0, −1, 0, +1, 0, +1, 0, +1, 0, −1,

0, +1, 0, +1, 0, +1, 0, −1, 0, +1, 0, −1, 0, +1, 0, −1, 0,

+1, 0, −1, 0, −1, 0, −1, 0, +1, 0, −1, 0, −1, 0, −1, 0,

−1, 0, +1, 0, −1, 0, +1, 0, +1, 0, −1, 0, +1, 0, +1, 0,

+1, 0, −1, 0, −1, 0, +1, 0, +1, 0, +1, 0, −1, 0, −1, 0,

−1, 0, +1, 0, +1, 0, +1, 0, +1, 0, −1, 0, +1, 0, +1, 0,

+1, 0, −1, 0, +1, 0, −1, 0, −1, 0, −1, 0, −1, 0, +1, 0,

+1, 0, +1, 0, −1, 0, +1, 0 + 1, 0, −1, 0, −1, 0, +1, 0, −1,

0, −1, 0, −1, 0, −1, 0, +1, 0, −1, 0, −1, 0, −1, 0, +1, 0,

−1, 0 + 1, 0, +1, 0, −1, 0, +1, 0, +1, 0, −1, 0, +1, 0, −1,

0, −1, 0, +1, 0, −1, 0, −1, 0, −1, 0, +1, 0, +1, 0, −1, 0,

−1, 0, −1, 0, +1, 0, −1, 0, −1, 0, +1, 0, −1, 0, +1, 0, +1,

0, +1, 0, −1, 0, +1, 0, +1, 0, +1, 0, +1, 0, −1, 0, −1, 0,

−1, 0, −1, 0, +1, 0, +1, 0, +1, 0, −1, 0, +1, 0, +1, 0,

−1, 0, −1, 0, +1, 0, −1, 0, −1, 0, −1, 0, +1, 0, +1, 0,

+1, 0, +1, 0, −1, 0, +1, 0, +1, 0 + 1, 0, −1, 0, +1, 0, +1}

2. Embodiment Applicable to the Present Disclosure

Various methods capable of increasing a throughput by supporting a wide bandwidth (up to 320 MHz), 16 streams, multi-band operation, or the like are taken into account in extreme high throughput (EHT) considered to provide a higher data rate than that in 802.11ax. In addition, when a transmitting STA uses a high number of streams greater than or equal to 8, the higher the number of streams in use, the higher the number of symbols of an LTF to be transmitted. This is because the number of symbols of the transmitted LTF used in signal transmission is determined by the number of spatial streams to be transmitted. Therefore, when SU/MU transmission is performed using 16 streams, a frame to be transmitted is configured to include an LTF of 16 symbols, which results in an increase in a symbol overhead caused by the LTF. Accordingly, when the transmitting STA transmits a signal by using the high number of streams (up to 16) greater than or equal to 8, an effective LTF transmission method is required to reduce an overhead of the LTF.

A structure of a beyond 11 ax (EHT) frame has not been determined yet. However, for transmission of a beyond 11ax (EHT) signal, the LTF may be configured using an HE-LTF defined in 11ax. In this case, when the transmitting STA transmits a signal by using a high number of streams (e.g., 16 streams) greater than or equal to 8, in order to reduce an overhead of the LTF, the LTF may be transmitted using the following method. That is, the present specification proposes a method for reducing the overhead of the LTF and effectively transmitting the LTF when an AP/STA transmits a signal by using 16 streams to support a higher throughput.

1) Method of Transmitting Signal by Using Compressed LTF

A. In the beyond 11ax (EHT), a transmitting STA may use a 1x/2xLTF structure defined in 11ax to support a high number of streams. In this case, an LTF symbol is configured by assigning an LTF sequence to a subcarrier (or tone) at a spacing of 2 tones or 4 tones in terms of frequency according to an LTF mode (e.g., 1xLTF, 2xLTF). In this structure, the same time sequence is repeated 2/4 times in a time domain according to a frequency mapping method of the LTF sequence (e.g., at a spacing of 2 tones/4 tones). Therefore, in the beyond 11ax (EHT), the LTF symbol consists of one of the repeated time sequences. For example, when the LTF sequence is mapped to a frequency domain at a spacing of 2 tones (2xLTF mode) or a spacing of 4 tones (1xLTF mode), the LTF symbols may be configured as follows.

i. LTF Symbol Structure when Using 2xLTF Mode

Figure 22:
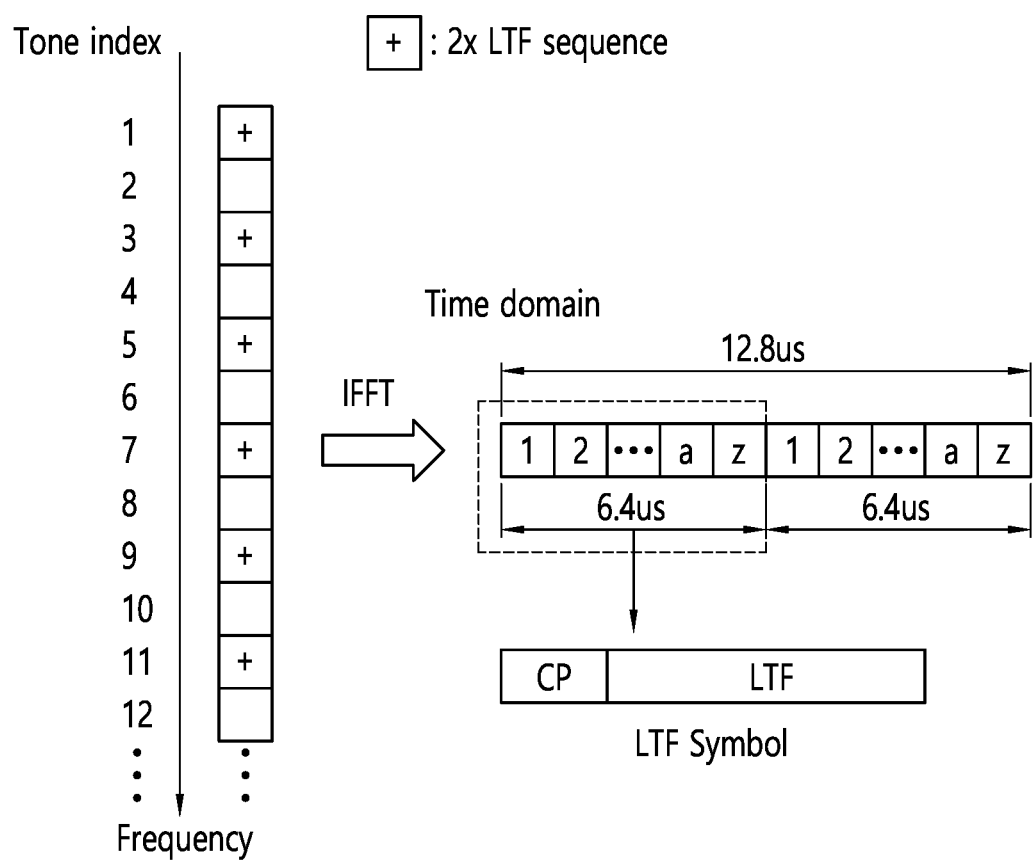
FIG. 22 illustrates an example of an LTF symbol structure when using a sequence of a 2×LTF mode according to the present embodiment.

FIG. 22 illustrates an example of an LTF symbol structure when using a sequence of a 2xLTF mode according to the present embodiment.

i-1. As shown in FIG. 22, the LTF symbol consists of one sequence (6.4 us) out of repeated 2 time sequences, and a CP is added to configure the LTF symbol.

i-1-A. In FIG. 22, a CP length has one of lengths 0.8 us/1.6 us/3.2 us.

ii. LTF Symbol Structure when Using 1xLTF Mode

Figure 23:
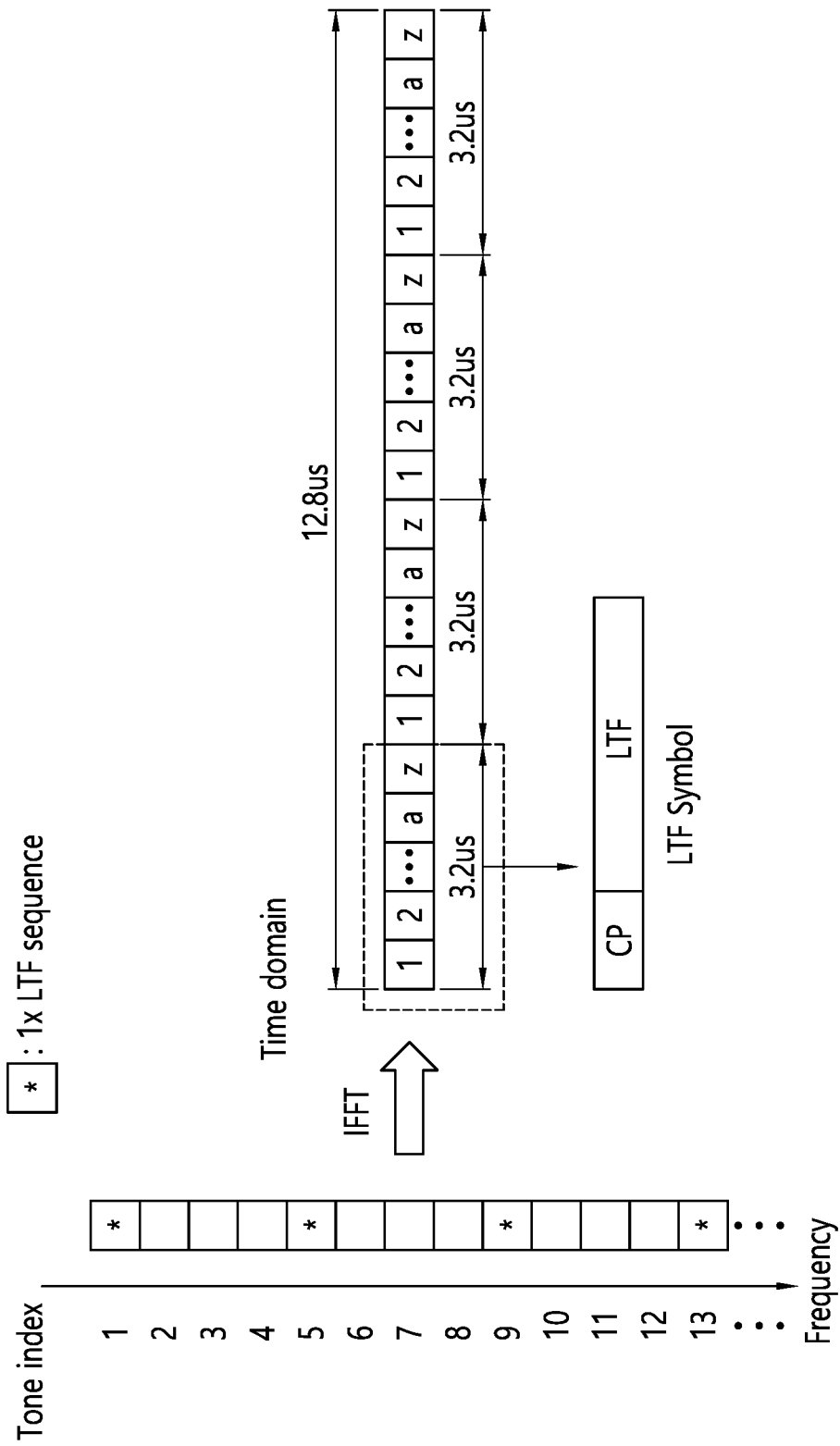
FIG. 23 illustrates an example of an LTF symbol when using a sequence of a 1×LTF mode according to the present embodiment.

FIG. 23 illustrates an example of an LTF symbol when using a sequence of a 1xLTF mode according to the present embodiment.

ii-1. As shown in FIG. 23, the LTF symbol consists of one sequence (3.2 us) out of repeated 4 time sequences, and a CP is added to configure the LTF symbol.

ii-2. In FIG. 23, a CP length has one of lengths 0.8 us/1.6 us.

B. In the beyond 11 ax, in order to support a high number of streams (e.g., 8 or more streams or 16 streams), the LTF symbol defined above may be used. In this case, the same method as in the legacy 11ax is used to transmit a signal by setting the number of LTF symbols according to the number of streams as follows.

i. The number of HE-LTFs required for different numbers of space-time streams is as shown in the following table.

TABLE 3

| Total $N_{STS}$ | $N_{LTF}$ |
| --- | --- |
| 1 | 1 |
| 2 | 2 |
| 3 | 4 |
| 4 | 4 |
| 5 | 6 |
| 6 | 6 |
| 7 | 8 |
| 8 | 8 |
| 9 | 10 |
| 10 | 10 |
| 11 | 12 |
| 12 | 12 |
| 13 | 14 |
| 14 | 14 |
| 15 | 16 |
| 16 | 16 | ii. For example, when using 16 streams, a signal is transmitted by configuring 16 LTF symbols as follows according to the LTF mode.

ii-1. 2×LTF Mode

Figure 24:
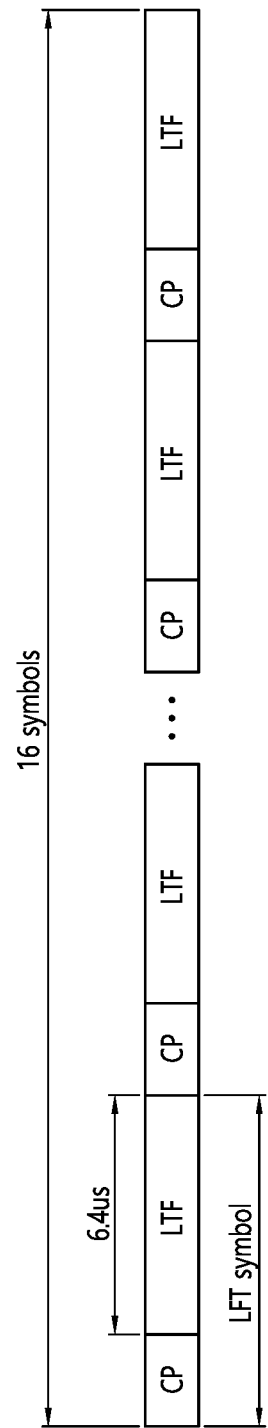
FIG. 24 illustrates an example of an LTF symbol structure when using 16 streams and a sequence of a 2×LTF mode according to the present embodiment.

FIG. 24 illustrates an example of an LTF symbol structure when using 16 streams and a sequence of a 2×LTF mode according to the present embodiment.

ii-2. 1×LTF Mode

Figure 25:
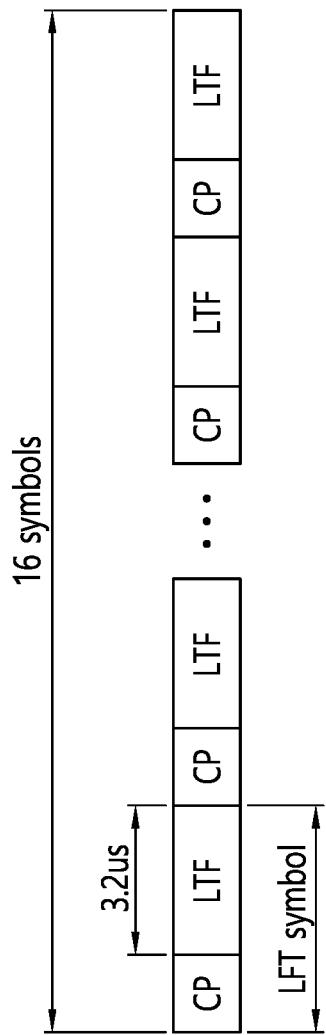
FIG. 25 illustrates an example of an LTF symbol structure when using 16 streams and a sequence of a 1×LTE mode according to the present embodiment.

FIG. 25 illustrates an example of an LTF symbol structure when using 16 streams and a sequence of a 1×LTE mode according to the present embodiment.

ii-3. As described above, since the symbol length of one LTF can be reduced depending on the LTF mode, even if a high number of LTF symbols are transmitted, the overhead caused by the LTF can be reduced. For example, when transmission is performed with 16 streams by using the 1×LTF mode, the overhead can be reduced by up to 4 times, compared to the case of 4×LTF. In addition, when transmission is performed with 16 streams by using the 2×LTE mode, the overhead can be reduced by up to 2 times, compared to the case of 4×LTF.

ii-4. The LTF symbol is transmitted by multiplying the P matrix determined depending on $N_{STS}$.

ii-5. A CP constituting the LTF symbol has the same length as one of 0.8 us/1.6 us/3.2 us.

C. The compressed LTF may be applied to transmit a signal only when a higher number of streams than 8 streams are used.

i. When the compressed LTF is used to reduce the overhead of the LTF in case of supporting a high number of streams (or high streams) as described above, indication information for the compressed LTF may be transmitted through SIG A.

i-1. The indication information may consist of 1 bit to indicate whether the compressed LTF is used.

i-2. Unlike the above case, in order to indicate information on the compressed LTF, the CP size, and LTF mode, 3 bits may be assigned and information thereon may be indicated to an STA.

D. Although the 2/4-tone spacing has been described as an example, in the present specification, the tone space is not limited to 2/4, and thus the tone spacing may be used variously (e.g., 3, 6, 8 tones, etc.).

2) Method of Transmitting Signal by Using Orthogonal LTF

A. Similarly to the compressed LTF, in terms of frequency, an LTF sequence may be mapped to frequency on a 2-tone or 4-tone basis, and IFFT (or IDFT) may be performed to configure an LTF symbol. In this case, since the LTF sequence is assigned based on a stream to different frequency tones, the overhead of the LTF may be reduced when high streams are used. For example, when the high streams are supported by using the 2×/4×LTF mode, the LTF may be configured in the following manner.

B. An LTF sequence for each stream is mapped (applied) to a tone on a 2-tone or 4-tone spacing basis according to the frequency mapping scheme in the order of a stream index. In the option C described below, a method of mapping an LTF sequence for each stream to a tone on a 2-tone basis is described. In the option D described below, a method of mapping an LTF sequence for each stream to a tone on a 4-tone basis is described.

C. Method of Configuring LTF Sequence for Each Steam by Assigning it to Tone on 2-Tone Basis FIG. 26 illustrates an example of configuring an LTF sequence for each stream by assigning it to a tone on a 2-tone basis according to the present embodiment.

i. As shown in FIG. 26, a transmitting STA may transmit LTF sequences for two streams in one symbol by mapping the LTF sequence to a frequency tone at a spacing of 2 tones. In this case, the LTF sequences for the respective streams may be mapped to different tones to configure an LTF symbol.

ii. The LTF symbol configured as shown in FIG. 26 may be transmitted by applying a P matrix defined for each stream. In this case, in order to support high streams, the conventionally defined P matrix may be reused without having to additionally define an additional P matrix.

iii. Unlike in the above case ii, the P matrix defined for each stream may be applied to an LTF sequence for each stream to transmit the LTF sequence. For example, the LTF sequence for each stream may be configured in such a manner that a matrix value of each row defined based on a stream in the conventional P matrix is multiplied to the LTF sequence according to a size of the matrix.

iv. When the transmitting STA transmits a signal by using odd streams, the LTF sequence may be configured as follows.

iv-1. When the number 'n' of streams is an odd number, the transmitting STA may map the LTF sequence for each stream to a tone in the same manner as described above up to an n-th stream, where n is the number of streams, and may apply an LTF sequence for a first stream to a tone corresponding to an (n+1)-th stream in a last LTF symbol to configure the LTF symbol. That is, the transmitting STA may configure the LTF symbol by assigning the LTF sequence to all tones even in the last LTF symbol.

iv-2. Alternatively, the LTF symbol may be configured by applying an LTF sequence for a last stream to an unassigned tone of a last LTF symbol (by mapping it to the unassigned tone). That is, the transmitting STA may configure the LTF symbol by assigning the LTF sequence to all tones even in the last LTF symbol.

v. Since LTF sequences for two streams can be transmitted on one LTF symbol, when transmission is performed by using 16 streams, an LTF overhead can be reduced by 50% compared to the conventional transmission method.

Figure 27:
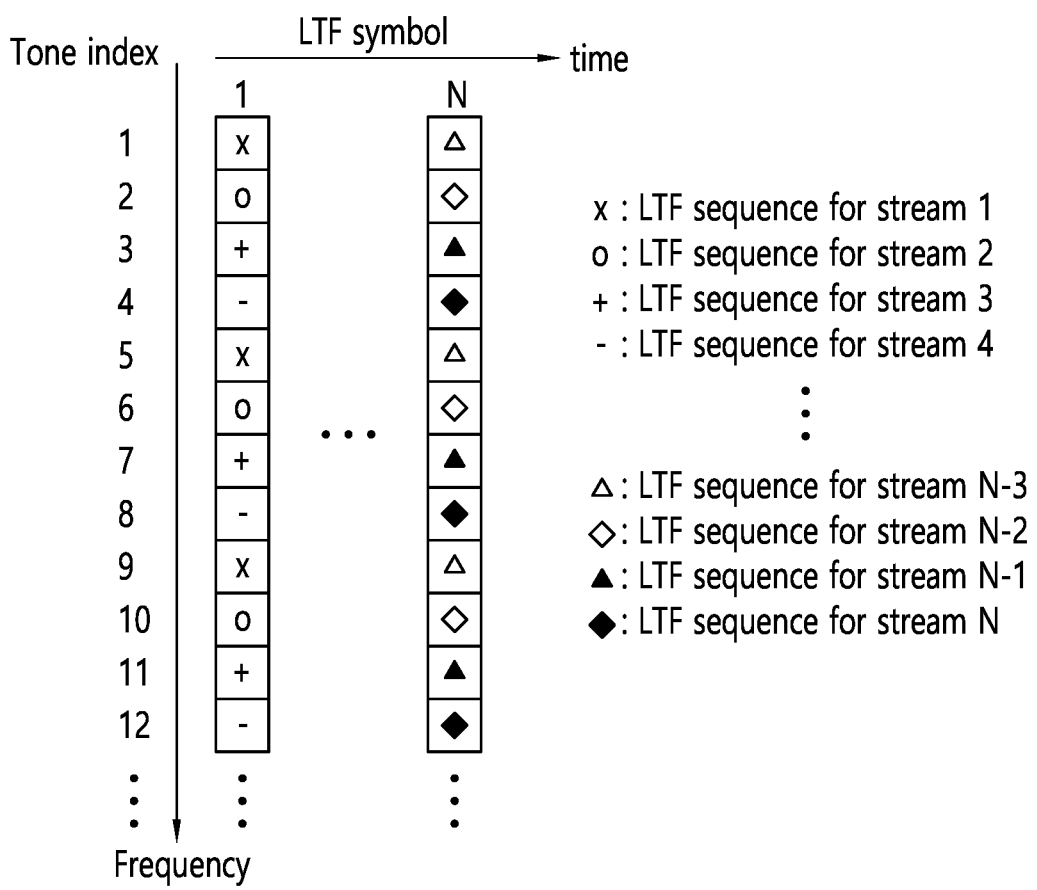
FIG. 27 illustrates an example of configuring an LTF sequence for each stream by assigning it to a tone on a 4-tone basis according to the present embodiment.

D. Method of Configuring LTF Sequence for Each Stream by Assigning it to Tone on 4-Tone Basis FIG. 27 illustrates an example of configuring an LTF sequence for each stream by assigning it to a tone on a 4-tone basis according to the present embodiment.

i. As shown in FIG. 27, LTF sequences for four streams are transmitted in one symbol by mapping the LTF sequence to a frequency tone at a spacing of 4 tones. In this case, the LTF sequences for the respective streams may be mapped to different tones to configure an LTF symbol.

ii. The LTF symbol configured as shown in FIG. 27 may be transmitted by applying a P matrix defined for each stream. When high streams are supported, since the number of LTF symbols is not increased compared to the conventional case, the conventionally defined P matrix may be reused without having to additionally define an additional P matrix.

iii. Unlike in the above case ii, the P matrix defined for each stream may be applied to an LTF sequence for each stream to transmit the LTF sequence. For example, the LTF sequence for each stream may be configured in such a manner that a matrix value of each row defined based on a stream in the conventional P matrix is multiplied to the LTF sequence according to a size of the matrix.

iv. When the transmitting STA transmits a signal by using streams of which a number is not a multiple of 4, the LTF sequence may be configured as follows.

iv-1. The LTF sequence for each stream may be mapped to a tone in the same manner as described above up to n streams, where n is a multiple of 4, and a tone for an unassigned stream in a last LTF symbol may be configured as follows.

iv-1-A. An LTF sequence for a first stream is mapped (or applied) to an unassigned tone to configure a last LTF symbol. That is, the transmitting STA may configure the LTF symbol by assigning the LTF sequence to all tones even in the last LTF symbol.

iv-1-B. Alternatively, the LTF symbol for the last stream applied in the last LTF symbol may be mapped to an unmapped frequency tone to configure the LTF sequence. That is, the transmitting STA may configure the LTF symbol by assigning the LTF sequence to all tones even in the last LTF symbol.

iv-1-C. Alternatively, the LTF sequence may be configured by mapping a sequence to a frequency tone by applying streams to an unassigned tone from a first stream in sequence. For example, if the total number of streams is 14, four LTF symbols may be configured as shown in FIG. 27, and since there is an unassigned tone in the last LTF symbol, an LTF sequence for a first stream or a second stream may be mapped to the unassigned tone. That is, the transmitting STA may configure the LTF symbol by assigning the LTF sequence to all tones even in the last LTF symbol.

v. Since LTF sequences for four streams can be transmitted on one LTF symbol, when transmission is performed by using 16 streams, an LTF overhead can be reduced by ¼ compared to the conventional transmission method.

vi. For example, although the 2/4-tone spacing has been described as an example, in the present specification, the tone space is not limited to 2/4, and thus the tone spacing may be used variously (e.g., 3, 6, 8 tones, etc.).

3) Method of Transmitting Signal by Using Interleaved LTF

A. As shown in the embodiment of the method 2), an LTF sequence for each stream may be mapped to a frequency (tone) at a spacing of 2/4 tones for each stream to configure an odd-number-th ($1^{st}$, $3^{rd}$, $5^{th}$, etc.) LTF symbol.

B. An even-number-th ($2^{nd}$, $4^{th}$, $6^{th}$, etc.) LTF symbol may be cyclically shifted by n tones (e.g., 2/4 tones) for an LTF sequence carried on the odd-number-th symbol, and thus the LTF sequence is mapped to a frequency tone to configure an LTF symbol.

i. The cyclic shift may be applied within a spacing of mapped tones or may be applied on a specific tone (2/4 tone) basis.

C. For example, the LTF sequence may be mapped to a tone at a spacing of 4 tones. In this case, when four streams are used, the LTF symbol may be configured in the same manner as shown in FIG. 28 if the LTF sequence is configured by being cyclically shifted by 2 tones.

FIG. 28 illustrates an example of cyclically shifting an LTF sequence for each stream to configure an interleaved LTF sequence according to the present embodiment.

i. As shown in FIG. 28, since an LTF sequence cyclically shifted by 2 tones is transmitted in a second LTF symbol, it can be seen that the LTF sequence for each stream is transmitted with a regular tone spacing (e.g., 2/4 tones) when viewed on the entire LTF symbols.

ii. When 16 streams are used in the same manner as shown in FIG. 28, two LTF symbols are used to transmit LTF sequences for four streams. Therefore, since only 8 LTF symbols are used as a whole, an overhead can be reduced by 50% compared to the conventional case.

iii. In addition, since a cyclic-shifted LTF sequence is transmitted in the second LTF symbol, a tone spacing by which the LTF sequence is mapped in terms of frequency can be reduced, thereby increasing LTF reception reliability. If a 1×LTF sequence is mapped without cyclic shift, since a tone spacing by which the LTF sequence is mapped is 4 tones, there is a problem in that a channel loss caused by interpolation may occur. On the contrary, when the interleaved LTF sequence is used, interpolation and channel estimation are performed based on a 2-tone spacing across the two LTF symbols, thereby solving the channel loss problem. However, since the two LTF symbols are to be used, a symbol overhead may be increased compared to a case of using the legacy 1×LTF.

iv. The LTF sequence for each stream is mapped to frequency by applying a P matrix assigned based on a spatial stream.

v. Unlike in the above case, the P matrix may be applied for each LTF symbol to configure the LTF symbol.

vi. In terms of the overhead reduction, the interleaved LTF transmission scheme may be applied to a case other than a case where the number of streams is 1 or 2, and thus may be used to configure the LTF sequence.

4) Method of Configuring LTF Sequence by being Cyclically Shifted Based on Stream A. According to the aforementioned method, an LTF sequence is defined for each stream by applying cyclic shift to a single LTF sequence.

i. The cyclic shift may be used to configure the LTF sequence by applying a regular spacing for each stream, or the LTF sequence may be generated by being cyclically shifted using a stream order. ii. The single LTF sequence may be configured as 1×LTF/2×LTF, and may be transmitted using the method described in the aforementioned embodiments 1) to 3)).

Although it is described in the aforementioned embodiments 1) to 4) that the number of streams is greater than or equal to 8, the disclosure is not limited thereto, and thus may also be applied when the number of streams is less than or equal to 8.

Hereinafter, the aforementioned embodiment is described with reference to FIG. 18 to FIG. 28.

Figure 29:
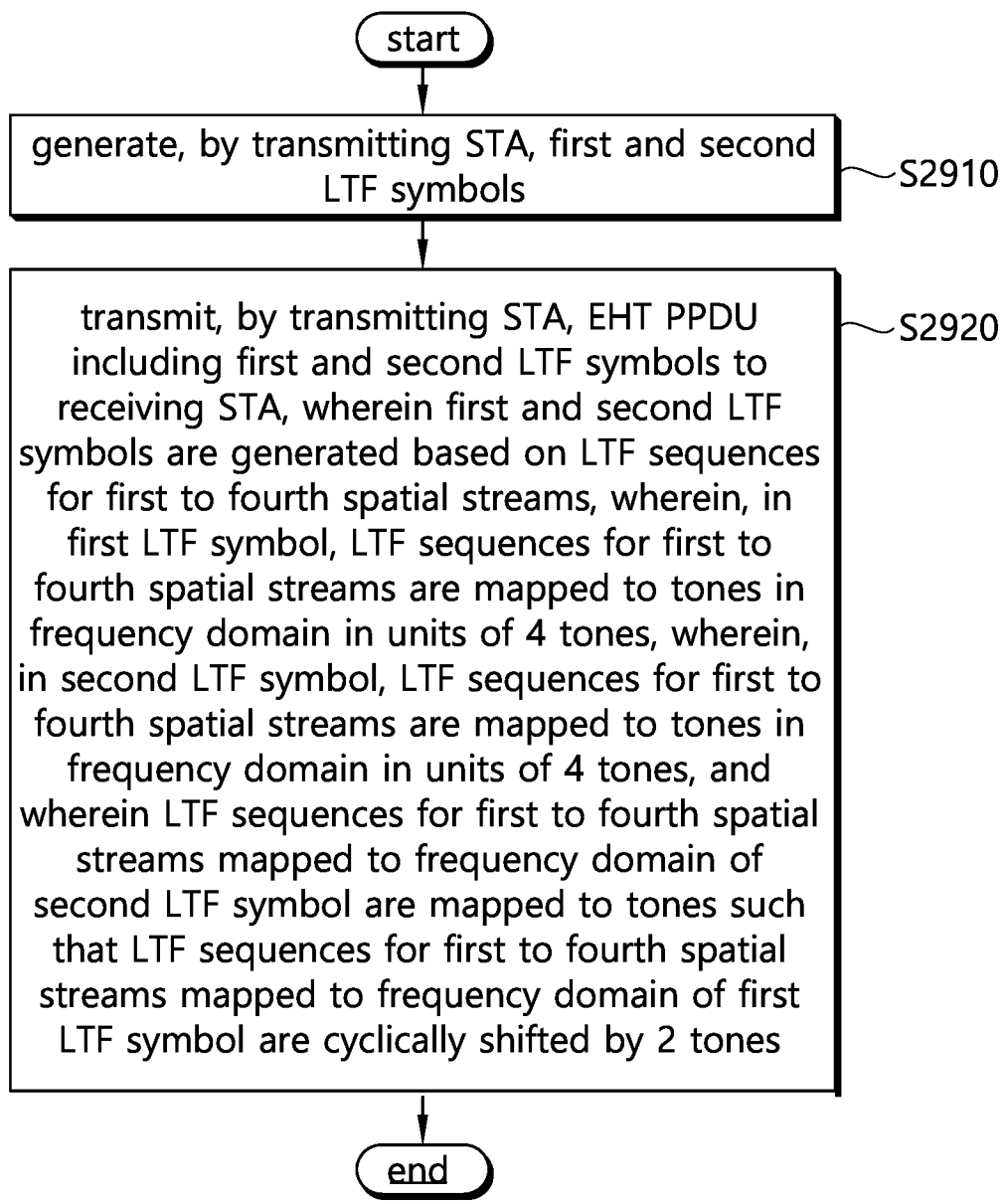
FIG. 29 is a flowchart illustrating a procedure in which a transmitting STA transmits an EHT PPDU according to the present embodiment.

FIG. 29 is a flowchart illustrating a procedure in which a transmitting STA transmits an EHT PPDU according to the present embodiment.

An example of FIG. 29 may be performed in a network environment in which a next-generation WLAN system is supported. The next-generation WLAN system is a WLAN system evolved from an 802.11ax system, and may satisfy backward compatibility with the 802.11ax system.

Since the next-generation WLAN system (IEEE 802.11be or EHT WLAN system) supports up to 16 spatial streams, a data rate may be increased when a high number of spatial streams are used, whereas there may be a problem in that an overhead is increased according to an increase in the number of LTF symbols. The present embodiment proposes an effective LTF transmission method for reducing an overhead of an LTF by using a compressed LTF sequence, an orthogonal LTF sequence, an interleaved LTF sequence, a cyclic-shifted LTF sequence, or the like.

The example of FIG. 29 may be performed in a transmitting STA, and the transmitting STA may correspond to an access point (AP). A receiving STA of FIG. 29 may correspond to an STA supporting an extremely high throughput (EHT) WLAN system.

In step S2910, the transmitting STA generates first and second LTF symbols.

In step S2920, the transmitting STA transmits the EHT PPDU including the first and second LTF symbols to the receiving STA.

The first and second LTF symbols are generated based on LTF sequences for first to fourth spatial streams. The first and second LTF symbols may be LTF symbols newly defined in EHT or 802.11be.

In the first LTF symbol, the LTF sequences for the first to fourth spatial streams are mapped to a tone on a 4-tone basis in a frequency domain. In the second LTF symbol, the LTF sequences for the first to fourth spatial streams are mapped to a tone on a 4-tone basis in the frequency domain. Since the sequence is mapped on a 4-tone basis, the LTF sequences for the first to fourth spatial streams are 1×LTF sequences. According to the aforementioned example, the transmitting STA may transmit the LTF sequences for 8 spatial streams by using two LTF symbols.

If the sequence is mapped on a 2-tone basis, the LTF sequences for the first to fourth spatial streams are 2×LTF sequences. According to the aforementioned example, the transmitting STA may transmit the LTF sequences for 4 spatial streams by using two LTF symbols.

The LTF sequences for the first to fourth spatial streams mapped to the frequency domain of the second LTF symbol are mapped to tones in such a manner that the LTF sequences for the first to fourth spatial streams mapped to the frequency domain of the first LTF symbol are cyclically shifted by 2 tones.

The present embodiment proposes a method in which an LTF sequence cyclically shifted for adjacent LTF symbols is mapped to a tone to configure an interleaved LTF sequence. Specifically, how the cyclic-shifted LTF sequence is mapped to a frequency domain of two adjacent LTF symbols will be described below.

First, the LTF sequence for the first LTF symbol is mapped as follows. The LTF sequence for the first spatial stream may be mapped to a tone on a 4-tone basis from the first tone of the frequency domain. The LTF sequence for the second spatial stream may be mapped to a tone on a 4-tone basis from the second tone of the frequency domain. The LTF sequence for the third spatial stream may be mapped to a tone on a 4-tone basis from the third tone of the frequency domain. The LTF sequence for the fourth spatial stream may be mapped to a tone on a 4-tone basis from the fourth tone of the frequency domain.

The LTF sequence for the second LTF symbol is mapped as follows. The LTF sequence for the first spatial stream may be mapped to a tone on a 4-tone basis from the third tone of the frequency domain. The LTF sequence for the second spatial stream may be mapped to a tone on a 4-tone basis from the fourth tone of the frequency domain. The LTF sequence for the third spatial stream may be mapped to a tone on a 4-tone basis from the first tone of the frequency domain. The LTF sequence for the fourth spatial stream may be mapped to a tone on a 4-tone basis from the second tone of the frequency domain.

The next-generation WLAN system (IEEE 802.11be or EHT WLAN system) may support up to 16 spatial streams. Since the present embodiment is to reduce an overhead of an LTF symbol, it is preferable to perform the aforementioned mapping scheme of the LTF sequence when 8 or more spatial streams are used.

For example, when 8 spatial streams (first to eighth spatial streams) are used, the mapping scheme of the LTF sequence is as follows. When the first to fourth spatial streams are used, the aforementioned embodiment may be applied to the mapping scheme of the LTF sequence.

The transmitting STA may further generate third and fourth LTF symbols. The third and fourth LTF symbols may be further included in the EHT PPDU.

The third and fourth LTF symbols may be generated based on LTF sequences for fifth to eighth spatial streams.

In the third LTF symbol, the LTF sequences for the fifth to eighth spatial streams may be mapped to a tone on a 4-tone basis in the frequency domain. In the fourth LTF symbol, the LTF sequences for the fifth to eighth spatial streams may be mapped to a tone on a 4-tone basis in the frequency domain.

The LTF sequences for the fifth to eighth spatial streams mapped to the frequency domain of the fourth LTF symbol may be mapped to tones in such a manner that the LTF sequences for the fifth to eighth spatial streams mapped to the frequency domain of the third LTF symbol are cyclically shifted by 2 tones.

As another example, when 12 spatial streams (first to twelfth spatial streams) are used, the mapping scheme of the LTF sequence is as follows. When the first to fourth spatial streams are used, the aforementioned embodiment may be applied to the mapping scheme of the LTF sequence.

The transmitting STA may further generate fifth and sixth LTF symbols. The fifth and sixth LTF symbols may be further included in the EHT PPDU.

The fifth and sixth LTF symbols may be generated based on LTF sequences for ninth to twelfth spatial streams.

In the fifth LTF symbol, the LTF sequences for the ninth to twelfth spatial streams may be mapped to a tone on a 4-tone basis in the frequency domain. In the sixth LTF symbol, the LTF sequences for the ninth to twelfth spatial streams may be mapped to a tone on a 4-tone basis in the frequency domain.

The LTF sequences for the ninth to twelfth spatial streams mapped to the frequency domain of the sixth LTF symbol may be mapped to tones in such a manner that the LTF sequences for the ninth to twelfth spatial streams mapped to the frequency domain of the fifth LTF symbol are cyclically shifted by 2 tones.

As another example, when 16 spatial streams (first to sixteenth spatial streams) are used, the mapping scheme of the LTF sequence is as follows. When the first to fourth spatial streams are used, the aforementioned embodiment may be applied to the mapping scheme of the LTF sequence.

The transmitting STA may further generate seventh and eighth LTF symbols. The seventh and eighth LTF symbols may be further included in the EHT PPDU.

The seventh and eighth LTF symbols may be generated based on LTF sequences for thirteenth to sixteenth spatial streams.

In the seventh LTF symbol, the LTF sequences for the thirteenth to sixteenth spatial streams may be mapped to a tone on a 4-tone basis in the frequency domain. In the eighth LTF symbol, the LTF sequences for the thirteenth to sixteenth spatial streams may be mapped to a tone on a 4-tone basis in the frequency domain.

The LTF sequences for the thirteenth to sixteenth spatial streams mapped to the frequency domain of the eighth LTF symbol may be mapped to tones in such a manner that the LTF sequences for the thirteenth to sixteenth spatial streams mapped to the frequency domain of the seventh LTF symbol are cyclically shifted by 2 tones.

In this case, the first and second LTF symbols are adjacent to each other. The third and fourth LTF symbols are adjacent to each other. The fifth and sixth LTF symbols are adjacent to each other. The seventh and eighth LTF symbols are adjacent to each other.

In addition, the LTF sequences for the first to fourth spatial streams are orthogonal to each other. The LTF sequences for the fifth to eighth spatial streams are orthogonal to each other. The LTF sequences for the ninth to twelfth spatial streams are orthogonal to each other. The LTF sequences for the thirteenth to sixteenth spatial streams are orthogonal to each other.

According to the aforementioned embodiment, an LTF sequence mapped to a frequency domain of a first LTF symbol is cyclically shifted, and the cyclic-shifted LTF sequence is mapped to a frequency domain of a second LTF symbol. Therefore, a tone spacing by which the LTF sequence is mapped can be decreased in terms of frequency, thereby increasing reliability of receiving the LTF sequence.

For example, channel estimation for the first spatial stream may be performed based on interpolation between the LTF sequences for the first spatial stream mapped to the frequency domain of the first and second LTF symbols. Channel estimation for the second spatial stream may be performed based on interpolation between the LTF sequences for the second spatial stream mapped to the frequency domain of the first and second LTF symbols. Channel estimation for the third spatial stream may be performed based on interpolation between the LTF sequences for the third spatial stream mapped to the frequency domain of the first and second LTF symbols. Channel estimation for the fourth spatial stream may be performed based on interpolation between the LTF sequences for the fourth spatial stream mapped to the frequency domain of the first and second LTF symbols.

If a 1×LTF sequence is mapped for each symbol without cyclic shift, since a tone spacing by which the LTF sequence is mapped is 4 tones, there is a problem in that a channel loss caused by interpolation may occur. On the contrary, when the interleaved LTF sequence is used, interpolation and channel estimation are performed between LTF sequences having a 2-tone spacing across the two LTF symbols, thereby solving the channel loss problem.

The EHT PPDU is a PPDU supporting an EHT WLAN system or an 802.11be WLAN system, and may be transmitted through a broadband (supporting up to 320 MHz band).

Figure 30:
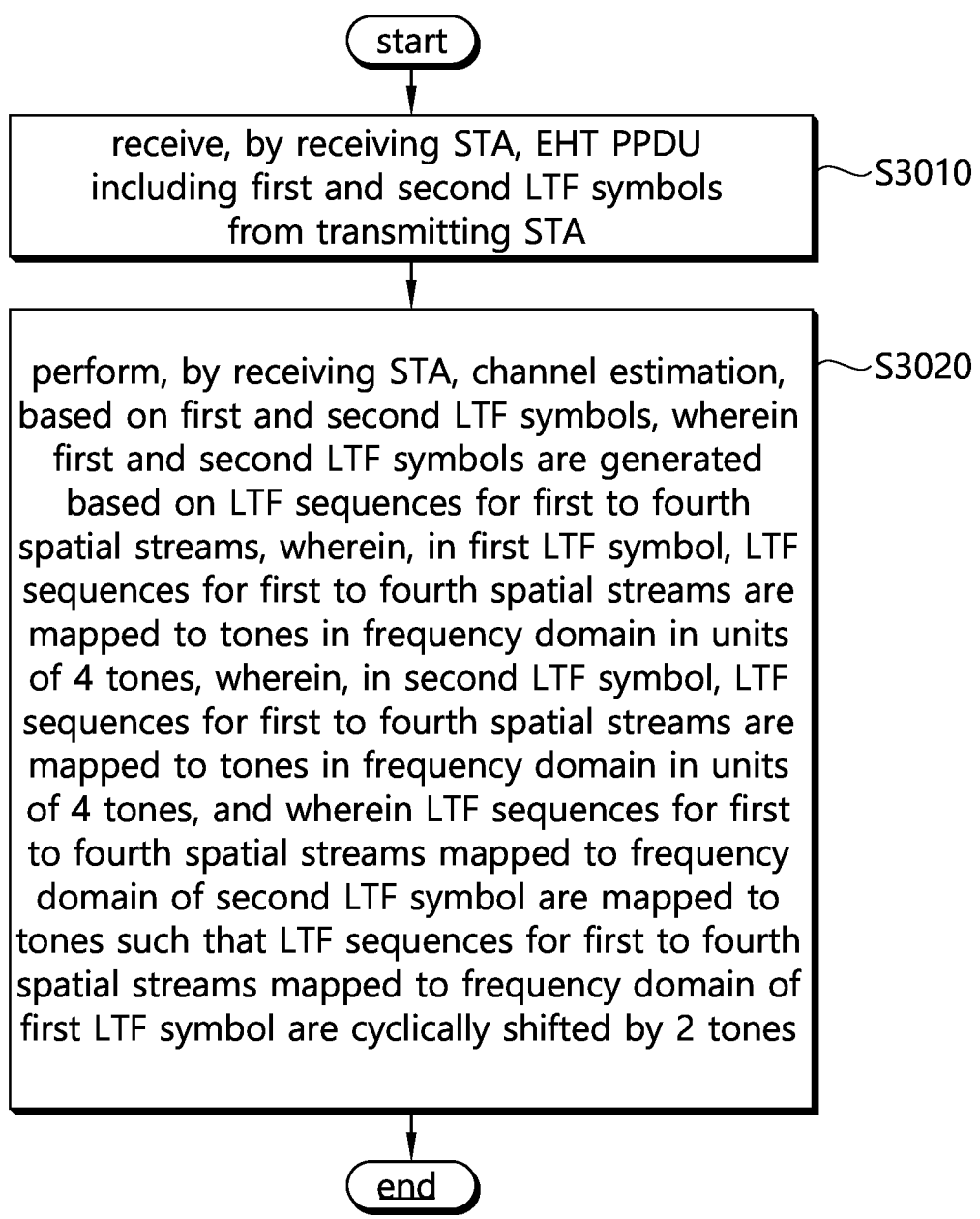
FIG. 30 is a flowchart illustrating a procedure in which a receiving STA receives an EHT PPDU according to the present embodiment.

FIG. 30 is a flowchart illustrating a procedure in which a receiving STA receives an EHT PPDU according to the present embodiment.

An example of FIG. 30 may be performed in a network environment in which a next-generation WLAN system is supported. The next-generation WLAN system is a WLAN system evolved from an 802.11ax system, and may satisfy backward compatibility with the 802.11ax system.

Since the next-generation WLAN system (IEEE 802.11be or EHT WLAN system) supports up to 16 spatial streams, a data rate may be increased when a high number of spatial streams are used, whereas there may be a problem in that an overhead is increased according to an increase in the number of LTF symbols. The present embodiment proposes an effective LTF transmission method for reducing an overhead of an LTF by using a compressed LTF sequence, an orthogonal LTF sequence, an interleaved LTF sequence, a cyclic-shifted LTF sequence, or the like.

The example of FIG. 30 may be performed in the receiving STA, and may correspond to an STA supporting an extremely high throughput (EHT) WLAN system. A transmitting STA of FIG. 30 may correspond to an AP.

In step S3010, the receiving STA receives the EHT PPDU including first and second LTF symbols from the transmitting STA.

In step S3020, the receiving STA performs channel estimation, based on the first and second LTF symbols.

The first and second LTF symbols are generated based on LTF sequences for first to fourth spatial streams. The first and second LTF symbols may be LTF symbols newly defined in EHT or 802.11be.

In the first LTF symbol, the LTF sequences for the first to fourth spatial streams are mapped to a tone on a 4-tone basis in a frequency domain. In the second LTF symbol, the LTF sequences for the first to fourth spatial streams are mapped to a tone on a 4-tone basis in the frequency domain. Since the sequence is mapped on a 4-tone basis, the LTF sequences for the first to fourth spatial streams are 1×LTF sequences. According to the aforementioned example, the transmitting STA may transmit the LTF sequences for 8 spatial streams by using two LTF symbols.

If the sequence is mapped on a 2-tone basis, the LTF sequences for the first to fourth spatial streams are 2×LTF sequences. According to the aforementioned example, the transmitting STA may transmit the LTF sequences for 4 spatial streams by using two LTF symbols.

The LTF sequences for the first to fourth spatial streams mapped to the frequency domain of the second LTF symbol are mapped to tones in such a manner that the LTF sequences for the first to fourth spatial streams mapped to the frequency domain of the first LTF symbol are cyclically shifted by 2 tones.

The present embodiment proposes a method in which an LTF sequence cyclically shifted for adjacent LTF symbols is mapped to a tone to configure an interleaved LTF sequence. Specifically, how the cyclic-shifted LTF sequence is mapped to a frequency domain of two adjacent LTF symbols will be described below.

First, the LTF sequence for the first LTF symbol is mapped as follows. The LTF sequence for the first spatial stream may be mapped to a tone on a 4-tone basis from the first tone of the frequency domain. The LTF sequence for the second spatial stream may be mapped to a tone on a 4-tone basis from the second tone of the frequency domain. The LTF sequence for the third spatial stream may be mapped to a tone on a 4-tone basis from the third tone of the frequency domain. The LTF sequence for the fourth spatial stream may be mapped to a tone on a 4-tone basis from the fourth tone of the frequency domain.

The LTF sequence for the second LTF symbol is mapped as follows. The LTF sequence for the first spatial stream may be mapped to a tone on a 4-tone basis from the third tone of the frequency domain. The LTF sequence for the second spatial stream may be mapped to a tone on a 4-tone basis from the fourth tone of the frequency domain. The LTF sequence for the third spatial stream may be mapped to a tone on a 4-tone basis from the first tone of the frequency domain. The LTF sequence for the fourth spatial stream may be mapped to a tone on a 4-tone basis from the second tone of the frequency domain.

The next-generation WLAN system (IEEE 802.11be or EHT WLAN system) may support up to 16 spatial streams. Since the present embodiment is to reduce an overhead of an LTF symbol, it is preferable to perform the aforementioned mapping scheme of the LTF sequence when 8 or more spatial streams are used.

For example, when 8 spatial streams (first to eighth spatial streams) are used, the mapping scheme of the LTF sequence is as follows. When the first to fourth spatial streams are used, the aforementioned embodiment may be applied to the mapping scheme of the LTF sequence.

The transmitting STA may further generate third and fourth LTF symbols. The third and fourth LTF symbols may be further included in the EHT PPDU.

The third and fourth LTF symbols may be generated based on LTF sequences for fifth to eighth spatial streams.

In the third LTF symbol, the LTF sequences for the fifth to eighth spatial streams may be mapped to a tone on a 4-tone basis in the frequency domain. In the fourth LTF symbol, the LTF sequences for the fifth to eighth spatial streams may be mapped to a tone on a 4-tone basis in the frequency domain.

The LTF sequences for the fifth to eighth spatial streams mapped to the frequency domain of the fourth LTF symbol may be mapped to tones in such a manner that the LTF sequences for the fifth to eighth spatial streams mapped to the frequency domain of the third LTF symbol are cyclically shifted by 2 tones.

As another example, when 12 spatial streams (first to twelfth spatial streams) are used, the mapping scheme of the LTF sequence is as follows. When the first to fourth spatial streams are used, the aforementioned embodiment may be applied to the mapping scheme of the LTF sequence.

The transmitting STA may further generate fifth and sixth LTF symbols. The fifth and sixth LTF symbols may be further included in the EHT PPDU.

The fifth and sixth LTF symbols may be generated based on LTF sequences for ninth to twelfth spatial streams.

In the fifth LTF symbol, the LTF sequences for the ninth to twelfth spatial streams may be mapped to a tone on a 4-tone basis in the frequency domain. In the sixth LTF symbol, the LTF sequences for the ninth to twelfth spatial streams may be mapped to a tone on a 4-tone basis in the frequency domain.

The LTF sequences for the ninth to twelfth spatial streams mapped to the frequency domain of the sixth LTF symbol may be mapped to tones in such a manner that the LTF sequences for the ninth to twelfth spatial streams mapped to the frequency domain of the fifth LTF symbol are cyclically shifted by 2 tones.

As another example, when 16 spatial streams (first to sixteenth spatial streams) are used, the mapping scheme of the LTF sequence is as follows. When the first to fourth spatial streams are used, the aforementioned embodiment may be applied to the mapping scheme of the LTF sequence.

The transmitting STA may further generate seventh and eighth LTF symbols. The seventh and eighth LTF symbols may be further included in the EHT PPDU.

The seventh and eighth LTF symbols may be generated based on LTF sequences for thirteenth to sixteenth spatial streams.

In the seventh LTF symbol, the LTF sequences for the thirteenth to sixteenth spatial streams may be mapped to a tone on a 4-tone basis in the frequency domain. In the eighth LTF symbol, the LTF sequences for the thirteenth to sixteenth spatial streams may be mapped to a tone on a 4-tone basis in the frequency domain.

The LTF sequences for the thirteenth to sixteenth spatial streams mapped to the frequency domain of the eighth LTF symbol may be mapped to tones in such a manner that the LTF sequences for the thirteenth to sixteenth spatial streams mapped to the frequency domain of the seventh LTF symbol are cyclically shifted by 2 tones.

In this case, the first and second LTF symbols are adjacent to each other. The third and fourth LTF symbols are adjacent to each other. The fifth and sixth LTF symbols are adjacent to each other. The seventh and eighth LTF symbols are adjacent to each other.

In addition, the LTF sequences for the first to fourth spatial streams are orthogonal to each other. The LTF sequences for the fifth to eighth spatial streams are orthogonal to each other. The LTF sequences for the ninth to twelfth spatial streams are orthogonal to each other. The LTF sequences for the thirteenth to sixteenth spatial streams are orthogonal to each other.

According to the aforementioned embodiment, an LTF sequence mapped to a frequency domain of a first LTF symbol is cyclically shifted, and the cyclic-shifted LTF sequence is mapped to a frequency domain of a second LTF symbol. Therefore, a tone spacing by which the LTF sequence is mapped can be decreased in terms of frequency, thereby increasing reliability of receiving the LTF sequence.

For example, channel estimation for the first spatial stream may be performed based on interpolation between the LTF sequences for the first spatial stream mapped to the frequency domain of the first and second LTF symbols. Channel estimation for the second spatial stream may be performed based on interpolation between the LTF sequences for the second spatial stream mapped to the frequency domain of the first and second LTF symbols. Channel estimation for the third spatial stream may be performed based on interpolation between the LTF sequences for the third spatial stream mapped to the frequency domain of the first and second LTF symbols. Channel estimation for the fourth spatial stream may be performed based on interpolation between the LTF sequences for the fourth spatial stream mapped to the frequency domain of the first and second LTF symbols.

If a 1×LTF sequence is mapped for each symbol without cyclic shift, since a tone spacing by which the LTF sequence is mapped is 4 tones, there is a problem in that a channel loss caused by interpolation may occur. On the contrary, when the interleaved LTF sequence is used, interpolation and channel estimation are performed between LTF sequences having a 2-tone spacing across the two LTF symbols, thereby solving the channel loss problem.

The EHT PPDU is a PPDU supporting an EHT WLAN system or an 802.11be WLAN system, and may be transmitted through a broadband (supporting up to 320 MHz band).

6. Device Configuration

Figure 31:
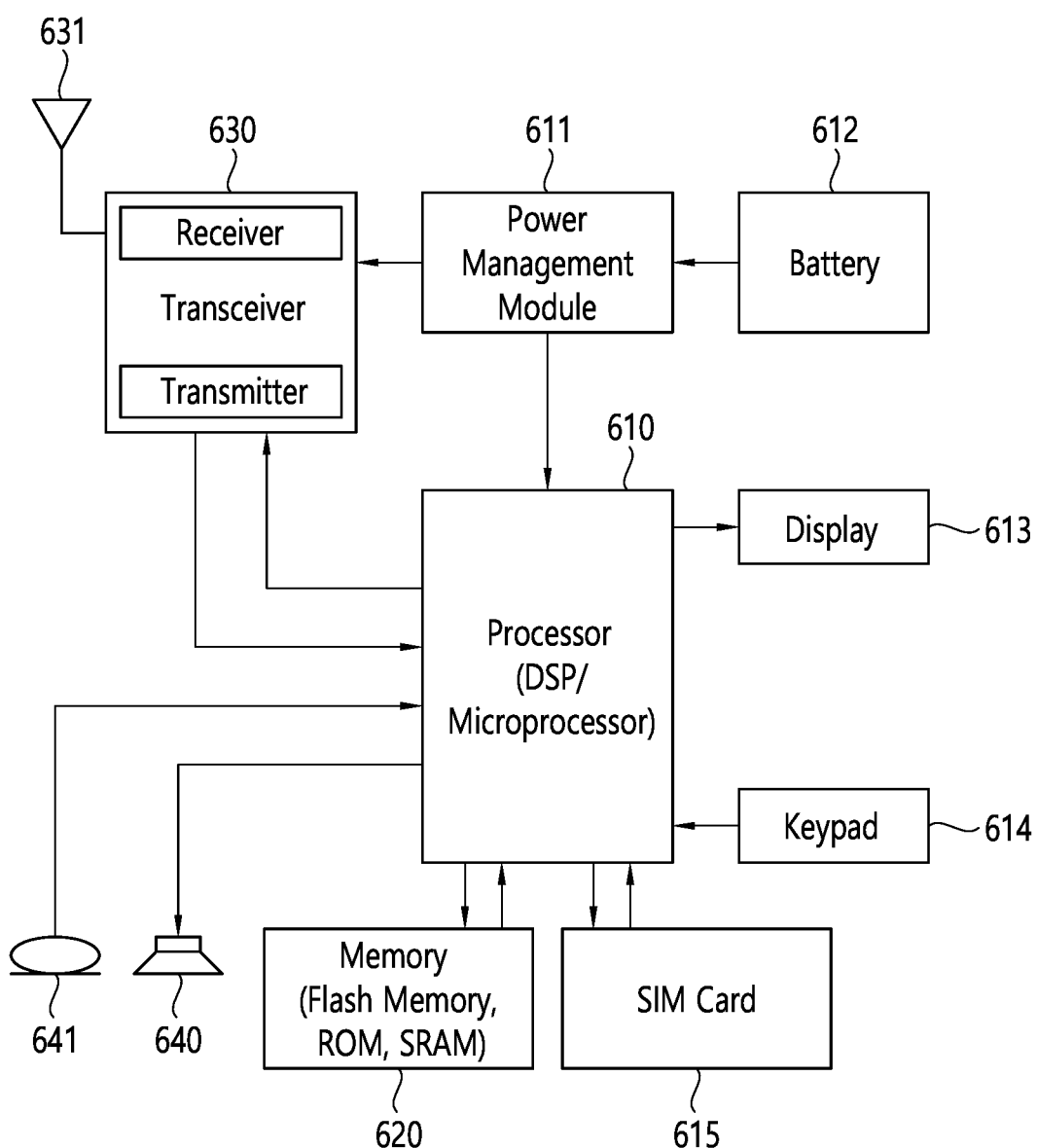
FIG. 31 illustrates a more detailed wireless device for implementing the embodiment of the present disclosure.

FIG. 31 shows a UE to which the technical features of the present disclosure can be applied.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods of the present disclosure described below. The processor 610 may be configured to control one or more other components of the UE 600 to implement proposed functions, procedures and/or methods of the present disclosure described below. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In case of a transmitting device, the processor 610 generates first and second LTF symbols, and transmits an EHT PPDU including the first and second LTF symbols to a receiving STA.

In case of a receiving device, the processor 610 receives the EHT PPDU including the first and second LTF symbols from the transmitting STA, and performs channel estimation, based on the first and second LTF symbols.

The first and second LTF symbols are generated based on LTF sequences for first to fourth spatial streams. The first and second LTF symbols may be LTF symbols newly defined in EHT or 802.11be.

In the first LTF symbol, the LTF sequences for the first to fourth spatial streams are mapped to a tone on a 4-tone basis in a frequency domain. In the second LTF symbol, the LTF sequences for the first to fourth spatial streams are mapped to a tone on a 4-tone basis in the frequency domain. Since the sequence is mapped on a 4-tone basis, the LTF sequences for the first to fourth spatial streams are 1×LTF sequences. According to the aforementioned example, the transmitting STA may transmit the LTF sequences for 8 spatial streams by using two LTF symbols.

If the sequence is mapped on a 2-tone basis, the LTF sequences for the first to fourth spatial streams are 2×LTF sequences. According to the aforementioned example, the transmitting STA may transmit the LTF sequences for 4 spatial streams by using two LTF symbols.

The LTF sequences for the first to fourth spatial streams mapped to the frequency domain of the second LTF symbol are mapped to tones in such a manner that the LTF sequences for the first to fourth spatial streams mapped to the frequency domain of the first LTF symbol are cyclically shifted by 2 tones.

The present embodiment proposes a method in which an LTF sequence cyclically shifted for adjacent LTF symbols is mapped to a tone to configure an interleaved LTF sequence. Specifically, how the cyclic-shifted LTF sequence is mapped to a frequency domain of two adjacent LTF symbols will be described below.

First, the LTF sequence for the first LTF symbol is mapped as follows. The LTF sequence for the first spatial stream may be mapped to a tone on a 4-tone basis from the first tone of the frequency domain. The LTF sequence for the second spatial stream may be mapped to a tone on a 4-tone basis from the second tone of the frequency domain. The LTF sequence for the third spatial stream may be mapped to a tone on a 4-tone basis from the third tone of the frequency domain. The LTF sequence for the fourth spatial stream may be mapped to a tone on a 4-tone basis from the fourth tone of the frequency domain.

The LTF sequence for the second LTF symbol is mapped as follows. The LTF sequence for the first spatial stream may be mapped to a tone on a 4-tone basis from the third tone of the frequency domain. The LTF sequence for the second spatial stream may be mapped to a tone on a 4-tone basis from the fourth tone of the frequency domain. The LTF sequence for the third spatial stream may be mapped to a tone on a 4-tone basis from the first tone of the frequency domain. The LTF sequence for the fourth spatial stream may be mapped to a tone on a 4-tone basis from the second tone of the frequency domain.

The next-generation WLAN system (IEEE 802.11be or EHT WLAN system) may support up to 16 spatial streams. Since the present embodiment is to reduce an overhead of an LTF symbol, it is preferable to perform the aforementioned mapping scheme of the LTF sequence when 8 or more spatial streams are used.

For example, when 8 spatial streams (first to eighth spatial streams) are used, the mapping scheme of the LTF sequence is as follows. When the first to fourth spatial streams are used, the aforementioned embodiment may be applied to the mapping scheme of the LTF sequence.

The transmitting STA may further generate third and fourth LTF symbols. The third and fourth LTF symbols may be further included in the EHT PPDU.

The third and fourth LTF symbols may be generated based on LTF sequences for fifth to eighth spatial streams.

In the third LTF symbol, the LTF sequences for the fifth to eighth spatial streams may be mapped to a tone on a 4-tone basis in the frequency domain. In the fourth LTF symbol, the LTF sequences for the fifth to eighth spatial streams may be mapped to a tone on a 4-tone basis in the frequency domain.

The LTF sequences for the fifth to eighth spatial streams mapped to the frequency domain of the fourth LTF symbol may be mapped to tones in such a manner that the LTF sequences for the fifth to eighth spatial streams mapped to the frequency domain of the third LTF symbol are cyclically shifted by 2 tones.

As another example, when 12 spatial streams (first to twelfth spatial streams) are used, the mapping scheme of the LTF sequence is as follows. When the first to fourth spatial streams are used, the aforementioned embodiment may be applied to the mapping scheme of the LTF sequence.

The transmitting STA may further generate fifth and sixth LTF symbols. The fifth and sixth LTF symbols may be further included in the EHT PPDU.

The fifth and sixth LTF symbols may be generated based on LTF sequences for ninth to twelfth spatial streams.

In the fifth LTF symbol, the LTF sequences for the ninth to twelfth spatial streams may be mapped to a tone on a 4-tone basis in the frequency domain. In the sixth LTF symbol, the LTF sequences for the ninth to twelfth spatial streams may be mapped to a tone on a 4-tone basis in the frequency domain.

The LTF sequences for the ninth to twelfth spatial streams mapped to the frequency domain of the sixth LTF symbol may be mapped to tones in such a manner that the LTF sequences for the ninth to twelfth spatial streams mapped to the frequency domain of the fifth LTF symbol are cyclically shifted by 2 tones.

As another example, when 16 spatial streams (first to sixteenth spatial streams) are used, the mapping scheme of the LTF sequence is as follows. When the first to fourth spatial streams are used, the aforementioned embodiment may be applied to the mapping scheme of the LTF sequence.

The transmitting STA may further generate seventh and eighth LTF symbols. The seventh and eighth LTF symbols may be further included in the EHT PPDU.

The seventh and eighth LTF symbols may be generated based on LTF sequences for thirteenth to sixteenth spatial streams.

In the seventh LTF symbol, the LTF sequences for the thirteenth to sixteenth spatial streams may be mapped to a tone on a 4-tone basis in the frequency domain. In the eighth LTF symbol, the LTF sequences for the thirteenth to sixteenth spatial streams may be mapped to a tone on a 4-tone basis in the frequency domain.

The LTF sequences for the thirteenth to sixteenth spatial streams mapped to the frequency domain of the eighth LTF symbol may be mapped to tones in such a manner that the LTF sequences for the thirteenth to sixteenth spatial streams mapped to the frequency domain of the seventh LTF symbol are cyclically shifted by 2 tones.

In this case, the first and second LTF symbols are adjacent to each other. The third and fourth LTF symbols are adjacent to each other. The fifth and sixth LTF symbols are adjacent to each other. The seventh and eighth LTF symbols are adjacent to each other.

In addition, the LTF sequences for the first to fourth spatial streams are orthogonal to each other. The LTF sequences for the fifth to eighth spatial streams are orthogonal to each other. The LTF sequences for the ninth to twelfth spatial streams are orthogonal to each other. The LTF sequences for the thirteenth to sixteenth spatial streams are orthogonal to each other.

According to the aforementioned embodiment, an LTF sequence mapped to a frequency domain of a first LTF symbol is cyclically shifted, and the cyclic-shifted LTF sequence is mapped to a frequency domain of a second LTF symbol. Therefore, a tone spacing by which the LTF sequence is mapped can be decreased in terms of frequency, thereby increasing reliability of receiving the LTF sequence.

For example, channel estimation for the first spatial stream may be performed based on interpolation between the LTF sequences for the first spatial stream mapped to the frequency domain of the first and second LTF symbols. Channel estimation for the second spatial stream may be performed based on interpolation between the LTF sequences for the second spatial stream mapped to the frequency domain of the first and second LTF symbols. Channel estimation for the third spatial stream may be performed based on interpolation between the LTF sequences for the third spatial stream mapped to the frequency domain of the first and second LTF symbols. Channel estimation for the fourth spatial stream may be performed based on interpolation between the LTF sequences for the fourth spatial stream mapped to the frequency domain of the first and second LTF symbols.

If a 1×LTF sequence is mapped for each symbol without cyclic shift, since a tone spacing by which the LTF sequence is mapped is 4 tones, there is a problem in that a channel loss caused by interpolation may occur. On the contrary, when the interleaved LTF sequence is used, interpolation and channel estimation are performed between LTF sequences having a 2-tone spacing across the two LTF symbols, thereby solving the channel loss problem.

The EHT PPDU is a PPDU supporting an EHT WLAN system or an 802.11be WLAN system, and may be transmitted through a broadband (supporting up to 320 MHz band).

The foregoing technical features of the present disclosure are applicable to various applications or business models. For example, the foregoing technical features may be applied for wireless communication in a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for learning data, wherein the label may indicate a correct answer (or result value) that the artificial neural network needs to infer when the learning data is input to the artificial neural network. Unsupervised learning may refer to a method of training an artificial neural network without a label given for learning data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

Further, the foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

In addition, the foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a cellular phone, a tablet PC, a laptop computer, a desktop computer, a TV, digital signage, and the like. A device to which XR technology is applied may be referred to as an XR device.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus. Further, technical features of method claims and apparatus claims can be combined to be implemented or performed in a method.

What is claimed is:

1. A method of transmitting an extremely high throughput (EHT) physical protocol data unit (PPDU) in a wireless local area network (WLAN) system, the method comprising:
   generating, by a transmitting station (STA), first to sixth long training field (LTF) symbols; and
   transmitting, by the transmitting STA, the EHT PPDU including the first to sixth LTF symbols to a receiving STA,
   wherein the first and second LTF symbols are generated based on LTF sequences for first to fourth spatial streams,
   wherein, in the first LTF symbol, the LTF sequences for the first to fourth spatial streams are mapped to tones in a frequency domain in units of 4 tones,
   wherein, in the second LTF symbol, the LTF sequences for the first to fourth spatial streams are mapped to tones in a frequency domain in units of 4 tones,
   wherein the LTF sequences for the first to fourth spatial streams mapped to the frequency domain of the second LTF symbol are mapped to tones in such a manner that the LTF sequences for the first to fourth spatial streams mapped to the frequency domain of the first LTF symbol are cyclically shifted by 2 tones,
   wherein the third and fourth LTF symbols are generated based on LTF sequences for fifth to eighth spatial streams,
   wherein, in the third LTF symbol, the LTF sequences for the fifth to eighth spatial streams are mapped to tones in a frequency domain in units of 4 tones,
   wherein, in the fourth LTF symbol, the LTF sequences for the fifth to eighth spatial streams are mapped to tones in a frequency domain in units of 4 tones,
   wherein the LTF sequences for the fifth to eighth spatial streams mapped to the frequency domain of the fourth LTF symbol are mapped to tones in such a manner that the LTF sequences for the fifth to eighth spatial streams mapped to the frequency domain of the third LTF symbol are cyclically shifted by 2 tones,
   wherein the fifth and sixth LTF symbols are generated based on LTF sequences for ninth to twelfth spatial streams,
   wherein, in the fifth LTF symbol, the LTF sequences for the ninth to twelfth spatial streams are mapped to tones in a frequency domain in units of 4 tones,
   wherein, in the sixth LTF symbol, the LTF sequences for the ninth to twelfth spatial streams are mapped to tones in a frequency domain in units of 4 tones, and
   wherein the LTF sequences for the ninth to twelfth spatial streams mapped to the frequency domain of the sixth LTF symbol are mapped to tones in such a manner that the LTF sequences for the ninth to twelfth spatial streams mapped to the frequency domain of the fifth LTF symbol are cyclically shifted by 2 tones.

2. The method of claim 1, wherein, in the first LTF symbol, the LTF sequence for the first spatial stream is mapped to tones in units of 4 tones from a first tone of the frequency domain, the LTF sequence for the second spatial stream is mapped to tones in units of 4 tones from a second tone of the frequency domain, the LTF sequence for the third spatial stream is mapped to tones in units of 4 tones from a third tone of the frequency domain, and the LTF sequence for the fourth spatial stream is mapped to tones in units of 4 tones from a fourth tone of the frequency domain.

3. The method of claim 2, wherein, in the second LTF symbol, the LTF sequence for the first spatial stream is mapped to tones in units of 4 tones from the third tone of the frequency domain, the LTF sequence for the second spatial stream is mapped to tones in units of 4 tones from the fourth tone of the frequency domain, the LTF sequence for the third spatial stream is mapped to tones in units of 4 tones from the first tone of the frequency domain, and the LTF sequence for the fourth spatial stream is mapped to tones in units of 4 tones from the second tone of the frequency domain.

4. The method of claim 1, further comprising
   generating, by the transmitting STA, seventh and eighth LTF symbols,
   wherein the seventh and eighth LTF symbols are further included in the EHT PPDU, wherein the seventh and eighth LTF symbols are generated based on LTF sequences for thirteenth to sixteenth spatial streams, wherein, in the seventh LTF symbol, the LTF sequences for the thirteenth to sixteenth spatial streams are mapped to tones in a frequency domain in units of 4 tones, wherein, in the eighth LTF symbol, the LTF sequences for the thirteenth to sixteenth spatial streams are mapped to tones in a frequency domain in units of 4 tones, and wherein the LTF sequences for the thirteenth to sixteenth spatial streams mapped to the frequency domain of the eighth LTF symbol are mapped to tones in such a manner that the LTF sequences for the thirteenth to sixteenth spatial streams mapped to the frequency domain of the seventh LTF symbol are cyclically shifted by 2 tones.

5. The method of claim 4, wherein the first and second LTF symbols are adjacent to each other, wherein the third and fourth LTF symbols are adjacent to each other, wherein the fifth and sixth LTF symbols are adjacent to each other, wherein the seventh and eighth LTF symbols are adjacent to each other, wherein the LTF sequences for the first to fourth spatial streams are orthogonal to each other, wherein the LTF sequences for the fifth to eighth spatial streams are orthogonal to each other, wherein the LTF sequences for the ninth to twelfth spatial streams are orthogonal to each other, and wherein the LTF sequences for the thirteenth to sixteenth spatial streams are orthogonal to each other.

6. A transmitting station (STA) transmitting an extremely high throughput (EHT) physical protocol data unit (PPDU) in a wireless local area network (WLAN) system, the transmitting STA comprising:

a memory;

a transceiver; and a processor operatively coupled to the memory and the transceiver, wherein the processor is configured to:

generate first to sixth long training field (LTF) symbols; and transmit the EHT PPDU including the first to sixth LTF symbols to a receiving STA, wherein the first and second LTF symbols are generated based on LTF sequences for first to fourth spatial streams, wherein, in the first LTF symbol, the LTF sequences for the first to fourth spatial streams are mapped to tones in units of 4 tones in a frequency domain, wherein, in the second LTF symbol, the LTF sequences for the first to fourth spatial streams are mapped to tones in a frequency domain in units of 4 tones, wherein the LTF sequences for the first to fourth spatial streams mapped to the frequency domain of the second LTF symbol are mapped to tones in such a manner that the LTF sequences for the first to fourth spatial streams mapped to the frequency domain of the first LTF symbol are cyclically shifted by 2 tones, wherein the third and fourth LTF symbols are generated based on LTF sequences for fifth to eighth spatial streams, wherein, in the third LTF symbol, the LTF sequences for the fifth to eighth spatial streams are mapped to tones in a frequency domain in units of 4 tones, wherein, in the fourth LTF symbol, the LTF sequences for the fifth to eighth spatial streams are mapped to tones in a frequency domain in units of 4 tones, wherein the LTF sequences for the fifth to eighth spatial streams mapped to the frequency domain of the fourth LTF symbol are mapped to tones in such a manner that the LTF sequences for the fifth to eighth spatial streams mapped to the frequency domain of the third LTF symbol are cyclically shifted by 2 tones, wherein the fifth and sixth LTF symbols are generated based on LTF sequences for ninth to twelfth spatial streams, wherein, in the fifth LTF symbol, the LTF sequences for the ninth to twelfth spatial streams are mapped to tones in a frequency domain in units of 4 tones, wherein, in the sixth LTF symbol, the LTF sequences for the ninth to twelfth spatial streams are mapped to tones in a frequency domain in units of 4 tones, and wherein the LTF sequences for the ninth to twelfth spatial streams mapped to the frequency domain of the sixth LTF symbol are mapped to tones in such a manner that the LTF sequences for the ninth to twelfth spatial streams mapped to the frequency domain of the fifth LTF symbol are cyclically shifted by 2 tones.

7. The transmitting STA of claim 6, wherein, in the first LTF symbol, the LTF sequence for the first spatial stream is mapped to tones in units of 4 tones from a first tone of the frequency domain, the LTF sequence for the second spatial stream is mapped to tones in units of 4 tones from a second tone of the frequency domain, the LTF sequence for the third spatial stream is mapped to tones in units of 4 tones from a third tone of the frequency domain, and the LTF sequence for the fourth spatial stream is mapped to tones in units of 4 tones from a fourth tone of the frequency domain.

8. The transmitting STA of claim 7, wherein, in the second LTF symbol, the LTF sequence for the first spatial stream is mapped to tones in units of 4 tones from the third tone of the frequency domain, the LTF sequence for the second spatial stream is mapped to tones in units of 4 tones from the fourth tone of the frequency domain, the LTF sequence for the third spatial stream is mapped to tones in units of 4 tones from the first tone of the frequency domain, and the LTF sequence for the fourth spatial stream is mapped to tones in units of 4 tones from the second tone of the frequency domain.

9. The transmitting STA of claim 6, wherein the processor generates seventh and eighth LTF symbols, wherein the seventh and eighth LTF symbols are further included in the EHT PPDU, wherein the seventh and eighth LTF symbols are generated based on LTF sequences for thirteenth to sixteenth spatial streams, wherein, in the seventh LTF symbol, the LTF sequences for the thirteenth to sixteenth spatial streams are mapped to tones in a frequency domain in units of 4 tones, wherein, in the eighth LTF symbol, the LTF sequences for the thirteenth to sixteenth spatial streams are mapped to tones in a frequency domain in units of 4 tones, and wherein the LTF sequences for the thirteenth to sixteenth spatial streams mapped to the frequency domain of the eighth LTF symbol are mapped to tones in such a manner that the LTF sequences for the thirteenth to sixteenth spatial streams mapped to the frequency domain of the seventh LTF symbol are cyclically shifted by 2 tones.

10. The transmitting STA of claim 9,
wherein the first and second LTF symbols are adjacent to each other,
wherein the third and fourth LTF symbols are adjacent to each other,
wherein the fifth and sixth LTF symbols are adjacent to each other,
wherein the seventh and eighth LTF symbols are adjacent to each other,
wherein the LTF sequences for the first to fourth spatial streams are orthogonal to each other,
wherein the LTF sequences for the fifth to eighth spatial streams are orthogonal to each other,
wherein the LTF sequences for the ninth to twelfth spatial streams are orthogonal to each other, and
wherein the LTF sequences for the thirteenth to sixteenth spatial streams are orthogonal to each other.

11. A method of receiving an extremely high throughput (EHT) physical protocol data unit (PPDU) in a wireless local area network (WLAN) system, the method comprising:
receiving, by a receiving station (STA), the EHT PPDU including first to sixth long training field (LTF) symbols from a transmitting STA; and
performing, by the receiving STA, channel estimation, based on the first to sixth LTF symbols,
wherein the first and second LTF symbols are generated based on LTF sequences for first to fourth spatial streams,
wherein, in the first LTF symbol, the LTF sequences for the first to fourth spatial streams are mapped to tones in units of 4 tones in a frequency domain,
wherein, in the second LTF symbol, the LTF sequences for the first to fourth spatial streams are mapped to tones in a frequency domain in units of 4 tones,
wherein the LTF sequences for the first to fourth spatial streams mapped to the frequency domain of the second LTF symbol are mapped to tones in such a manner that the LTF sequences for the first to fourth spatial streams mapped to the frequency domain of the first LTF symbol are cyclically shifted by 2 tones,
wherein the third and fourth LTF symbols are generated based on LTF sequences for fifth to eighth spatial streams,
wherein, in the third LTF symbol, the LTF sequences for the fifth to eighth spatial streams are mapped to tones in a frequency domain in units of 4 tones,
wherein, in the fourth LTF symbol, the LTF sequences for the fifth to eighth spatial streams are mapped to tones in a frequency domain in units of 4 tones,
wherein the LTF sequences for the fifth to eighth spatial streams mapped to the frequency domain of the fourth LTF symbol are mapped to tones in such a manner that the LTF sequences for the fifth to eighth spatial streams mapped to the frequency domain of the third LTF symbol are cyclically shifted by 2 tones,
wherein the fifth and sixth LTF symbols are generated based on LTF sequences for ninth to twelfth spatial streams,
wherein, in the fifth LTF symbol, the LTF sequences for the ninth to twelfth spatial streams are mapped to tones in a frequency domain in units of 4 tones,
wherein, in the sixth LTF symbol, the LTF sequences for the ninth to twelfth spatial streams are mapped to tones in a frequency domain in units of 4 tones, and
wherein the LTF sequences for the ninth to twelfth spatial streams mapped to the frequency domain of the sixth LTF symbol are mapped to tones in such a manner that the LTF sequences for the ninth to twelfth spatial streams mapped to the frequency domain of the fifth LTF symbol are cyclically shifted by 2 tones.

12. The method of claim 11,
wherein channel estimation for the first spatial stream is performed based on interpolation between the LTF sequences for the first spatial stream mapped to the frequency domain of the first and second LTF symbols,
wherein channel estimation for the second spatial stream is performed based on interpolation between the LTF sequences for the second spatial stream mapped to the frequency domain of the first and second LTF symbols,
wherein channel estimation for the third spatial stream is performed based on interpolation between the LTF sequences for the third spatial stream mapped to the frequency domain of the first and second LTF symbols, and
wherein channel estimation for the fourth spatial stream is performed based on interpolation between the LTF sequences for the fourth spatial stream mapped to the frequency domain of the first and second LTF symbols.

\* \* \* \* \*